United States Patent
Moloney et al.

(10) Patent No.: US 11,532,117 B2
(45) Date of Patent: Dec. 20, 2022

(54) DENSITY COORDINATE HASHING FOR VOLUMETRIC DATA

(71) Applicant: Movidius Ltd., Schiphol-Rijk (NL)

(72) Inventors: David Macdara Moloney, Dublin (IE); Jonathan David Byrne, Ashbourne (IE); Leonie Buckley, Dublin (IE); Gary Garfield Barrington Baugh, Bray (IE); Sam Caulfield, Dublin (IE); Alessandro Palla, Seattle, WA (US); Ananya Gupta, Manchester (GB)

(73) Assignee: Movidius Ltd., Schiphol-Rijk (NL)

( * ) Notice: Subject to any disclaimer, the term of this patent is extended or adjusted under 35 U.S.C. 154(b) by 135 days.

(21) Appl. No.: 16/756,465

(22) PCT Filed: Oct. 16, 2018

(86) PCT No.: PCT/US2018/056164
§ 371 (c)(1),
(2) Date: Apr. 15, 2020

(87) PCT Pub. No.: WO2019/079358
PCT Pub. Date: Apr. 25, 2019

(65) Prior Publication Data
US 2021/0166464 A1    Jun. 3, 2021

Related U.S. Application Data

(60) Provisional application No. 62/573,089, filed on Oct. 16, 2017.

(51) Int. Cl.
*G06T 17/00* (2006.01)
*G06T 15/08* (2011.01)
(Continued)

(52) U.S. Cl.
CPC ............. *G06T 15/08* (2013.01); *B25J 9/1697* (2013.01); *B64C 39/024* (2013.01);
(Continued)

(58) Field of Classification Search
CPC ......... G06T 15/08; G06T 19/00; G06T 17/00; G06T 15/06; G06T 15/40
(Continued)

(56) References Cited

U.S. PATENT DOCUMENTS

2011/0228055 A1    9/2011  Sharp
2012/0226889 A1*   9/2012  Merriman ........... G06F 16/2264
                                                        711/216
(Continued)

FOREIGN PATENT DOCUMENTS

JP       2006520948 A     9/2006
KR     1020160033128 A    3/2016

OTHER PUBLICATIONS

NieBner, Matthias, et al. "Real-time 3D reconstruction at scale using voxel hashing." ACM Transactions on Graphics (ToG) 32.6 (2013): 168; [online], [Retrieved on Nov. 13, 2021]. Retrieved from the Internet: <URL: https://niessnerlab.org/papers/2013/4hashing/niessner2013hashing.pdf> (Year: 2013).*

(Continued)

*Primary Examiner* — Gordon G Liu
(74) *Attorney, Agent, or Firm* — Alliance IP, LLC

(57) ABSTRACT

A particular voxel is identified within a volume and a hash table is used to obtain volumetric data describing the particular voxel within the volume. Values of x-, y- and z-coordinates in the volume associated with the particular voxel are determined an index value associated with the particular voxel is determined according to a hashing algorithm, where the index value is determined from summing weighted values of the x-, y- and z-coordinates, and the (Continued)

weighted values are based on a variable value corresponding to a dimension of the volume. A particular entry is identified in the hash table based on the index value, where the particular entry includes volumetric data, and the volumetric data identifies, for the particular voxel, whether the particular voxel is occupied.

19 Claims, 38 Drawing Sheets

(51) Int. Cl.
    *B25J 9/16*       (2006.01)
    *B64C 39/02*    (2006.01)
    *G05D 1/00*     (2006.01)
    *G05D 1/02*     (2020.01)
    *G06T 1/60*     (2006.01)

(52) U.S. Cl.
    CPC ......... *G05D 1/0088* (2013.01); *G05D 1/0251* (2013.01); *G06T 1/60* (2013.01); *G06T 2210/21* (2013.01)

(58) Field of Classification Search
    USPC ........................................................ 345/424
    See application file for complete search history.

(56) References Cited

U.S. PATENT DOCUMENTS

| | | | |
|---|---|---|---|
| 2015/0294500 | A1 | 10/2015 | Tucker et al. |
| 2016/0202346 | A1 | 7/2016 | Anderson et al. |
| 2018/0158197 | A1* | 6/2018 | Dasgupta ............... G06K 9/726 |
| 2019/0139202 | A1* | 5/2019 | Mayer .................... G06V 10/30 |

OTHER PUBLICATIONS

Dumey, Arnold et al., "Indexing for Rapid Random Access Memory Systems," Computers and Automation, vol. 5, No. 12, Dec. 1956 (48 pages).
Eitz, Mathias et al., "Hierarchical Spatial Hashing for Real-Time Collision Detection," IEEE Computer Society, IEEE Conference on Shape Modeling and Applications (SMI/07) (2007) (9 pages).
Good, I.J., "Probability and the Weighing of Evidence," Charles Griffin & Company Limited, London (1950) (63 pages).
Jaeschke, G., "Reciprocal Hashing: A Method for Generating Minimal Perfect Hashing Functions," Heidelberg Scientific Center, Communications of the ACM, vol. 24, No. 12, Dec. 1981 (pp. 829-833), (5 pages).
Klingensmith, Matthew et al., "Chisel: Real Time Large Scale 3D Reconstruction Onboard a Mobile Device Using Spatially-Hashed Signed Distance Fields," Robotics: Science and Systems XI, 2015 (9 pages).
Knott, G.D., "Hashing Functions," The Computer Journal, vol. 18, No. 3, Jan. 1972 (pp. 265-278) (15 pages).
Knuth, Donald E., "The Art of Computer Programming, Second Edition, vol. 3, Chapter 5, Sorting and Searching," Addison Wesley Longman, Stanford University, Mar. 1998 (pp. 265-278). (25 pages).
Nießner, Matthias et al., "Real-time 3D Reconstruction at Scale using Voxel Hashing," ACM Transactions on Graphics, vol. 32, p. 1-11, Jan. 2013 (11 pages).
PCT International Preliminary Report on Patentability in PCT International Application Serial No. PCT/US2018/056164, dated Apr. 21, 2020 (6 pages).
Sprugnoli, Renzo, "Perfect Hashing Functions: A Single Probe Retrieving Method for Static Sets," Communications of the ACM, vol. 20, No. 11, Nov. 1977 (10 pages).
Teschner, Matthias et al., "Optimized Spatial Hashing for Collision Detection of Deformable Objects," VMV 2003, Munich Germany, Nov. 19-21, 2003 (8 pages).
PCT International Search Report and Written Opinion in PCT International Application Serial No. PCT/US2018/056164 dated Feb. 28, 2019 (8 pages).
Xu, Xiaofan et al., "Classify 3D Voxel Based Point-Cloud Using Convolutional Neural Network on a Neural Compute Stick," In: 2017 13th International Conference on Natural Computation, Fuzzy Systems and Knowledge Discovery (ICN-FSK). Jul. 29-31, 2017 pp. 37-43. (7 pages).
Japan Patent Office Notice of Reason for Refusal in JP Application Serial No. 2020-522337 dated Jul. 27, 2022 (4 pages).

\* cited by examiner

| AlexNet | # weights | # zeros (avg) | # zeros (min) | # zeros (max) | % zeros |
|---|---|---|---|---|---|
| Relu1 | 8192 | 1859.3 | 912 | 4425 | 23% |
| Relu2 | 8192 | 4459.2 | 3700 | 4873 | 54% |
| Relu3 | 4096 | 3465.6 | 3079 | 3722 | 85% |

Note: results obtained using 10,000 CIFAR-10 test-images

FIG. 10

FIG. 27 (PART 1)

FIG. 27
(PART 2)

| z2 | | | | | | | | | | | | | | | z3 | | | | | | | | | | | | | | | | |
|---|---|---|---|---|---|---|---|---|---|---|---|---|---|---|---|---|---|---|---|---|---|---|---|---|---|---|---|---|---|---|---|
| y0 | | | | y1 | | | | y2 | | | | y3 | | | | y0 | | | | y1 | | | | y2 | | | | y3 | | | |
| x0 | x1 | x2 | x3 | x0 | x1 | x2 | x3 | x0 | x1 | x2 | x3 | x0 | x1 | x2 | x3 | x0 | x1 | x2 | x3 | x0 | x1 | x2 | x3 | x0 | x1 | x2 | x3 | x0 | x1 | x2 | x3 |
| 32 | 33 | 34 | 35 | 36 | 37 | 38 | 39 | 40 | 41 | 42 | 43 | 44 | 45 | 46 | 47 | 48 | 49 | 50 | 51 | 52 | 53 | 54 | 55 | 56 | 57 | 58 | 59 | 60 | 61 | 62 | 63 |

2700

FROM FIG. 27 (PART 1)

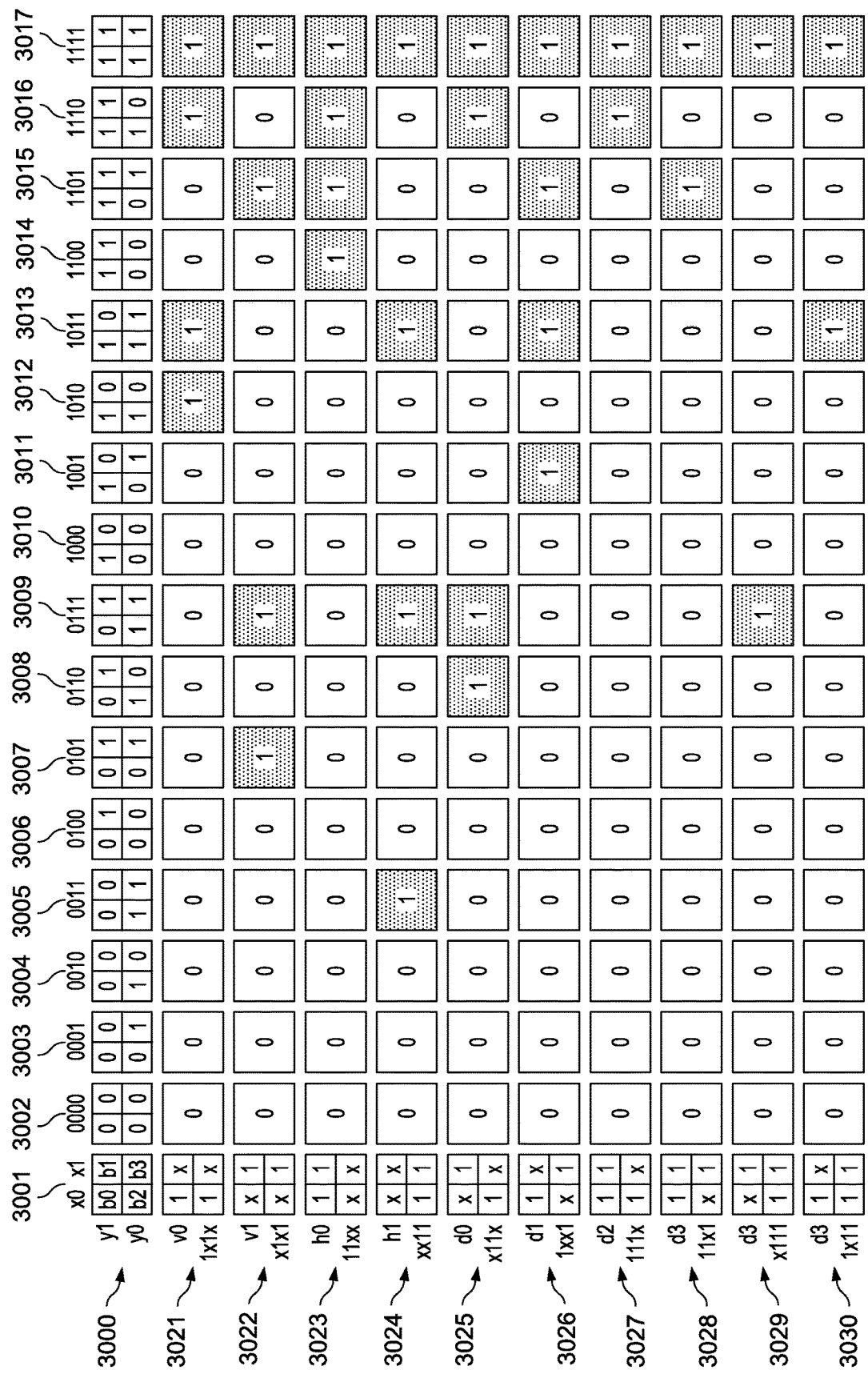
FIG. 30 (PART 1)

FIG. 30 (PART 1) | FIG. 30 (PART 2)
---|---
FIG. 30

FIG. 30 (PART 2)

DENSITY COORDINATE HASHING FOR VOLUMETRIC DATA

RELATED APPLICATIONS

This Application is national stage application under 35 U.S.C. § 371 of PCT International Application Serial No. PCT/US2018/056164, filed on Oct. 16, 2018 and entitled DENSITY COORDINATE HASHING FOR VOLUMETRIC DATA, which application claims the benefit of priority to U.S. Provisional Patent Application Ser. No. 62/573,089 filed on Oct. 16, 2017 and entitled ENHANCED USE OF SPARSE VOLUMETRIC DATA. The disclosures of the prior applications are considered part of and are hereby incorporated by reference in their entirety in the disclosure of this application.

TECHNICAL FIELD

This disclosure relates in general to the field of computer systems and, more particularly, to hash tables for use in computer vision applications.

BACKGROUND

The worlds of computer vision and graphics are rapidly converging with the emergence of Augmented Reality (AR), Virtual Reality (VR) and Mixed-Reality (MR) products such as those from MagicLeap™, Microsoft™ HoloLens™, Oculus™ Rift™, and other VR systems such as those from Valve™ and HTC™. The incumbent approach in such systems is to use a separate graphics processing unit (GPU) and computer vision subsystem, which run in parallel. These parallel systems can be assembled from a pre-existing GPU in parallel with a computer vision pipeline implemented in software running on an array of processors and/or programmable hardware accelerators.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements. The accompanying figures are schematic and are not intended to be drawn to scale. For purposes of clarity, not every component is labelled in every figure. Nor is every component of each embodiment of the disclosed subject matter shown where illustration is not necessary to allow those of ordinary skill in the art to understand the disclosed subject matter.

FIG. 10 illustrates the experimental results from analysis of example test images in accordance with some embodiments;

FIG. 27 illustrates example operations involving an example volumetric data structure;

FIG. 30 shows the example acceleration of 2D Path-Finding on a 2D 2×2 bitmap in accordance with some embodiments;

DETAILED DESCRIPTION OF EXAMPLE EMBODIMENTS

Figure 1:
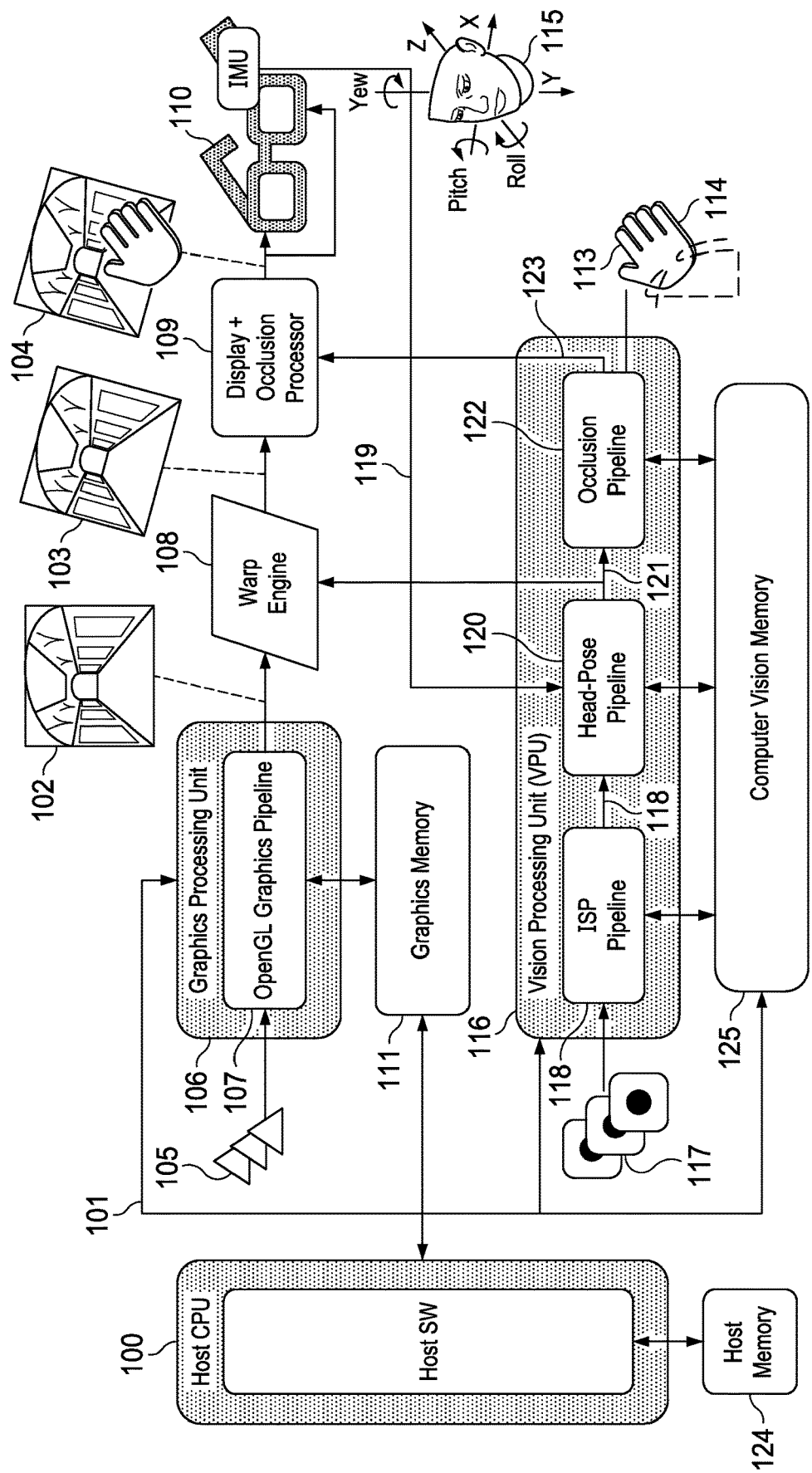
FIG. 1 illustrates a conventional augmented or mixed reality rendering system.

In the following description, numerous specific details are set forth regarding the systems and methods of the disclosed subject matter and the environment in which such systems and methods may operate, etc., in order to provide a thorough understanding of the disclosed subject matter. It will be apparent to one skilled in the art, however, that the disclosed subject matter may be practiced without such specific details, and that certain features, which are well known in the art, are not described in detail in order to avoid complication of the disclosed subject matter. In addition, it will be understood that the embodiments provided below are exemplary, and that it is contemplated that there are other systems and methods that are within the scope of the disclosed subject matter.

A variety of technologies are emerging based on and incorporating augmented reality, virtual reality, mixed reality, autonomous devices, and robots, which may make use of data models representing volumes of three-dimensional space and geometry. The description of various real and virtual environments using such 3D or volumetric data has traditionally involved large data sets, which some computing systems have struggled to process in a desirable manner. Further, as devices, such as drones, wearable devices, virtual reality systems, etc., grow smaller, the memory and processing resources of such devices may also be constrained. As an example, AR/VR/MR applications may demand high-frame rates for the graphical presentations generated using supporting hardware. However, in some applications, the GPU and computer vision subsystem of such hardware may need to process data (e.g., 3D data) at high rates, such as up to 130 fps (7 msecs), in order to produce desirable results (e.g., to generate a believable graphical scene with frame rates that produce a believable result, prevent motion sickness of the user due to excessive latency, among other example goals. Additional application may be similarly challenged to satisfactorily process data describing large volumes, while meeting constraints in processing, memory, power, application requirements of the corresponding system, among other example issues.

In some implementations, computing systems may be provided with logic to generate and/or use sparse volumetric data, defined according to a format. For instance, a defined volumetric data-structure may be provided to unify computer vision and 3D rendering in various systems and applications. A volumetric representation of an object may be captured using an optical sensor, such as a stereoscopic camera or depth camera, for example. The volumetric representation of the object may include multiple voxels. An improved volumetric data structure may be defined that enables the corresponding volumetric representation to be subdivided recursively to obtain a target resolution of the object. During the subdivision, empty space in the volumetric representation, which may be included in one or more of the voxels, can be culled from the volumetric representation (and supporting operations). The empty space may be an area of the volumetric representation that does not include a geometric property of the object.

Accordingly, in an improved volumetric data structure, individual voxels within a corresponding volume may be tagged as "occupied" (by virtue of some geometry being present within the corresponding volumetric space) or as "empty" (representing that the corresponding volume consists of empty space). Such tags may additionally be interpreted as designating that one or more of its corresponding subvolumes is also occupied (e.g., if the parent or higher level voxel is tagged as occupied) or that all of its subvolumes are empty space (i.e., in the case of the parent, or higher level voxel being tagged empty). In some implementations, tagging a voxel as empty may allow the voxel and/or its corresponding subvolume voxels to be effectively removed from the operations used to generate a corresponding volumetric representation. The volumetric data structure may be according to a sparse tree structure, such as according to a sparse sexaquaternary tree (SST) format. Further, such an approach to a sparse volumetric data structure may utilize comparatively less storage space than is traditionally used to store volumetric representations of objects. Additionally, compression of volumetric data may increase the viability of transmission of such representations and enable faster processing of such representations, among other example benefits.

The volumetric data-structure can be hardware accelerated to rapidly allow updates to a 3D renderer, eliminating delay that may occur in separate computer vision and graphics systems. Such delay can incur latency, which may induce motion sickness in users among other additional disadvantages when used in AR, VR, MR, and other applications. The capability to rapidly test voxels for occupancy of a geometric property in an accelerated data-structure allows for construction of a low-latency AR, VR, MR, or other system, which can be updated in real time.

In some embodiments, the capabilities of the volumetric data-structure may also provide intra-frame warnings. For example, in AR, VR, MR, and other applications, when a user is likely to collide with a real or synthetic object in an imaged scene, or in computer vision applications for drones or robots, when such devices are likely to collide with a real or synthetic object in an imaged scene, the speed of processing provided by the volumetric data structure allows for warning of the impending collision.

Embodiments of the present disclosure may relate to the storage and processing of volumetric data in applications such as robotics, head-mounted displays for augmented and mixed reality headsets as well as phones and tablets. Embodiments of the present disclosure represent each volumetric element (e.g., voxel) within a group of voxels, and optionally physical quantities relating to the voxel's geometry, as a single bit. Additional parameters related to a group of 64 voxels may be associated with the voxels, such as corresponding red-green-blue (RGB) or other coloration encodings, transparency, truncated signed distance function (TSDF) information, etc. and stored in an associated and optional 64-bit data-structure (e.g., such that two or more bits are used to represent each voxel). Such a representation scheme may realize a minimum memory requirement. Moreover, representing voxels by a single bit allows for the performance of many simplified calculations to logically or mathematically combine elements from a volumetric representation. Combining elements from a volumetric representation can include, for example, OR-ing planes in a volume to create 2D projections of 3D volumetric data, and calculating surface areas by counting the number of occupied voxels in a 2.5D manifold, among others. For comparisons XOR logic may be used to compare 64-bit sub-volumes (e.g., 4^3 sub-volumes), and volumes can be inverted, where objects can be merged to create hybrid objects by ORing them together, among other examples.

FIG. 1 illustrates a conventional augmented or mixed reality system consisting of parallel graphics rendering and computer-vision subsystems with a post-rendering connection apparatus to account for changes due to rapid head movement and changes in the environment which can produce occlusions and shadows in the rendered graphics. In one example implementation, a system may include a host processor 100 supported by host memory 124 to control the execution of a graphics pipeline, computer vision pipeline, and post-rendering correction apparatus by interconnection via bus 101, on-chip network on-chip, or other interconnection. The interconnection allows the host processor 100 running appropriate software to control the execution of the graphics processing unit (GPU) 106, associated graphics memory 111, computer vision pipeline 116, and associated computer vision memory 124. In one example, rendering of graphics using the GPU 106 via an OpenGL graphics shader 107 (e.g., operating on a triangle list 105) may take place at a slower rate than the computer vision pipeline. As a result, post rendering correction via a warp engine 108 and display/occlusion processor 109 may be performed to account for changes in head pose and occluding scene geometry that may have occurred since the graphics was rendered by the GPU 106. The output of the GPU 106 is time-stamped so that it can be used in conjunction with the correct control signals 121 and 123 from the head pose pipeline 120 and occlusion pipeline 123 respectively to produce the correct graphics output to take account of any changes in head pose 119 and occluding geometry 113, among other examples.

In parallel with the GPU 106, a plurality of sensors and cameras (e.g., including active and passive stereo cameras for depth and vision processing 117) may be connected to the computer vision pipeline 116. The computer vision pipeline 116 may include one or more of at least three stages, each of which may contain multiple stages of lower level processing. In one example, the stages in the computer vision pipeline 116 may be the image signal processing (ISP) pipeline 118, head-pose pipeline 120, and occlusion pipeline 122. The ISP pipeline 118 may take the outputs of the input camera sensors 117 and condition them so they can be used for subsequent head-pose and occlusion processing. The head-pose pipeline 120 may take the output of the ISP pipeline 118 and use it together with the output 119 of the inertial measurement unit (IMU) in the headset 110 to compute a change in head-pose since the corresponding output graphics frame was rendered by the GPU 106. The output 121 of the head-pose pipeline (HPP) 120 may be applied to the warp engine 108 along with a user specified mesh to distort the GPU output 102 so that it matches the updated head-pose position 119. The occlusion pipeline 122 may take the output of head-pose pipeline 121 and look for new objects in the visual field such as a hand 113 (or other example object) entering the visual field which should produce a corresponding shadow 114 on the scene geometry. The output 123 of the occlusion pipeline 122 may be used by the display and occlusion processor 109 to correctly overlay the visual field on top of the output 103 of the warp engine 108. The display and occlusion processor 109 produces a shadow mask for synthetic shadows 114 using the computed head-pose 119, and the display and occlusion processor 109 may composite the occluding geometry of the hand 113 on top of the shadow mask to produce a graphical shadow 114 on top of the output 103 of the warp engine 108 and produce the final output frame(s) 104 for display on the augmented/mixed reality headset 110, among other example use cases and features.

Figure 2:
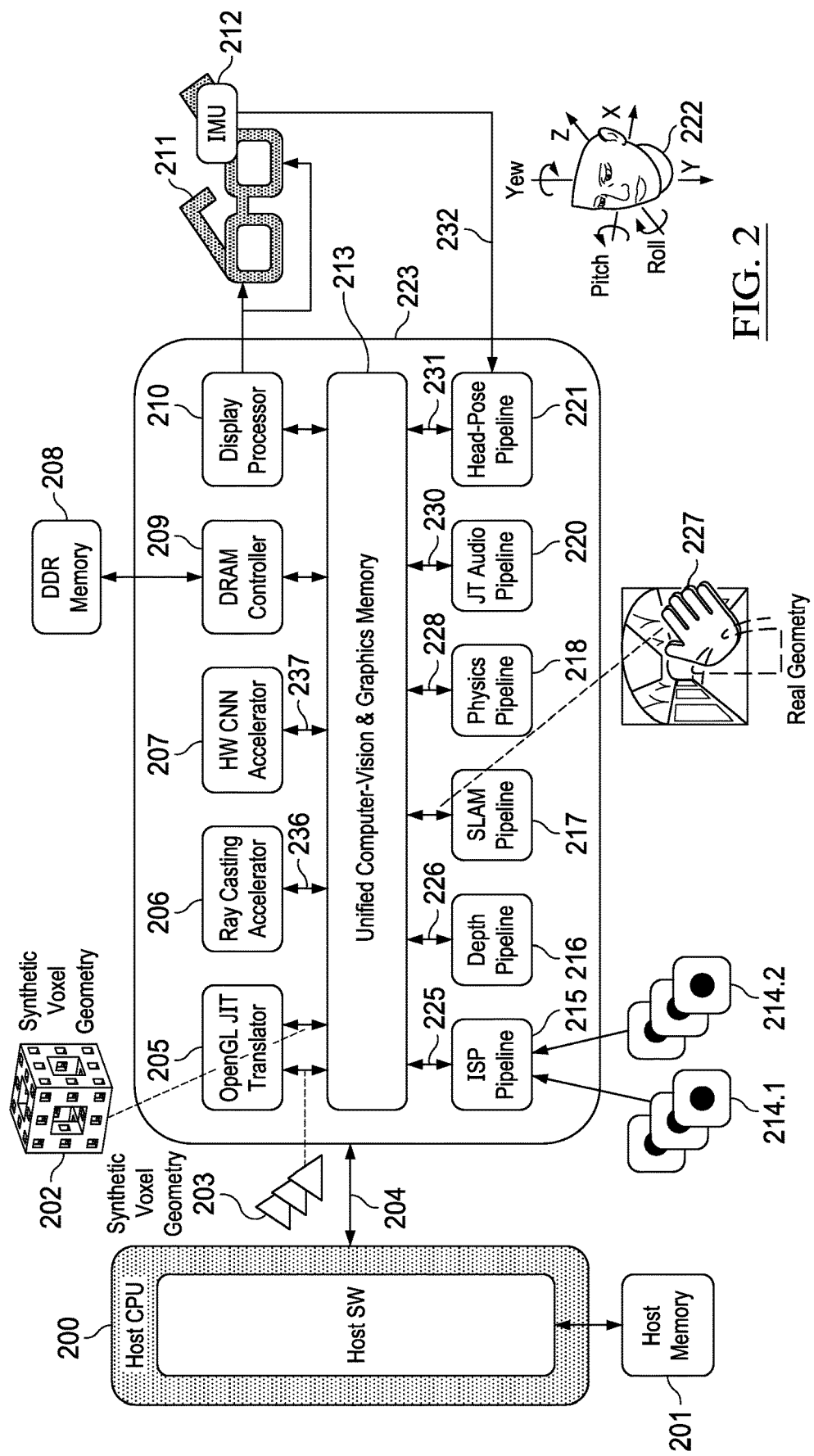
FIG. 2 illustrates a voxel-based augmented or mixed reality rendering system in accordance with some embodiments.

FIG. 2 illustrates a voxel-based augmented or mixed reality rendering system in accordance with some embodiments of the present disclosure. The apparatus depicted in FIG. 2 may include a host system composed on host CPU 200 and associated host memory 201. Such a system may communicate via a bus 204, on-chip network or other communications mechanism, with the unified computer vision and graphics pipeline 223 and associated unified computer vision and graphics memory 213 containing the real and synthetic voxels to be rendered in the final scene for display on a head-mounted augmented or mixed reality display 211. The AR/MR display 211 may also contain a plurality of active and passive image sensors 214 and an inertial measurement unit (IMU) 212, which is used to measure changes to head pose 222 orientation.

In the combined rendering pipeline, synthetic geometry may be generated starting from a triangle list 204 which is processed by an OpenGL JiT (Just-in-Time) translator 205 to produce synthetic voxel geometry 202. The synthetic voxel geometry may be generated, for instance, by selecting a main plane of a triangle from a triangle list. 2D rasterization of each triangle in the selected plane may then be performed (e.g., in the X and Z direction). The third coordinate (e.g., Y) may be created as an attribute to be interpolated across the triangle. Each pixel of the rasterized triangle may result in the definition of a corresponding voxel. This processing can be performed by either a CPU or GPU. When performed by a GPU, each rasterized triangle may be read back from the GPU to create a voxel where the GPU drew a pixel, among other example implementations. For instance, a synthetic voxel may be generated using a 2D buffer of lists, where each entry of the list stores the depth information of a polygon rendered at that pixel. For instance, a model can be rendered using an orthographic viewpoint (e.g., top-down). For example, every (x, y) provided in an example buffer may represent the column at (x, y) in a corresponding voxel volume (e.g., from (x,y,0) to (x,y,4095)). Each column may then be rendered from the information as 3D scanlines using the information in each list.

Continuing with the example of FIG. 2, in some implementations the synthetic voxel geometry 202 may be combined with measured geometry voxels 227 constructed using a simultaneous localization and mapping (SLAM) pipeline 217. The SLAM pipeline may use active sensors and/or passive image sensors 214 (e.g., 214.1 and 214.2) which are first processed using an image signal processing (ISP) pipeline 215 to produce an output 225, which may be converted into depth images 226 by a depth pipeline 216. Active or passive image sensors 214 (214.1 and 214.2) may include active or passive stereo sensors, structured light sensors, time-of-flight sensors, among other examples. For instance, the depth pipeline 216 can process either depth data from a structured light or time-of-flight sensor 214.1 or alternately a passive stereo sensors 214.2. In one example implementation, stereo sensors 214.2 may include a passive pair of stereo sensors, among other example implementations.

Depth images generated by the depth pipeline 215 may be processed by a dense SLAM pipeline 217 using a SLAM algorithm (e.g., Kinect Fusion) to produce a voxelized model of the measured geometry voxels 227. A ray-tracing accelerator 206 may be provided that may combine the measured geometry voxels 227 (e.g., real voxel geometry) with the synthetic voxel geometry 202 to produce a 2D rendering of the scene for output to a display device (e.g., a head mounted display 211 in a VR or AR application) via a display processor 210. In such an implementation, a complete scene model may be constructed from real voxels of measured geometry voxels 227 and synthetic geometry 202. As a result, there is no requirement for warping of 2D rendered geometry (e.g., as in FIG. 1). Such an implementation may be combined with head-pose tracking sensors and corresponding logic to correctly align the real and measured geometry. For instance, an example head-pose pipeline 221 may process head-pose measurements 232 from an IMU 212 mounted in the head mounted display 212 and the output 231 of the head-pose measurement pipeline may be taken into account during rendering via the display processor 210.

In some examples, a unified rendering pipeline may also use the measured geometry voxels 227 (e.g., a real voxel model) and synthetic geometry 202 (e.g, a synthetic voxel model) in order to render audio reverberation models and model the physics of a real-world, virtual, or mixed reality scene. As an example, a physics pipeline 218 may take the measured geometry voxels 227 and synthetic geometry 202 voxel geometry and compute the output audio samples for left and right earphones in a head mounted display (HMD) 211 using the ray casting accelerator 206 to compute the output samples 230 using acoustic reflection coefficients built into the voxel data-structure. Similarly, the unified voxel model consisting of 202 and 227 may also be used to determine physics updates for synthetic objects in the composite AR/MR scene. The physics pipeline 218 takes the composite scene geometric as inputs and computes collisions using the ray-casting accelerator 206 before computing updates 228 to the synthetic geometry 202 for rendering and as a basis for future iterations of the physics models.

In some implementations, a system, such as the system shown in FIG. 2, may be additionally provided with one or more hardware accelerators to implement and/or utilize convolutional neural networks (CNNs) that can process either RGB video/image inputs from the output of the ISP pipeline 215, volumetric scene data from the output of the SLAM pipeline 217, among other examples. Neural network classifiers can run either exclusively using the hardware (HW) convolutional neural network (CNN) accelerator 207 or in a combination of processors and HW CNN accelerator 207 to produce an output classification 237. The availability of a HW CNN accelerator 207 to do inference on volumetric representations may allow groups of voxels in the measured geometry voxels 227 to be labelled as belonging to a particular object class, among other example uses.

Labeling voxels (e.g., using a CNN and supporting hardware acceleration) may allow those objects to which those voxels belong to be recognized by the system as corresponding to the known object and the source voxels can be removed from the measured geometry voxels 227 and replaced by a bounding box corresponding to the object and/or information about the object's origin, object's pose, an object descriptor, among other example information. This may result in a much more semantically meaningful description of the scene that can be used, for example, as an input by a robot, drone, or other computing system to interact with objects in the scene, or an audio system to look up the sound absorption coefficient of objects in the scene and reflect them in the acoustic model of the scene, among other example uses.

One or more processor devices and hardware accelerators may be provided to implement the pipelines of the example system shown and described in FIG. 2. In some implementations, all of the hardware and software elements of the combined rendering pipeline may share access to a DRAM controller 209 which in turn allows data to be stored in a shared DDR memory device 208, among other example implementations.

Figure 3:
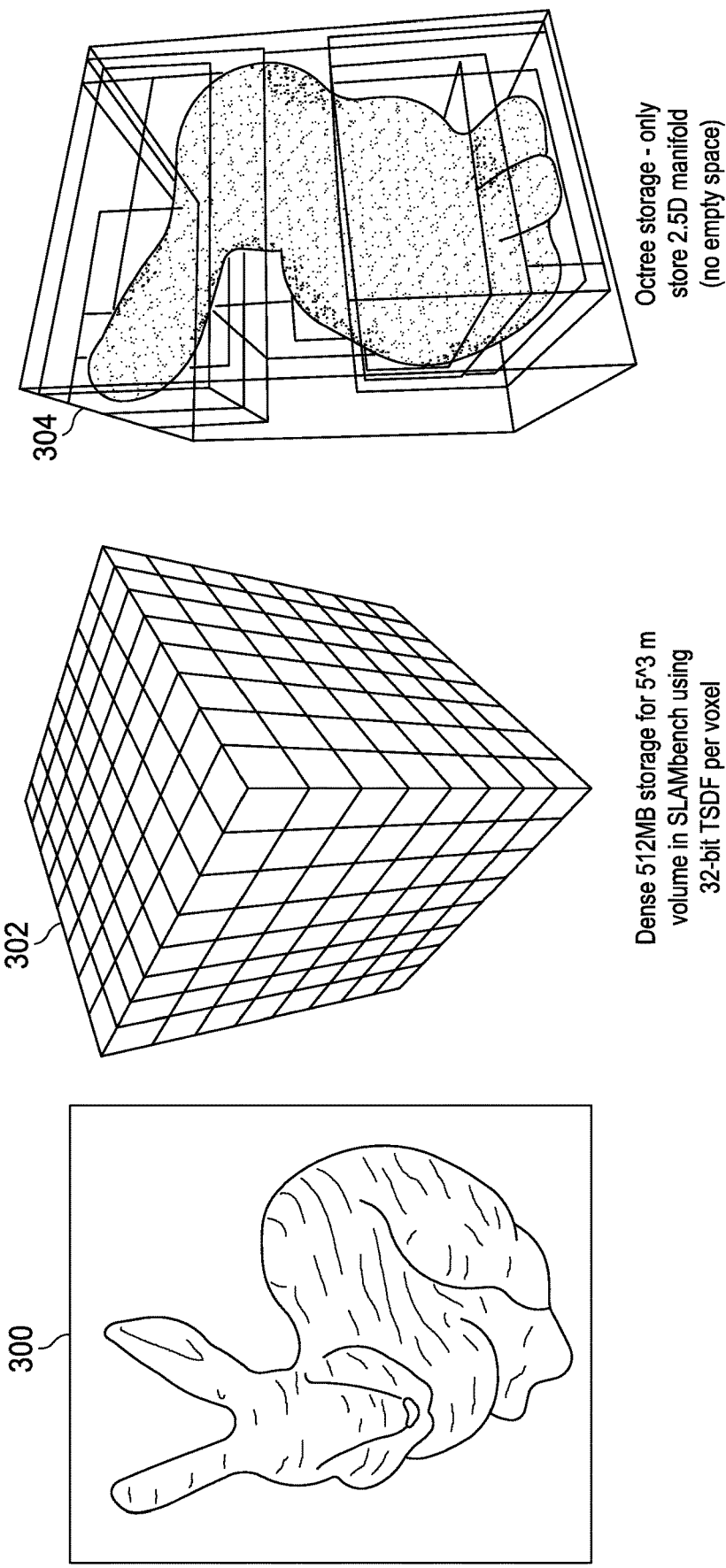
FIG. 3 illustrates the difference between dense and sparse volumetric representations in accordance with some embodiments.

FIG. 3 is presented to illustrate a difference between dense and sparse volumetric representations in accordance with some embodiments. As shown in the example of FIG. 3, a real world or synthetic object 300 (e.g., a statue of a rabbit) can be described in terms of voxels either in a dense manner as shown in 302 or in a sparse manner as shown in 304. The advantage of the dense representation such as 302 is uniform speed of access to all voxels in the volume, but the downside is the amount of storage that may be required. For example, for a dense representation, such as a $512^3$ element volume (e.g., corresponding to a 5 m in 1 cm resolution for a volume scanned using a Kinect sensor), 512 Mbytes to store a relatively small volume with a 4 Byte truncated signed distance function (TSDF) for each voxel. An octree representation 304 embodying a sparse representation, on the other hand, may store only those voxels for which there is actual geometry in the real world scene, thereby reducing the amount of data needed to store the same volume.

Figure 4:
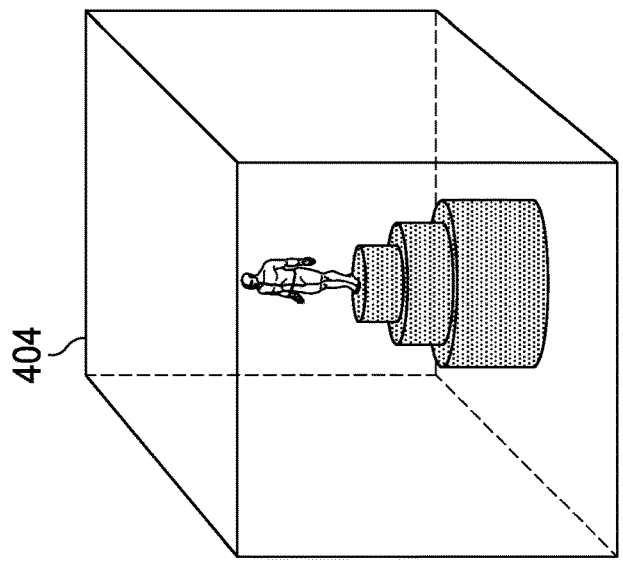
FIG. 4 illustrates a composite view of a scene in accordance with some embodiments.
Figure 4:
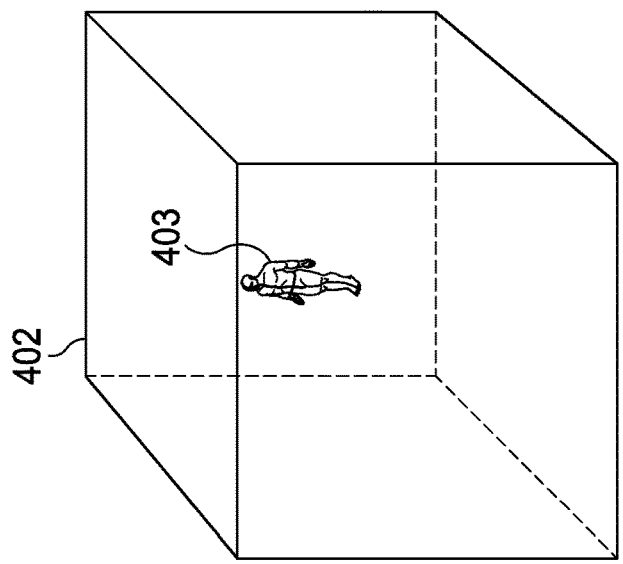
Figure 4:
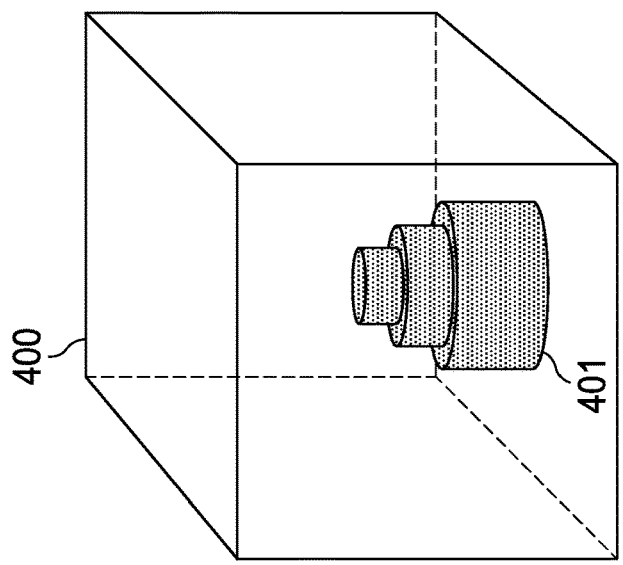
Figure 5:
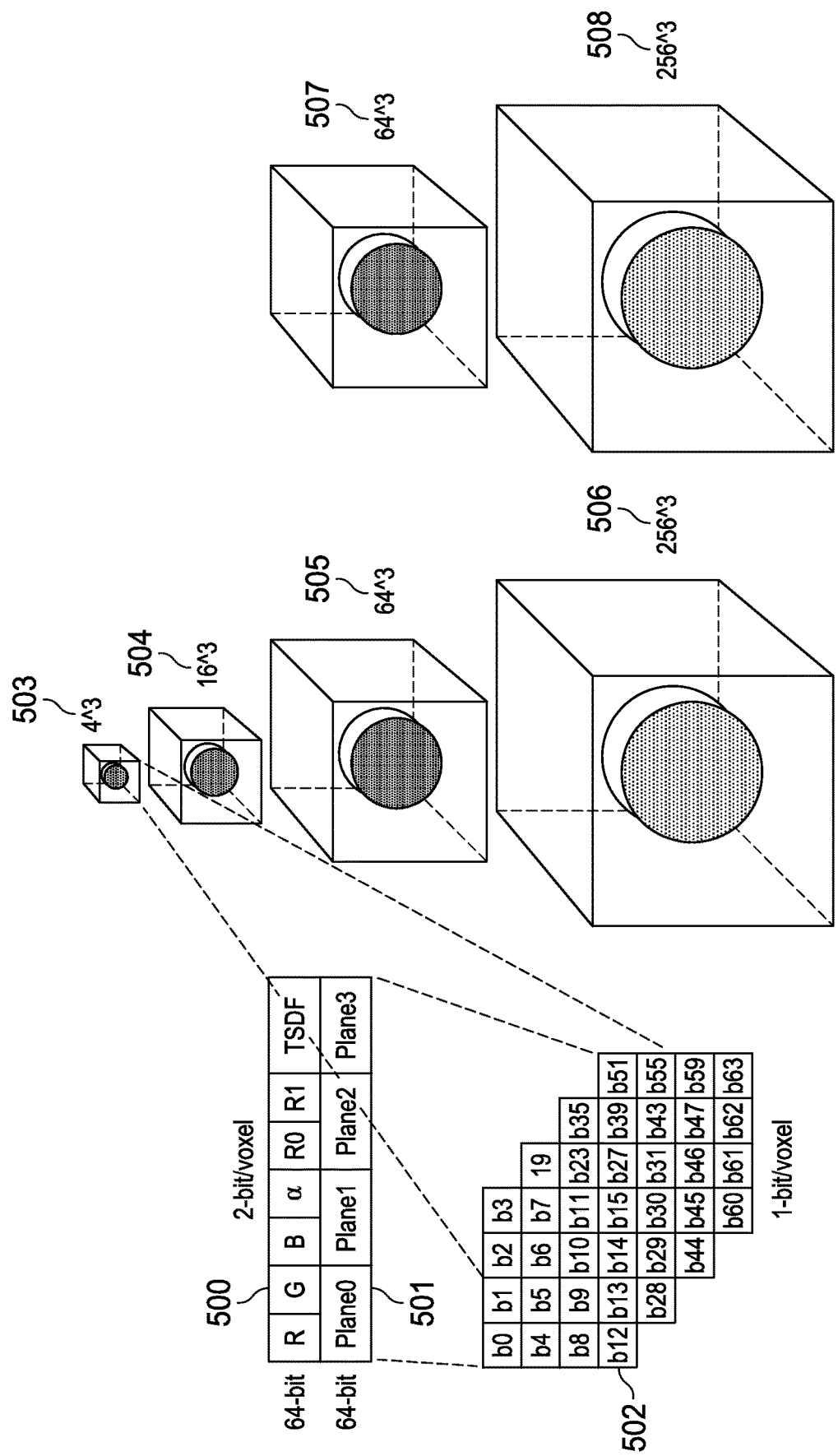
FIG. 5 illustrates the level of detail in an example element tree structure in accordance with some embodiments.

Turning to FIG. 4, a composite view of an example scene is illustrated in accordance with some embodiments. In particular, FIG. 4 shows how a composite view of a scene 404 can be maintained, displayed or subject to further processing using parallel data structures to represent synthetic voxels 401 and real world measured voxels 403 within equivalent bounding boxes 400 and 402 respectively for the synthetic and real-world voxel data. FIG. 5 illustrates the level of detail in a uniform $4^3$ element tree structure in accordance with some embodiments. In some implementations, as little as 1 bit may be utilized to describe each voxel in the volume using an octree representation, such as represented in the example of FIG. 5. However, a disadvantage of octree based techniques may be the number of indirect memory accesses utilized to access a particular voxel in the octree. In the case of a sparse voxel octree, the same geometry may be implicitly represented at multiple levels of detail advantageously allowing operations such as ray-casting, game-physics, CNNs, and other techniques to allow empty parts of a scene to be culled from further calculations leading to an overall reduction in not only storage required, but also in terms of power dissipation and computational load, among other example advantages.

In one implementation, an improved voxel descriptor (also referred to herein as "volumetric data structure") may be provided to organize volumetric information as a $4^3$ (or 64-bit) unsigned integer, such as shown in 501 with a memory requirement of 1 bit per voxel. In this example, 1-bit per voxel is insufficient to store a truncated signed distance function value (compared with TSDFs in SLAMbench/KFusion which utilize 64-bits). In the present example, an additional (e.g., 64-bit) field 500 may be included in the voxel descriptor. This example may be further enhanced such that while the TSDF in 64-bit field 500 is 16-bits, an additional 2-bits of fractional resolution in x, y and z may be provided implicitly in the voxel descriptor 501 to make the combination of the voxel TSDF in 64-bit field 500 and voxel location 501 equivalent to a much higher resolution TSDF, such as used in SLAMbench/KFusion or other examples. For instance, the additional data in the 64-bit field 500 (voxel descriptor) may be used to store subsampled RGB color information (e.g., from the scene via passive RGB sensors) with one byte each, and an 8-bit transparency value alpha, as well as two 1-byte reserved fields R1 and R2 that may be application specific and can be used to store, for example, acoustic reflectivity for audio applications, rigidity for physics applications, object material type, among other examples.

As shown in FIG. 5, the voxel descriptor 501 can be logically grouped into four 2D planes, each of which contain 16 voxels 502. These 2D planes (or voxel planes) may describe each level of an octree style structure based on successive decompositions in ascending powers of 4, as represented in FIG. 5. In this example implementation, the 64-bit voxel descriptor is chosen because it is a good match for a 64-bit bus infrastructure used in a corresponding system implementation (although other voxel descriptor sizes and formats may be provided in other system implementations and sized according to the bus or other infrastructure of the system). In some implementations, a voxel descriptor may be sized to reduce the number of memory accesses used to obtain the voxel. For instance, a 64-bit voxel descriptor may be used to reduce the number of memory accesses necessary to access a voxel at an arbitrary level in the octree by a factor of 2 compared to a traditional octree which operates on $2^3$ elements, among other example considerations and implementations.

In one example, an octree can be described starting from a $4^3$ root volume 503, and each non-zero entry in which codes for the presence of geometry in the underlying layers 504, 505 and 506 are depicted in the example $256^3$ volume. In this particular example, four memory accesses may be used in order to access the lowest level in the octree. In cases where such overhead is too high, an alternate approach may be adopted to encode the highest level of the octree as a larger volume, such as $64^3$, as shown in 507. In this case, each non-zero entry in 507 may indicate the presence of an underlying $4^3$ octree in the underlying $256^3$ volume 508. The result of this alternate organization is that only two memory accesses are required to access any voxel in the $256^3$ volume 508 compared to the alternate formulation shown in 503, 504 and 505. This latter approach is advantageous in the case that the device hosting the octree structure has a larger amount of embedded memory, allowing only the lower and less frequently accessed parts of the voxel octree 508 in external memory. This approach may cost more in terms of storage, for instance, where the full, larger (e.g., $64^3$) volume is to be stored in on-chip memory, but the tradeoff may allow faster memory access (e.g., 2×) and much lower power dissipation, among other example advantages.

Figure 6:
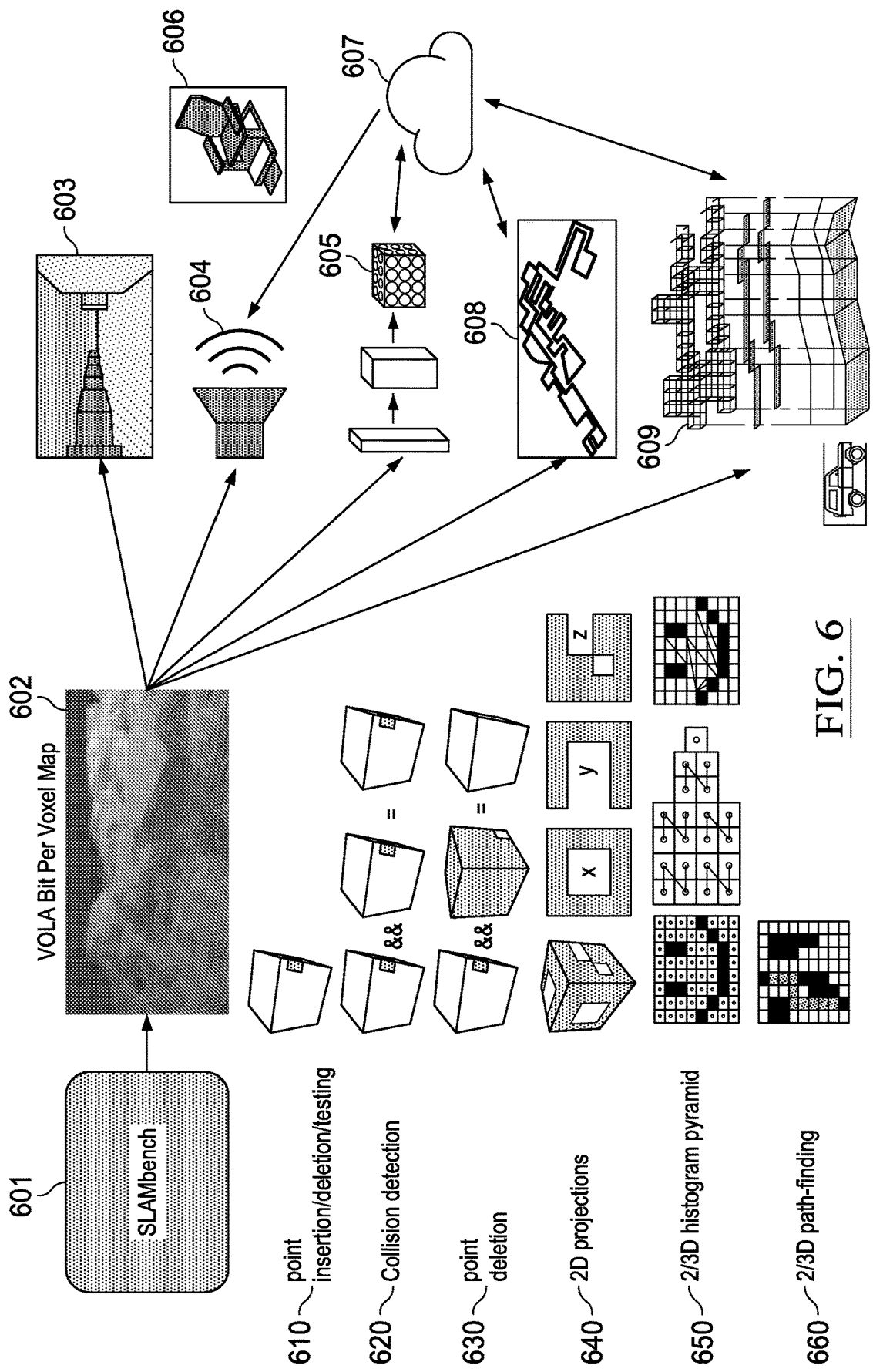
FIG. 6 illustrates applications which can utilize the data-structure and voxel data of the present application in accordance with some embodiments.

Turning to FIG. 6, a block diagram is shown illustrating example applications which may utilize the data-structure and voxel data of the present application in accordance with some embodiments. In one example, such as that shown in FIG. 5, additional information may be provided through an example voxel descriptor 500. While the voxel descriptor may increase the overall memory utilized to 2 bits per voxel, the voxel descriptor may enable a wide range of applications, which can make use of the voxel data, such as represented in FIG. 6. For instance, a shared volumetric representation 602, such as generated using a dense SLAM system 601 (e.g., SLAM bench), can be used in rendering the scene using graphic ray-casting or ray-tracing 603, used in audio ray-casting 604, among other implementations. In still other examples, the volumetric representation 602 can also be used in convolutional neural network (CNN) inference 605, and can be backed up by cloud infrastructure 607.

In some instances, cloud infrastructure 607 can contain detailed volumetric descriptors of objects such as a tree, piece of furniture, or other object (e.g., 606) that can be accessed via inference. Based on inferring or otherwise identifying the object, corresponding detailed descriptors may be returned to the device, allowing voxels of volumetric representation 602 to be replaced by bounding box representations with pose information and descriptors containing the properties of the objects, among other example features.

In still other embodiments, the voxel models discussed above may be additionally or alternatively utilized in some systems to construct 2D maps of example environments 608 using 3D-to-2D projections from the volumetric representation 602. These 2D maps can again be shared via communicating machines via cloud infrastructure and/or other network-based resources 607 and aggregated (e.g., using the same cloud infrastructure) to build higher quality maps using crowd-sourcing techniques. These maps can be shared by the cloud infrastructure 607 to connected machines and devices. In still further examples, 2D maps may be refined for ultra-low bandwidth applications using projection followed by piecewise simplification 609 (e.g., assuming fixed width and height for a vehicle or robot). The simplified path may then only have a single X,Y coordinate pair per piecewise linear segment of the path, reducing the amount of bandwidth required to communicate the path of the vehicle 609 to cloud infrastructure 607 and aggregated in that same cloud infrastructure 607 to build higher quality maps using crowd-sourcing techniques. These maps can be shared by cloud infrastructure 607 to connected machines and devices.

In order to enable these different applications, in some implementations, common functionality may be provided, such as through a shared software library, which in some embodiments may be accelerated using hardware accelerators or processor instruction set architecture (ISA) extensions, among other examples. For instance, such functions may include the insertion of voxels into the descriptor, the deletion of voxels, or the lookup of voxels 610. In some implementations, a collision detection function 620 may also be supported, as well as point/voxel deletion from a volume 630, among other examples. As introduced above, a system may be provided with functionality to quickly generate 2D projections 640 in X-, Y- and Z-directions from a corresponding volumetric representation 602 (3D volume) (e.g., which may serve as the basis for a path or collision determination). In some cases, it can also be advantageous to be able to generate triangle lists from volumetric representation 602 using histogram pyramids 650. Further, a system may be provided with functionality for fast determination of free paths 660 in 2D and 3D representations of a volumetric space 602. Such functionality may be useful in a range of applications. Further functions may be provided, such as elaborating the number of voxels in a volume, determining the surface of an object using a population counter to count the number of 1 bits in the masked region of the volumetric representation 602, among other examples.

Figure 7:
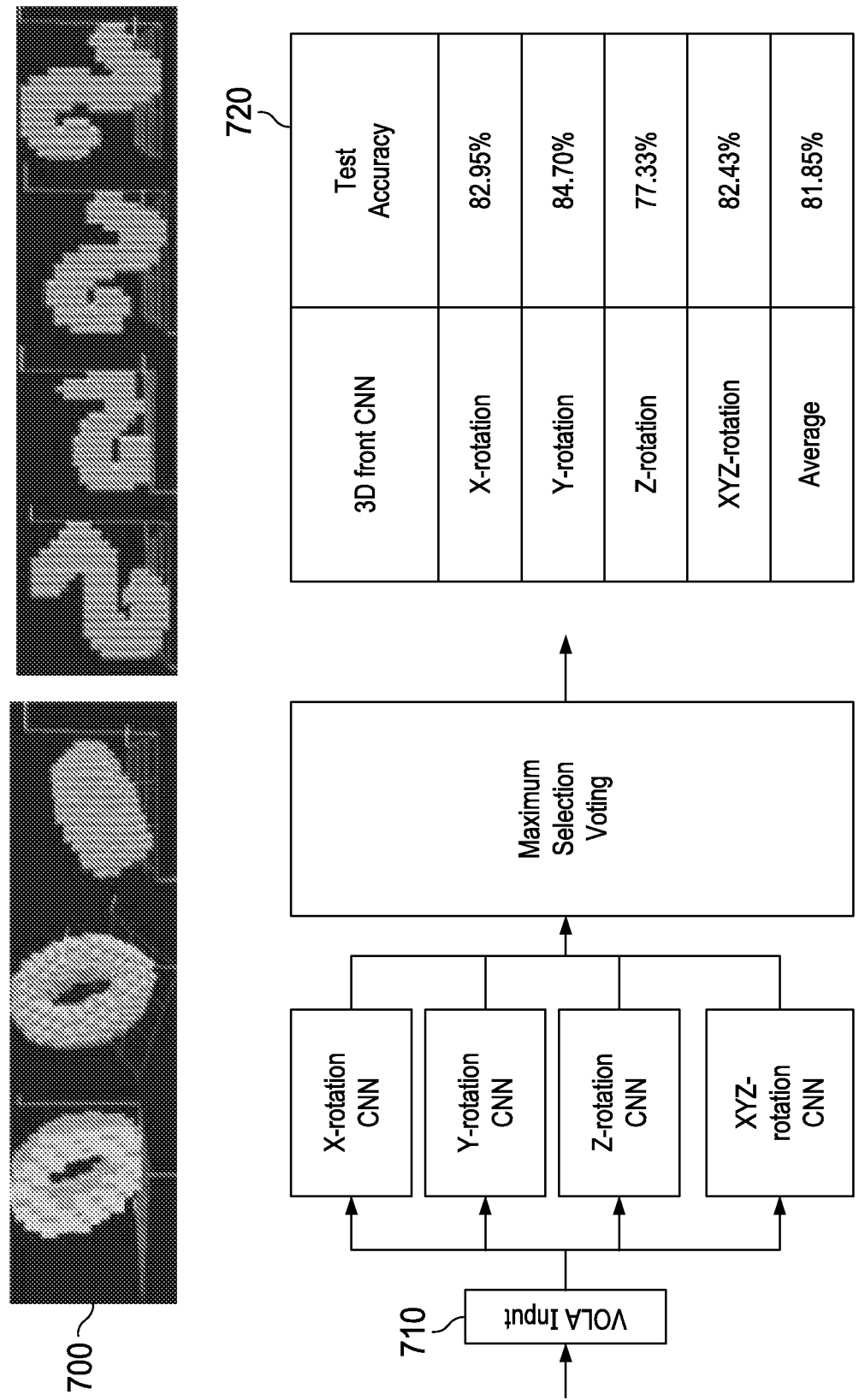
FIG. 7 illustrates an example network used to recognize 3D digits in accordance with some embodiments.

Turning to the simplified block diagram of FIG. 7, an example network is illustrated including systems equipped with functionality to recognize 3D digits in accordance with at least some embodiments. For instance, one of the applications shown in FIG. 6 is the volumetric CNN application 605, which is described in more detail in FIG. 7 where an example network is used to recognize 3D digits 700 generated from a data set, such as the Mixed National Institute of Standards and Technology (MNIST) dataset. Digits within such a data set may be used to train a CNN based convolutional network classifier 710 by applying appropriate rotations and translations in X, Y and Z to the digits before training. When used for inference in an embedded device, the trained network 710 can be used to classify 3D digits in the scene with high accuracy even where the digits are subject to rotations and translations in X, Y and Z 720, among other examples. In some implementations, the operation of the CNN classifier can be accelerated by the HW CNN accelerator 207 shown in FIG. 2. As the first layer of the neural network performs multiplications using the voxels in the volumetric representation 602, these arithmetic operations can be skipped as multiplication by zero is always zero and multiplication by a data value A by one (voxel) is equal to A.

Figure 8:
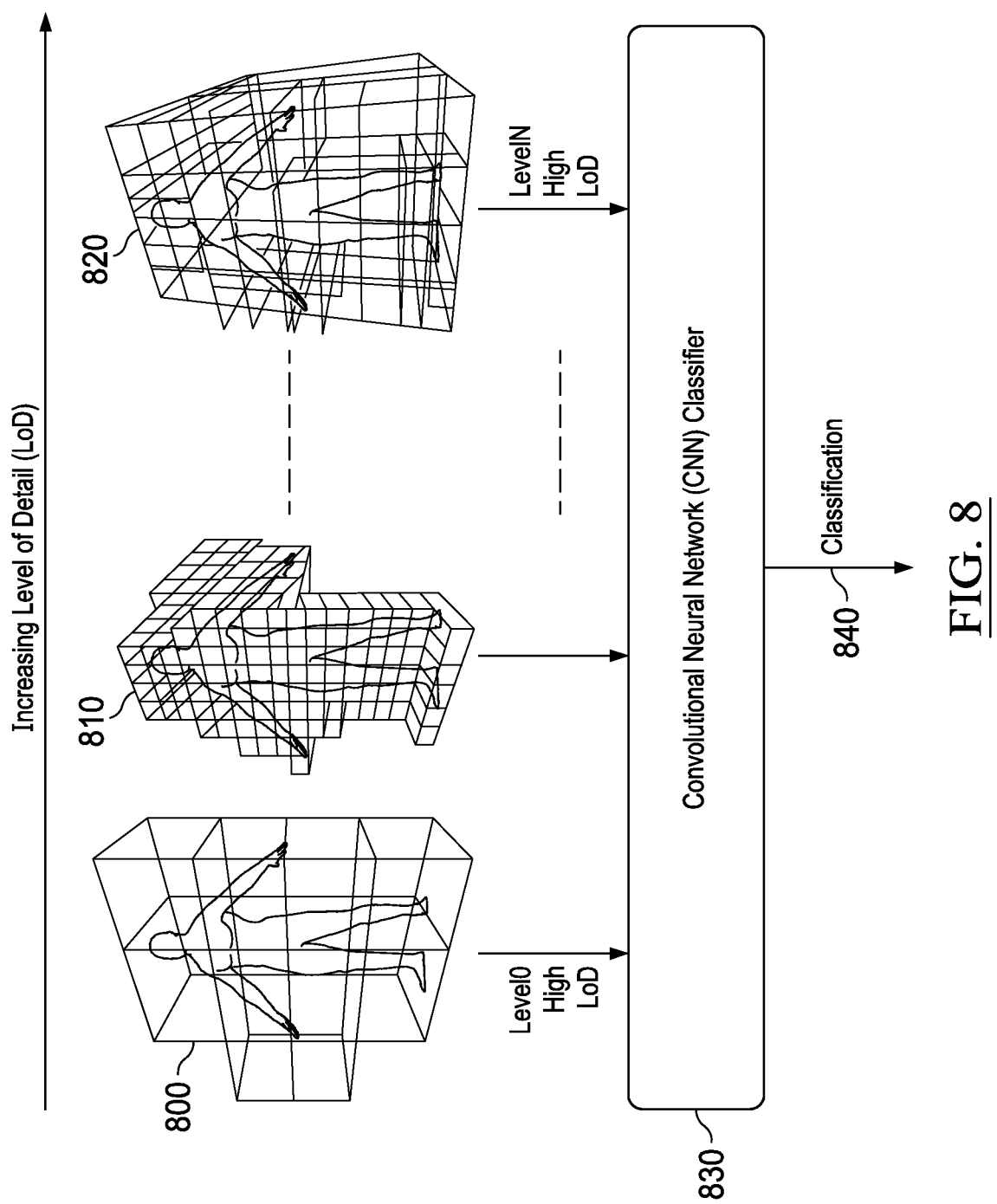
FIG. 8 illustrates multiple classifications performed on the same data structure using implicit levels of detail in accordance with some embodiments.

FIG. 8 illustrates multiple classifications performed on the same data structure using implicit levels of detail. A further refinement of the CNN classification using volumetric representation 602 may be that, as the octree representation contains multiple levels of detail implicitly in the octree structure as shown in FIG. 5, multiple classifications can be performed on the same data structure using the implicit levels of detail 800, 810 and 820 in parallel using a single classifier 830 or multiple classifiers in parallel, such as shown in FIG. 8. In traditional systems, comparable parallel classification may be slow due to the required image resizing between classification passes. Such resizing may be foregone in implementations applying the voxel structures discussed herein, as the same octree may contain the same information at multiple levels of detail. Indeed, a single training dataset based on volumetric models can cover all of the levels of detail rather than resized training datasets, such as would be required in conventional CNN networks.

Figure 9:
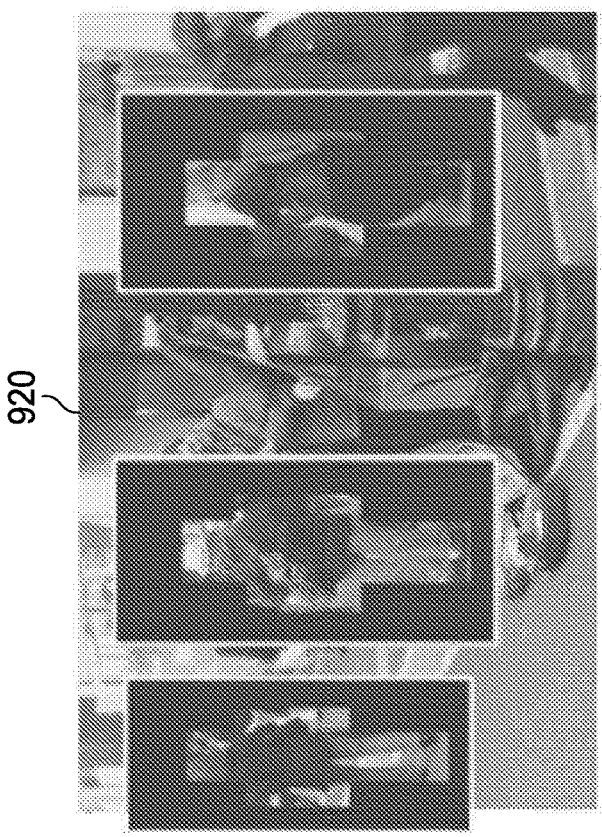
FIG. 9 illustrates operation elimination by 2D convolutional neural networks in accordance with some embodiments.
Figure 9:
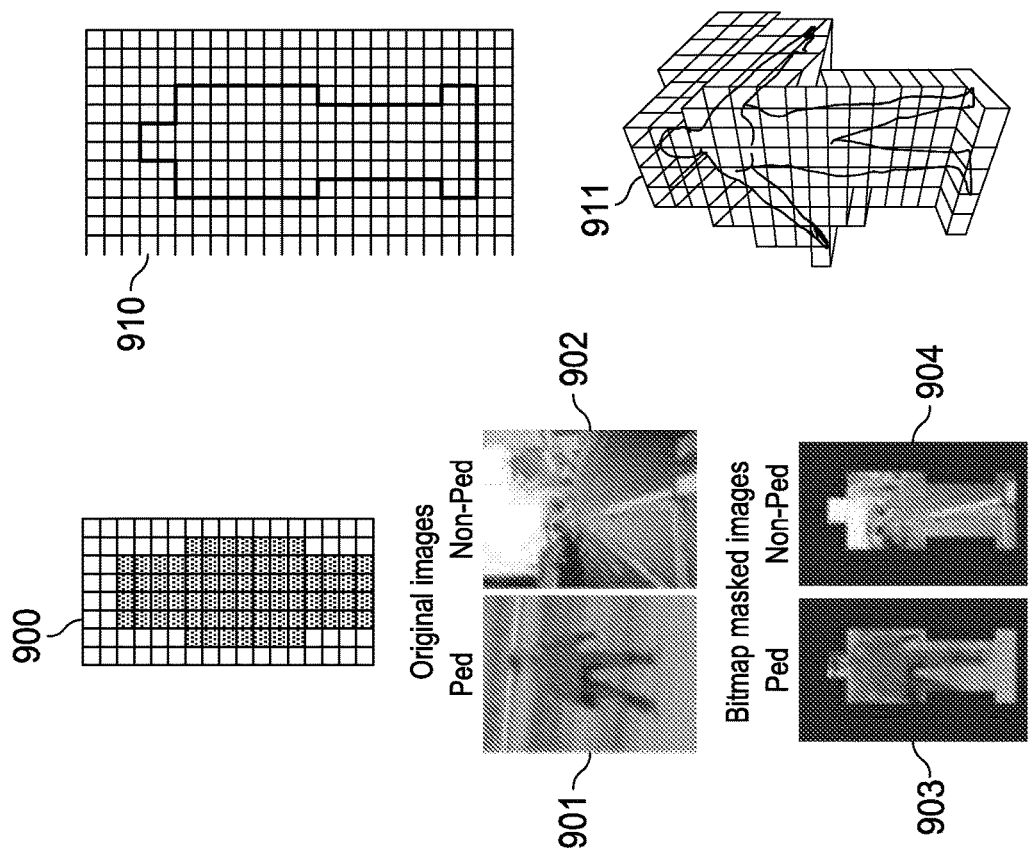

Turning to the example of FIG. 9, an example operation elimination is illustrated by 2D CNNs in accordance with some embodiments. Operation elimination can be used on 3D volumetric CNNs, as well as on 2D CNNs, such as shown in FIG. 9. For instance, in FIG. 9, in a first layer, a bitmap mask 900 can be used to describe the expected "shape" of the input 910 and may be applied to an incoming video stream 920. In one example, operation elimination can be used not only on 3D volumetric CNNs, but also on 2D volumetric CNNs. For instance, in a 2D CNN of the example of FIG. 9, a bitmap mask 900 may be applied to a first layer of the CNN to describe the expected "shape" of the input 910 and may be applied to input data of the CNN, such as an incoming video stream 820. As an example, the effect of applying bitmap masks to images of pedestrians for training or inference in CNN networks is shown in FIG. 9 where 901 represents an original image of a pedestrian 901, with 903 representing the corresponding version with bitmap mask applied. Similarly, an image containing no pedestrian is shown in 902 and the corresponding bitmap masked version in 904. The same method can be applied to any kind of 2D or 3D object in order to reduce the number of operations required for CNN training or inference through knowledge of the expected 2D or 3D geometry expected by the detector. An example of a 3D volumetric bitmap is shown in 911. The use of 2D bitmaps for inference in a real scene is shown in 920.

In the example implementation of FIG. 9, a conceptual bitmap is shown (at 900) while the real bitmap is generated by averaging a series of training images for a particular class of object 910. The example shown is two dimensional, however similar bitmap masks can also be generated for 3D objects in the proposed volumetric data format with one bit per voxel. Indeed the method could also potentially be extended to specify expected color range or other characteristics of the 2D or 3D object using additional bits per voxel/pixel, among other example implementations.

FIG. 10 is a table illustrating results of an example experiment involving the analysis of 10,000 CIFAR-10 test images in accordance with some embodiments. In some implementations, operation elimination can be used to eliminate intermediate calculations in 1D, 2D, and 3D CNNs due to Rectified Linear Unit (ReLU) operations which are frequent in CNN networks such as LeNet 1000, shown in FIG. 10. As shown in FIG. 10, in an experiment using 10,000 CIFAR-10 test images, the percentage of data-dependent zeroes generated by the ReLU units may reach up to 85%, meaning that in the case of zeroes, a system may be provided that recognizes the zeros and, in response, does not fetch corresponding data and perform corresponding multiplication operations. In this example, the 85% represents the percentage of ReLU dynamic zeros generated from the Modified National Institute of Standards and Technology database (MNIST) test dataset. The corresponding operation eliminations corresponding to these zero may serve to reduce power dissipation and memory bandwidth requirements, among other example benefits.

Trivial operations may be culled based on a bitmap. For instance, the use of such a bitmap may be according to the principles and embodiments discussed and illustrated in U.S. Pat. No. 8,713,080, titled "Circuit for compressing data and a processor employing the same," which is incorporated by reference herein in its entirety. Some implementations, may provide hardware capable of using such bitmaps, such as systems, circuitry, and other implementations discussed and illustrated in U.S. Pat. No. 9,104,633, titled "Hardware for performing arithmetic operations," which is also incorporated by reference herein in its entirety.

Figure 11:
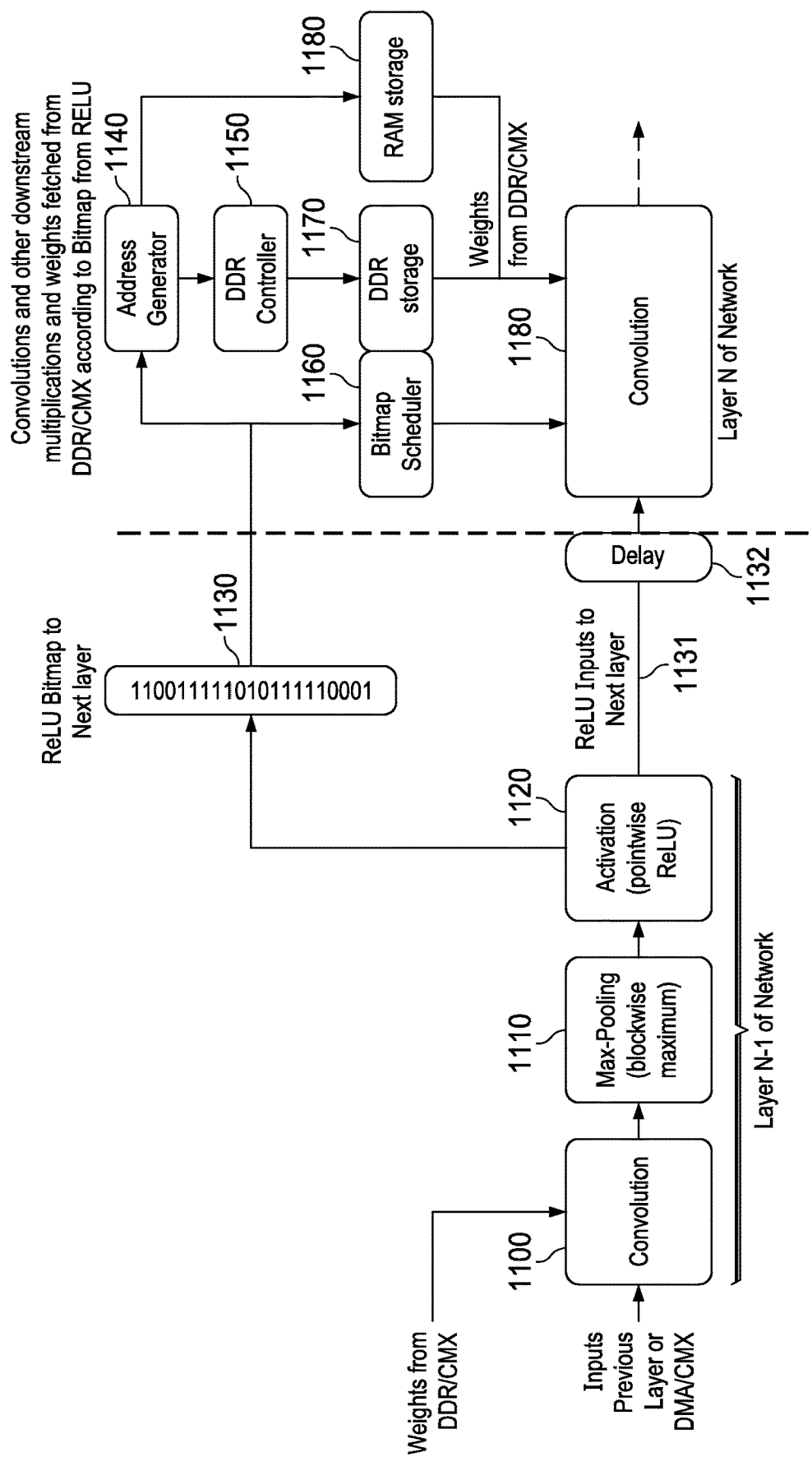
FIG. 11 illustrates hardware for culling operations in accordance with some embodiments.

FIG. 11 illustrates hardware that may be incorporated into a system to provide functionality for culling trivial operations based on a bitmap in accordance with some embodiments. In this example, a multi-layer neural network is provided, which includes repeated convolutional layers. The hardware may include one or more processors, one or more microprocessors, one or more circuits, one or more computers, and the like. In this particular example, a neural network includes an initial convolutional processing layer 1100, followed by pooling processing 1110, and finally an activation function processing, such as rectified linear unit (ReLU) function 1120. The output of the ReLU unit 1120, which provides ReLU output vector 1131, may be connected to a following convolutional processing layer 1180 (e.g., possibly via delay 1132), which receives ReLU output vector 1131. In one example implementation, a ReLU bitmap 1130 may also be generated in parallel with the connection of the ReLU unit 1120 to the following convolution unit 1180, the ReLU bitmap 1130 denoting which elements in the ReLU output vector 1131 are zeroes and which are non-zeroes.

In one implementation, a bitmap (e.g., 1130) may be generated or otherwise provided to inform enabled hardware of opportunities to eliminate operations involved in calculations of the neural network. For instance, the bits in the ReLU bitmap 1130 may be interpreted by a bitmap scheduler 1160, which instructs the multipliers in the following convolutional unit 1180 to skip zero entries of the ReLU output vector 1131 where there are corresponding binary zeroes in the ReLU bitmap 1130, given that multiplication by zero will always produce zero as an output. In parallel, memory fetches from the address generator 1140 for data/ weights corresponding to zeroes in the ReLU bitmap 1130 may also be skipped as there is little value in fetching weights that are going to be skipped by the following convolution unit 1180. If weights are to be fetched from an attached DDR DRAM storage device 1170 via a DDR controller 1150, the latency may be so high that it is only possible to save some on-chip bandwidth and related power dissipation. On the other hand, if weights are fetched from on-chip RAM 1180 storage, it may be possible to bypass/ skip the entire weight fetch operation, particularly if a delay corresponding to the RAM/DDR fetch delay 1132 is added at the input to the following convolution unit 1180.

Figure 12:
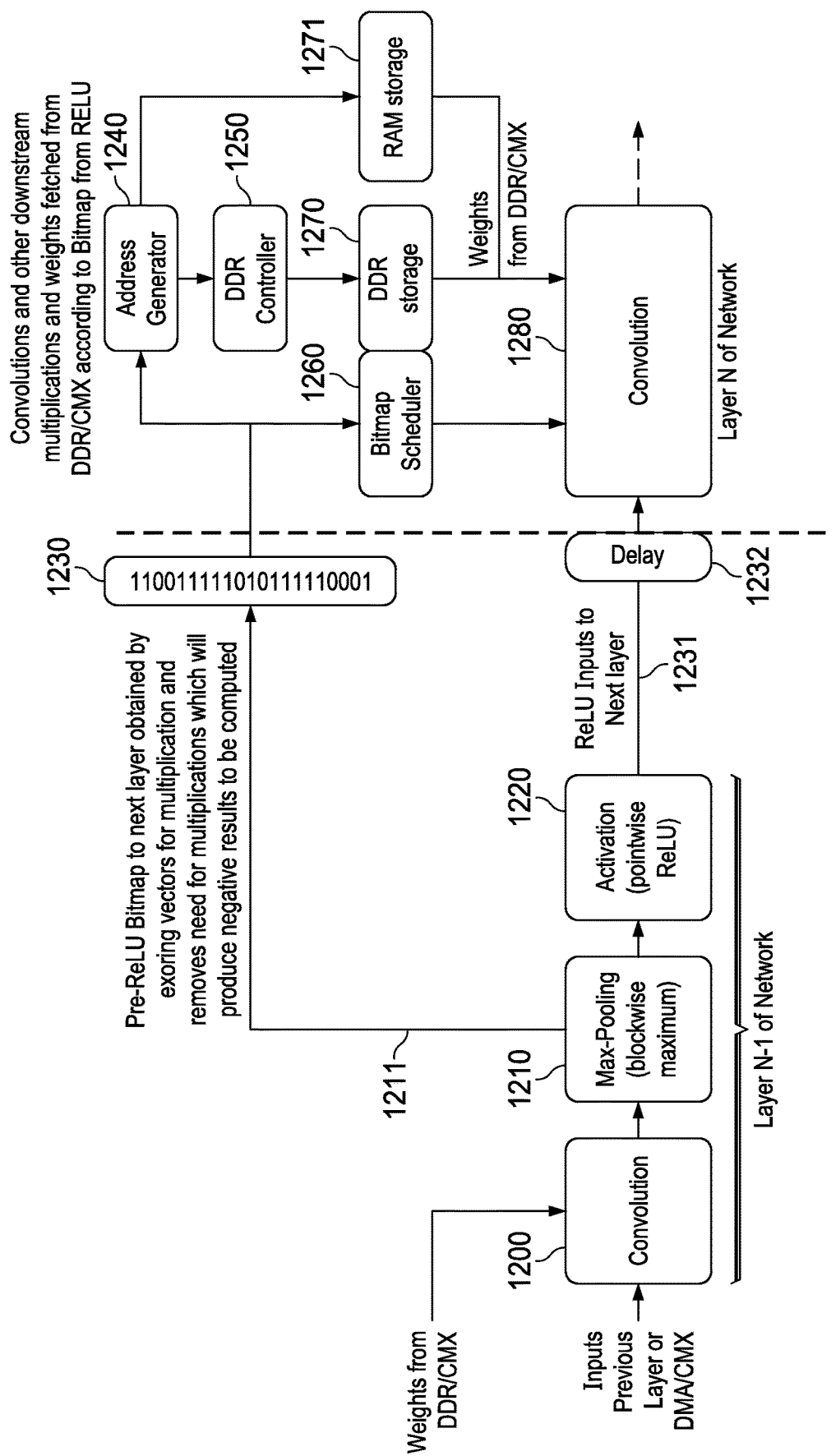
FIG. 12 illustrates a refinement to the hardware for culling operations in accordance with some embodiments.

Turning to FIG. 12, a simplified block diagram is presented to illustrate a refinement to example hardware equipped with circuitry and other logic for culling trivial operations (or performing operation elimination) in accordance with some embodiments. As shown in the example of FIG. 12, additional hardware logic may be provided to predict the sign of the ReLU unit 1220 input in advance from the preceding Max-Pooling unit 1210 or convolution unit 1200. Adding sign-prediction and ReLU bitmap generation to the Max-pooling unit 1210 may allow the ReLU bitmap information to be predicted earlier from a timing point of view to cover delays that may occur through the address generator 1240, through external DDR controller 1250 and DDR storage 1270 or internal RAM storage 1271. If the delay is sufficiently low, the ReLU bitmap can be interpreted in the address generator 1240 and memory fetches associated with ReLU bitmap zeroes can be skipped completely, because the results of the fetch from memory can be determined never to be used. This modification to the scheme of FIG. 11 can save additional power and may also allow the removal of the delay stage (e.g., 1132, 1232) at the input to the following convolution unit 1280 if the delays through the DDR access path (e.g., 1240 to 1250 to 1270) or RAM access path (e.g., 1240 to 1271) are sufficiently low so as not to warrant a delay stage 1232, among other example features and functionality.

Figure 13:
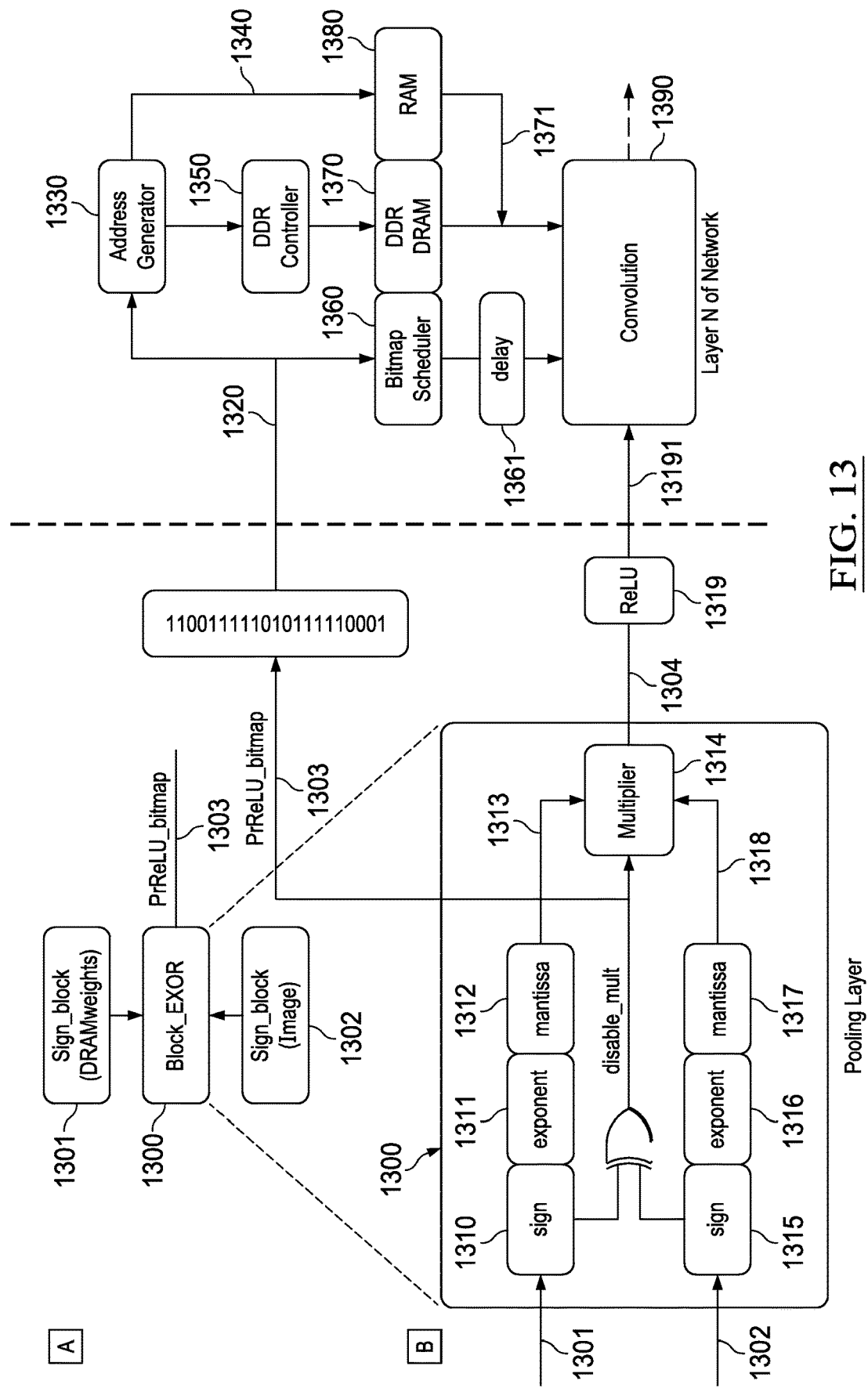
FIG. 13 illustrates hardware in accordance with some embodiments.

FIG. 13 is another simplified block diagram illustrating example hardware in accordance with some embodiments. For instance, CNN ReLU layers can produce high numbers of output zeroes corresponding to negative inputs. Indeed, negative ReLU inputs can be predictively determined by looking at the sign input(s) to the previous layers (e.g., the pooling layer in the example of FIG. 13). Floating-point and integer arithmetic can be explicitly signed in terms of the most significant bit (MSB) so a simple bit-wise exclusive OR (XOR) operation across vectors of inputs to be multiplied in a convolution layer can predict which multiplications will produce output zeroes, such as shown in FIG. 13. The resulting sign-predicted ReLU bitmap vector can be used as a basis for determining a subset of multiplications and associated coefficient reads from memory to eliminate, such as in the manner described in other examples above.

Providing for the generation of ReLU bitmaps back into the previous pooling or convolutional stages (i.e., stages before the corresponding ReLU stage) may result in additional power. For instance, sign-prediction logic may be provided to disable multipliers when they will produce a negative output that will be ultimately set to zero by the ReLU activation logic. For instance, this is shown where the two sign bits 1310 and 1315 of the multiplier 1314 inputs 1301 and 1302 are logically combined by an XOR gate to form a PreReLU bitmap bit 1303. This same signal can be used to disable the operation of the multiplier 1314, which would otherwise needlessly expend energy generating a negative output which would be set to zero by the ReLU logic before being input for multiplication in the next convolution stage 1390, among other examples.

Note that the representation of 1300, 1301, 1302, and 1303 (notation A) shows a higher level view of that shown in the representation donated B in FIG. 13. In this example, the input to block 1302 may include two floating-point operand. Input 1301 may include an explicit sign-bit 1310, a Mantissa 1311 including a plurality of bits, and an exponent again including a plurality of bits 1312. Similarly, input 1302 may likewise include a sign 1315, mantissa 1317, and exponent 1316. In some implementations, the mantissas, and exponents may have different precisions, as the sign of the result 1303 depends solely upon the signs of 1301 and 1302, or 1310 and 1315 respectively. In fact, neither 1301 nor 1302 need be floating point numbers, but can be in any integer or fixed point format as long as they are signed numbers and the most significant bit (MSB) is effectively the sign bit either explicitly or implicitly (e.g., if the numbers are one- or twos-complement, etc.).

Continuing with the example of FIG. 13, the two sign inputs 1310 and 1315 may be combined using an XOR (sometimes denoted alternatively herein as ExOR or EXOR) gate to generate a bitmap bit 1303, which may then be processed using hardware to identify down-stream multiplications that may be omitted in the next convolution block (e.g., 1390). The same XOR output 1303 can also be used to disable the multiplier 1314 in the event that the two input numbers 1313 (e.g., corresponding to 1301) and 1318 (e.g., corresponding to 1302) have opposite signs and will produce a negative output 1304 which would be set to zero by the ReLU block 1319 resulting in a zero value in the RELU output vector 13191 which is to be input to the following convolution stage 1390. Accordingly, in some implementations, the PreReLU bitmap 1320 may, in parallel, be transmitted to the bitmap scheduler 1360, which may schedules the multiplications to run (and/or omit) on the convolution unit 1390. For instance, for every zero in the bitmap 1320, a corresponding convolution operation may be skipped in the convolution unit 1390. In parallel, the bitmap 1320 may be consumed by an example address generator 1330, which controls the fetching of weights for use in the convolution unit 1390. A list of addresses corresponding to 1s in the bitmap 1320 may be compiled in the address generator 1330 and controls either the path to DDR storage 1370 via the DDR controller 1350, or else controls the path to on chip RAM 1380. In either case, the weights corresponding to ones in the PreReLU bitmap 1320 may be fetched and presented (e.g., after some latency in terms of clock cycles to the weight input 1371) to the convolution block 1390, while fetches of weights corresponding to zeros may be omitted, among other examples.

As noted above, in some implementations, a delay (e.g., 1361) may be interposed between the bitmap scheduler 1360 and the convolution unit 1390 to balance the delay through the address generator 1330, DDR controller 1350, and DDR 1350, or the path through address generator 1330 and internal RAM 1380. The delay may enable convolutions driven by the bitmap scheduler to line up correctly in time with the corresponding weights for the convolution calculations in the convolution unit 1390. Indeed, from a timing point of view, generating a ReLU bitmap earlier than at the output of the ReLU block 1319 can allow additional time to be gained, which may be used to intercept reads to memory (e.g., RAM 1380 or DDR 1370) before they are generated by the address generator 1330, such that some of the reads (e.g., corresponding to zeros) may be foregone. As memory reads may be much higher than logical operations on chip, excluding such memory fetches may result in very significant energy savings, among other example advantages.

In some implementations, if there is still insufficient saving in terms of clock cycles to cover the DRAM access times, a block oriented technique may be used to read groups of sign-bits (e.g., 1301) from DDR ahead of time. These groups of sign bits may be used along with blocks of signs from the input images or intermediate convolutional layers 1302 in order to generate blocks of PreReLU bitmaps using a set of (multiple) XOR gates 1300 (e.g., to calculate the differences between sign bits in a 2D or 3D convolution between 2D or 3D arrays/matrices, among other examples). In such an implementation, an additional 1-bit of storage in DDR or on-chip RAM may be provided to store the signs of each weight, but this may allow many cycles of latency to be covered in such a way as to avoid ever reading weights from DDR or RAM that are going to be multiplied by zero from a ReLU stage. In some implementations, the additional 1-bit of storage per weight in DDR or on-chip RAM can be avoided as signs are stored in such a way that they are independently addressable from exponents and mantissas, among other example considerations and implementations.

In one example, a system may be further enhanced to utilize DDR accesses, which may have a natural burst access for maximal data-transfer rate. Saving energy by skipping individual DDR weight accesses may not be feasible in this content as they may be shorter than a burst. Accordingly, in some instances, bursts may be skipped in cases where all bitmap bits corresponding to a particular burst transaction are zero. However, this may not occur frequently and hence, the resulting power and bandwidth savings may be limited. In still other implementations, a register programmable threshold may be set for the number of bitmap bits in a burst so that the burst will be skipped completely if more than N bits in the bitmap burst are zero. This may have the effect of slightly degrading overall CNN classification accuracy, but may be acceptable in the interests of saving energy.

In some implementations, the foregoing examples may utilize hash tables for the storage and access of at least some of the volumetric data used in these examples. Hash tables may be utilized, for instance, in low latency, low power, and resource constrained embodiments of the foregoing. Traditional hashing methods to store 3D volumetric data utilize large prime numbers in an attempt to achieve well-distributed hash addresses to thereby minimize addressing collisions. Traditional implementations leverage hashing techniques originally adapted for use in 2D data applications and utilize large primes, which act to create a hash address through randomizing key values. However, several such traditional implementations provide no evidence as to why they utilize such large primes. In some implementations, it is recognized that 3D data is inherently well distributed, as substantially all coordinates may be considered unique. Accordingly, implementations may adopt alternative hashing techniques for 3D data applications, which omit the use of large primes. Indeed, it may be that the use of primes for hashing 3D data in traditional implementation has persisted mainly due to habit rather than empirical grounds.

In an improved system, an addressing scheme may be implemented that takes advantage of the inherent order of 3D data and that omits the use of large primes. Such implementations may yield systems with more efficient storage, retrieval, and deletion of 3D volumetric data, among other example advantages. For instance, such an improved 3D addressing scheme may additionally produce significantly less addressing collisions than traditional hashing techniques, that utilize large primes.

In some computing systems, hashing algorithms and corresponding logic to perform these algorithms (i.e., implemented in specialized and/or general purpose hardware circuitry, firmware, and/or software) may be used to map data of an arbitrary size to a particular addressing space. Such hashing techniques may be used to store, retrieve, and delete data defining 3D spaces, such as 3D volumetric data. Such 3D volumetric data, such as 3D data implemented according to the VOLA format described herein. Additionally, hashing techniques may be used in connection with the storage, retrieval, and use of 3D data in connection with the applications discussed herein. In traditional applications, the common goal in the use of traditional hashing algorithms is to achieve distinct mapping addresses for the data. However, it is theorized that it is actually impossible to define a hash function that creates truly random data from nonrandom data. An example of this phenomenon is the "birthday paradox," which highlights the difficulty in achieving distinct addresses: if a random function is selected to map 23 keys to a table of size 365, the probability that no two keys map to the same location is only 0.4927.

In hashing (or "spatial hashing"), the address calculation is generally achieved by a randomized scrambling of key values, with many techniques using large primes to achieve this scrambling. In this context, hashing is a technique in which objects or points in a 2D or 3D domain space are projected into a 1D data table (or "hash table") allowing for very fast queries on objects in the domain space (e.g., location queries, proximity detection queries, etc.). When considering hashing for 3D data, well distributed addresses may be desirable to maintain data integrity. 3D volumetric data may inherently possess well-distributed voxel addresses. For instance, in example 3D volumetric data, each bit i may be unique, and the (x,y,z) coordinates of each voxel, may be unique. In one example implementation, an algorithm implemented in a system may take advantage of the unique voxel locations in example 3D volumetric data to provide an addressing scheme which minimizes addressing collisions. An addressing collision (or hash collision or, simply, "collision") within this context, references instances where a hash function employed in a hashing scheme generates the same index in a hash table for more than one key.

In some implementations, multiple different hash functions may be enabled within a system, and a particular one of the hash functions may be selected based on the application. Some applications are focused on maintaining data integrity (e.g., minimizing the number of hashing collisions), while others are focused on execution speed (e.g., speed of data retrieval), among other examples. Another consideration is to provide a technique that allows for ease of data insertion and removal, which may be paramount when considering dynamic data, among other examples. In some instances, a hash algorithm should be selected so that the hash values generated from the algorithm are uniformly distributed to encourage sufficiently promising performance. Indeed, an optimal solution may be to provide a perfect hashing function, which allows the retrieval of data in a hash table with a single query. Such a solution would provide a hash with no addressing collisions. Intuitively, this could be achieved by providing a suitably large hash table. However, this is not always practical as volumetric data is often used in memory confined situations, such as on mobile platforms, among other constrained systems.

Examples of traditional hashing schemes, which utilize primes in the hashing of 3D data include division hashing techniques, multiplicative hashing techniques, exclusive OR (XOR) hashing schemes, Morton Ordering hashing schemes, among other examples. In some implementations, a system may be provided that includes logic to implement any one of multiple different hashing schemes. In some instances, a successful hash function may be dependent on the application. In some contexts, the successfulness of a hash function may be measured or considered on the basis of data integrity, such as minimizing the number of voxels that are not stored in the hash table due to addressing collisions while maintaining a reasonable data footprint, among other examples. Additionally, the size of the hash table to be used may be of importance in managing the size of the data footprint, particularly in lightweight or resource-constrained system, such as resource constrained drone, robotic, autonomous passenger or freight vehicles, or other devices capable of autonomous movement within a 3D space. While one might assume that the larger the table, the less addressing collisions would occur when inserting data into the table, when the hash address is a modulus of the hash table size, the choice of hash table size can introduce biases. Therefore, bigger is not always better when choosing a hash table size and more efficient hash algorithms may enable the use of smaller hash tables, which are more friendly to resource-constrained architectures.

In some implementations, a hash table may be utilized in connection with a particular hashing algorithm, which enables information for more than one element (e.g., occupancy or other information for more than one voxel in a particular virtual or physical 3D space) to be stored in each entry of the hash table. For instance, one advantage of using hash table entries that store more than one element is the reduction in the number of external searches used to find the correct entry. The hash table entry size may be designed based on the number of voxels (and any other identifying data) and the number of bits used to store information for each voxel or other element. For instance, the example sparse-tree volumetric data structures discussed in this disclosure, may be considered and a corresponding hash table entry size utilized to accommodate data representing multiple voxels described in the volumetric data structure. As an example, a single hash table entry may be allocated 128 bits to accommodate the 2-bit per voxel representation of a $4^3$ block of contiguous voxels. There may be a limit to the number of voxels represented in data occupying a single entry of the hash table however, as some 3D data may be inherently sparse (e.g., the Dublin City Dataset is, on average, 98.74% sparse), but with a large distribution of voxels. Representing a more modest number of voxels (e.g., 64 voxels) may be efficient, while minimizing the effect of noise present in the form of outliers. For instance, in a 2-bit per voxel approach, in the 64 voxel per entry example, only 128 bits would be allocated for the noise. However, the larger the hash entry, the more memory may be potentially allocated to noisy voxels.

Figure 14:
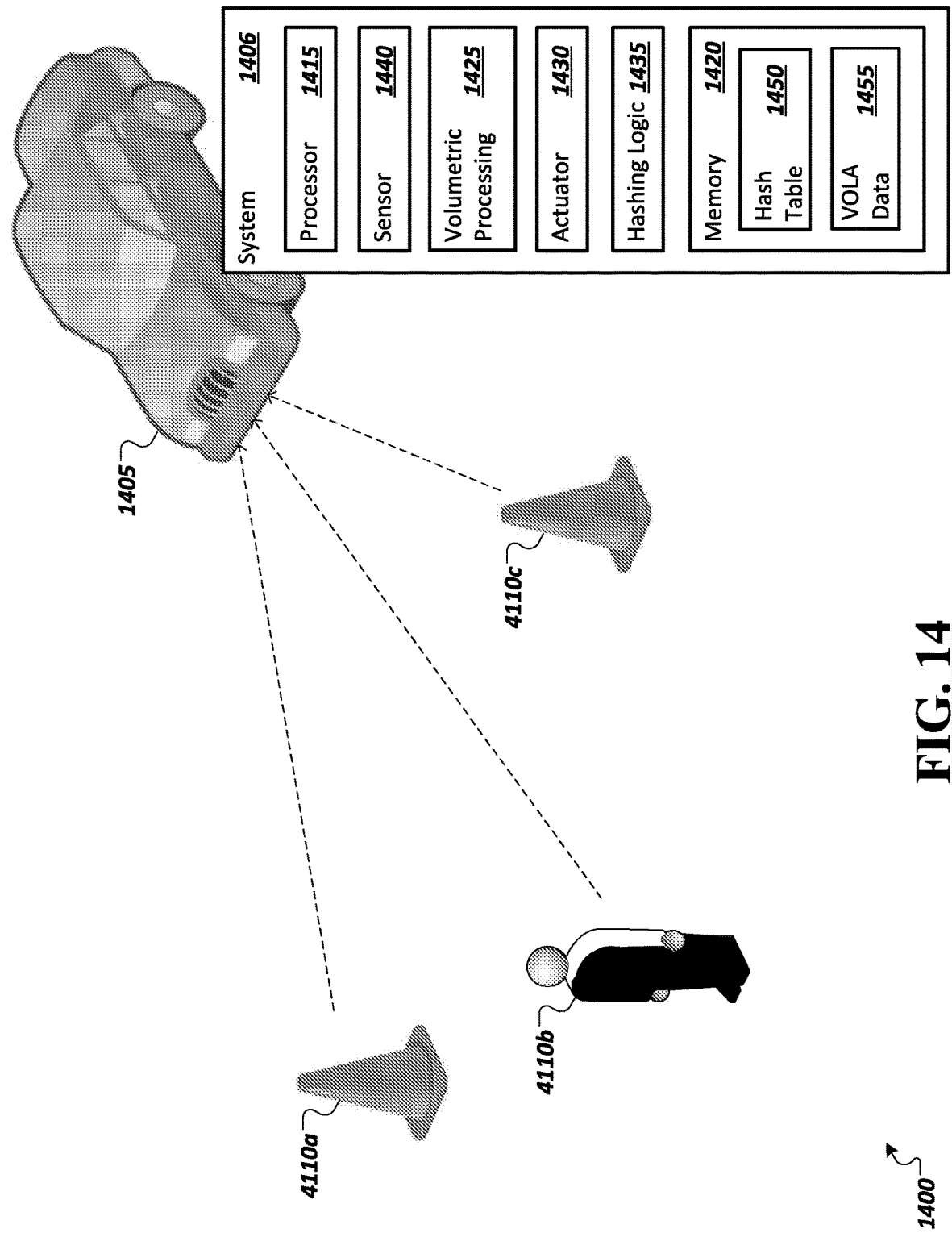
FIG. 14 illustrates an example system employing a hash table and associated logic.

Turning to FIG. 14, a simplified block diagram 1400 is shown illustrating an example environment involving a machine 1405 analyzing a 3D space. In some implementations, the machine may be equipped with machine-executable logic, implemented in hardware and/or circuitry, to utilize volumetric data describing the 3D space in one or a variety of applications or actions, such as a SLAM process, raycasting, collision detection, 2D- or 3D-route planning, among other examples, such as discussed herein. The volumetric data may be embodied as a sparse tree representation, such as discussed herein. In some instances, a hash table may also or alternatively be used to perform quicker processing of volumetric data by trading off increased memory occupation (e.g., as the hash table uses less memory than the dense array). In some instances, the hash table may be used together with a multi-layer sparse tree-based structure, with the hash table being used to quickly identify occupied voxels at a particular resolution and then using the sparse tree representation to determine voxel occupancy at higher resolutions and performing more precise analysis when called upon, among other examples. Indeed, the machine 1405 may include hardware and logic discussed herein configured to handle and process volumetric data represented in a sparse tree volumetric data structure.

In the particular example illustrated in FIG. 14, the machine 1405 may be implemented as an autonomous or semi-autonomous machine capable of processing volumetric data describing a 3D scene and utilizing this information to autonomous move within the scene (e.g., change its position within the scene and/or change the orientation (e.g., aim) of one or more of the machine's elements (e.g., a sensor, camera, pointer, actuator, tool, etc.) based on geography present within the scene. By so doing, the machine may detect objects (e.g., 1410*a*-*c*) and navigate or interact with the scene autonomously based on the detected objects. In some implementations, the machine 1405 may be embodied as an autonomous vehicle (for carrying passenger or cargo), an aerial, ground-based, or water-based drone, a robot, among other examples.

In one example implementation, the machine 1405 may include a computing system 1406 implemented using a data processor 1415, such as one or more central processing units (CPUs), graphical processing units (GPUs), tensor processing units or other matrix arithmetic processors, hardware accelerators (e.g., volumetric processing accelerator, machine learning accelerator), among other example general purpose and specialized processing hardware, and further implemented using one or more memory elements (e.g., 1420). Additional logical blocks may be provided, which are implemented in hardware circuitry, firmware, or software, such as volumetric processing logic 1425, actuator 1430, and hashing logic 1435. In some implementations, the machine 1405 may additionally include one or more sensors (e.g., 1440) to measure the 3D space (e.g., lidar, time of flight sensors, realsense sensors, etc.). Such sensors 1440 may be used to generate the volumetric data describing the 3D environment to develop a map of the volume as well as for comparing locally observed geometry detected using the sensors 1440 with reference data describing an expected or previously observed version of the volume's occupied geometry. The volumetric data generated and/or used by the machine may be maintained at least partially in one or more hash tables 1450. As noted above, volumetric data in hash table entries may be supplemented, in some implementations, by high resolution volumetric data, such as through sparse tree volumetric data, such as discussed herein, such as sparse tree volumetric data in the VOLA format (e.g., data 1455).

Continuing with the example of FIG. 14, in one example volumetric processing logic 1425 may be provided with logic to perform one or multiple different volumetric processing operations or tasks, such as tasks pertaining to 3D convolutions, raycasting, SLAM, collision detection, autonomous navigation, etc. In one example, a volumetric acceleration unit, such as the volumetric acceleration unit (VXU) described herein, may be utilized to implement at least a portion of volumetric processing logic 1425. Volumetric processing logic may take, as an input, volumetric data embodied in either or both hash table entries, VOLA data 1455, among other examples. In some instances, results generated by the volumetric data may cause one or more actuators 1430 of the machine 1405 to be triggered to cause one or more motors, engines, or other drives and/or one or more steering mechanisms to be activated and cause the machine itself or specific tools of the machine to move within the volume in accordance with its design. For instance, volumetric processing logic may provide inputs to one or more actuators to cause a drone or autonomous vehicle to self-navigate a volume understood by the machine through the processing of the volumetric data.

In some instances, such as in a resource-constrained system or applications demanding fast response times, rather than initially processing high resolution volumetric data, the system may instead rely on lower resolution volumetric data, which it can query and access quickly. For instance, various volumetric applications may involve detecting whether one or more voxels in a 3D space are empty or occupied with 3D geometry (e.g., either physical or virtual). In such instances, volumetric processing logic 1425 may operate with hashing logic 1435 to query volumetric data maintained in entries of the hash table 1450 and access the volumetric data for processing. Further, hashing logic 1435 may be used to insert new hash table entries with volumetric data generated by sensors 1440 of the system, and any other kind of spatial 3D data such as radar, ultrasound, etc., among other examples. In some implementations, the hashing logic 1435 may be implemented with hardware, firmware, and/or software to implement a density coordinate (DECO)-based hashing algorithm, such as discussed in more detail below.

A hash table (e.g., 1450) may be implemented to include data, which represents voxels using one or more bits per voxel. In one example, one bits per voxel may be utilized to represent voxel occupancy, while another on bit per voxel is used for table entry identifiers to enable addressing collision detection. In some implementations, volumetric data stored in an entry may be formatted and/or organized based, at least partially, on a VOLA or other sparse tree data structure format. Other examples may utilize additional bits to indicate additional information for each voxel or enable collision detection and resolution. For instance, additional bits may be allocated, per voxel, to identify voxel characteristics such as color, material, or type, among other examples, although adding such information may be superfluous to the machine's use of the hash table and may be overly memory-intensive, depending on the application. In an example, where 2-bits are allocated for each voxel in a table entry accommodating representation of a subset or block of 64 voxels in a volume, the memory requirements for a single entry would be 128 bits (0.016 kB), allowing each kB of hash table memory to accommodate 62.5 buckets or entries, and 64 kB to facilitate 4000 buckets, or entries, etc.

In some implementations, an improved hashing algorithm may be employed to enable quick access to volumetric information described in volumetric data captured by one or more sensors. For instance, a density coordinate (DECO) hashing algorithm may be provided and implemented in hardware and/or software of a computing device to exploit the inherent structural aspects of 3D volumetric data. For instance, an example DECO hashing algorithm may take advantage of how densely/sparsely occupied much 3D volumetric data is, and also exploit how the uniqueness of the respective coordinate values of every voxel in a volume. For instance, the sparse nature of much 3D data may be exploited through only representing occupied voxels. This frees up valuable memory for other purposes. In one example, volumetric data representing one or more voxels in a volume may be stored in an entry in a hash table, and the address of the entry may be generated from an index derived through an example DECO hashing algorithm. In one example, the DECO hashing algorithm can effectively concatenate the values of coordinate associated with the voxel (i.e., the x-, y-, and z-coordinates in the volume associated with the voxel), where the coordinate values are weighted using a side length (SL) variable and the weighted values are summed to generate the index. The manner of weighting the constituent coordinate values may be based on the observed or predicted density or variance of 3D geometry within the volume along one or more of the axes of the volume. For instance, it may be observed that 3D geometry within a volume is more dense or diverse within the x- or y-dimensions of the volume, with the z-dimension being more sparse. Weightings may be selected so as to minimize collisions in the hashing function, based on the observed or predicted density of the volume.

As a specific example, a DECO hashing algorithm may be implemented according to the formula:

$$\text{index} = (ID_z * (SL^2) + ID_y * (SL) + ID_x)$$

where $ID_x$, $ID_y$, and $ID_z$ are the x-, y-, and z-coordinate values associated with a subject voxel, and SL is the side length variable. The side length variable SL may potentially be any value and may be selected to minimize collisions in the resulting hash table. In some implementations, the SL value may be selected to correspond to the length (e.g., in voxels or voxel blocks) of a side of the subject volume. The hash table address may be generated from the calculated index value using a modulus operation, such as according to the example formula:

$$\text{hash\_addr} = \text{index} \% N$$

where N is the number of entries/addresses in the hash table to be indexed, among other example implementations.

In the example hashing formula above, the z-coordinate value may be weighted most heavily by squaring the side length variable (SL) before multiplying it with the z-coordinate value $ID_z$. This may be done based on an assumption that occupied space within the 3D volume is either or both less dense or less variable in the z-coordinates of the volume. Such a weighting may serve to reduce the potential for collisions in hash addresses determined for corresponding volumetric data for the hash table. In other implementations, where occupied space or 3D geometry is denser in the z-coordinate plane, but less dense in either the x- or y-coordinates, the z-coordinate value may be weighted less heavily (e.g., multiplied by $SL^0$ rather than $SL^2$), while the other coordinate values (x- and y-) are weighted more heavily, among other examples. Indeed, historical observations or predictions for density characteristics within a volume may be identified and this information may be used to dynamically select a DECO hashing formula that weights the respective coordinate values appropriately. Further, the SL value may also be dynamically determined based on assumptions determined for the subject volume so as to encourage optimization in limiting the number of collisions in hash addresses determined using the DECO hash algorithm, among other example considerations and implementations.

Figure 15:
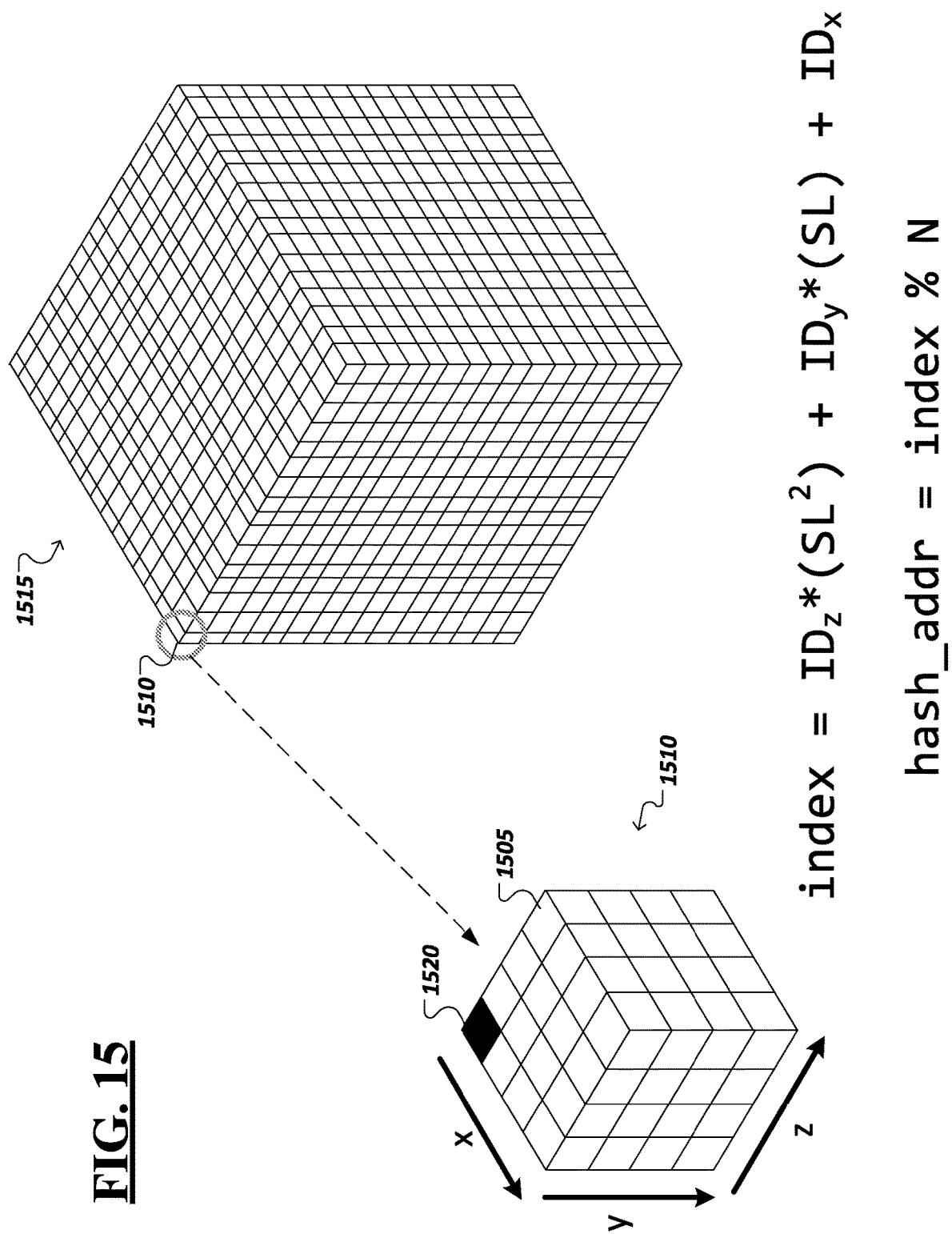
FIG. 15 illustrates aspects of an example hashing algorithm in accordance with some embodiments.

As noted herein, it may be advantageous for a single hash table entry to possess volumetric data to simultaneously describe multiple voxels within a volume. For instance, as illustrated in the example of FIG. 15, hash table entries may permit volumetric data to be contained within the entry for a set, or block, of 64 voxels within a sub-volume defined by the $4^3$ block of voxels. In this example, rather than performing a hash using the coordinates of a single, specific subject voxel, the algorithm takes as the coordinate values x-, y-, and z- the relative coordinates of that block of voxels within the geometry. For instance, in the example illustrated in FIG. 15, individual voxels (e.g., 1505) within a 3D space may be logically grouped as sets (or "blocks") of 64 voxels representing a 4×4×4 block (e.g., 1510) of voxels. When identifying a specific voxel, the coordinates of that voxel may be mapped to a corresponding one of the 4×4×4 blocks defined for the volume 1515, such as represented in FIG. 15. For instance, when it is determined that a voxel (e.g., 1505) is occupied and must be added to the hash table, it is first determined which 4×4×4 block (e.g., 1510) it belongs to. In an example of a $64^3$ voxel volume 515 or environment, there would be $16^3$ $4^3$ blocks. For instance, the identifier, or coordinate value, of the block may be taken as the coordinates of the corner node of the block (e.g., voxel 1520), discretized with respect to the size of the blocks. For instance, in the case of using $4^3$ blocks, the voxel block identifier is discretized with respect to 4. In an example with $64^3$ voxel volume 1515 (as in the example illustrated in FIG. 15), the coordinates (referred to as identifier (ID) coordinates) of these blocks will range from (x; y; z)=(0; 0; 0) to (x; y; z)=(63/4; 63/4; 63/4)=(15; 15; 15).

As introduced above, the side length (SL) variable may be adjusted and selected in the use of a DECO hashing to attempt to optimize the algorithm and achieve a minimum number or percentage of collisions during hashing. For instance, in an implementation where information for a block of voxels are stored in a single hash table entry, selection of a side length corresponding to the number of voxel blocks on a side of the overall subject volume may yield a minimum percentage of collisions. In one example, a hash table size of 32 kB (2040 table entries) may be used to store information describing the Stanford Bunny volume. The volume is considered at a resolution where the bunny fits within a $16^3$ volume of $4^3$ voxel blocks. Testing a DECO hashing algorithm against varying SL values reveals that an SL value of 16 for this example yields a minimum percentage of collisions (e.g., 0.79%). More generally, an optimum SL value may correspond to the cubed root of the number of voxel blocks in the subject volume. This is because, for example, in an environment of $64^3$ voxels, there exist a maximum of $16^3$ $4^3$ blocks of voxels. Therefore, if 16 is taken as the value of SL, no collisions will occur when calculating the current block's index (i.e., using a DECO hashing formula such as discussed above), but collisions can still occur when calculating the hash table address.

In DECO hashing implementations, once the coordinates of the $4^3$ block that an occupied voxel belongs to have been determined, its index relative to the other $4^3$ blocks is determined (which, in some examples, may be derived directly from the values of the individual subject voxel's coordinates (e.g., by removing one or more of the least significant bits from a binary representation of the voxel's coordinates to truncate the binary representation to identify the coordinates of the corresponding $4^3$ voxel block). For instance, in the example of FIG. 15, each individual voxel coordinate may be represented using a 32-bit value and each voxel in a given block may have individual voxel coordinate values which share the same 30 most significant bits. Accordingly, these shared 30 common bits may serve as the block's coordinate value within the volume (and the 2 remaining least significant bits may identify each individual voxel uniquely within the block), among other examples.

Continuing with the example above, when the block coordinates are determined for a block incorporating a particular voxel of interest, these block coordinate values may be provided as the values for $ID_x$, $ID_y$, and $ID_z$ (e.g., in the example above). Further, as represented in FIG. 15, the side length value may be based on a length of the subject volume as expressed in $4^3$ voxel blocks (e.g., 16 voxel blocks per side, resulting in a $16^3$ collection of $4^3$ voxel blocks), among other examples. Indeed, similar principles may be applied based on the size of the selected voxel block (e.g., $2^3$, $3^3$, $8^3$ voxel blocks, etc.), the size of the hash table and its constituent entries, and the size and dimensions of the subject volume, among other considerations.

Using the DECO hashing function, an index may be derived from which a hash table address is determined (e.g., using a modulus operation) to identify the specific entry within the hash table that includes (if it has been measured already) volumetric data for the corresponding block of voxels. Accordingly, the entry's volumetric data may describe the respective occupancy status of each of the voxels within that block. This line of volumetric data may be read by (or written to) by a machine to identify, within the line of volumetric data, occupancy (and potentially other) information for a specific voxel within the identified voxel block (along with similar information for each of the other voxels in that block).

A DECO hashing algorithm may realize a number of advantages over traditional hashing algorithms for 3D data (i.e., data representing and describing a 3D volume), including hashing algorithms making use of large prime numbers. For instance, in some implementations, insertions within a hash table using DECO hashing may be simplified over traditional approaches. Specifically, once it is determined that a voxel is occupied (e.g., through a sensor on the machine performing the hash function or through a machine receiving data from a sensor on a remote machine, etc.) and should be inserted into the hash table, the hash address of the $4^3$ block that the voxel belongs to is calculated. This calculation may be dependent on the hashing function chosen. If a collision does not occur, the bit corresponding to that voxel in the hash entry is set to one. If a collision occurs the voxel cannot be set, and a collision management scheme provided in connection with the hash table may be utilized to deal with the collision (e.g., through storing the data to be inserted in the next available sequential entry, through the use of "degenerative addresses" (e.g., if a collision occurs in entry 2748, the voxels would be placed in entry 274, from which overflows would be placed in entry 27, etc.), among other example schemes). For deletions, when it is determined that a voxel is to be deleted from the hash table, once again the hash address of the $4^3$ node that the voxel belongs to is calculated. If a collision does not occur, and the bit is already set, the bit corresponding to the voxel in the hash address is simply unset. If a collision does not occur, and the bit is not set, or the hash address is empty, an attempt is being made to delete a voxel that was never set—once this is identified no further calculations are made.

Figure 16A:
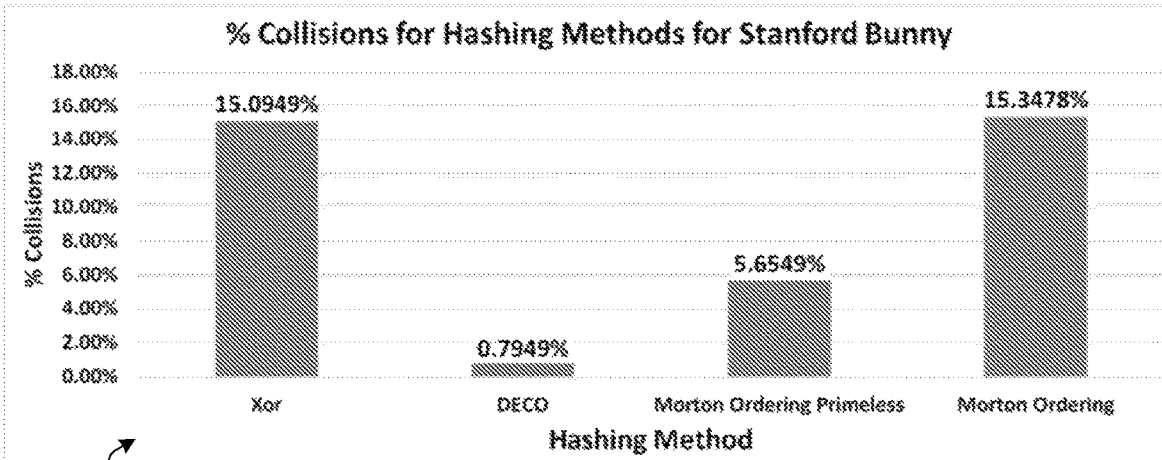
FIGS. 16A-16C illustrate graphs showing performance of example hashing algorithms.
Figure 16B:
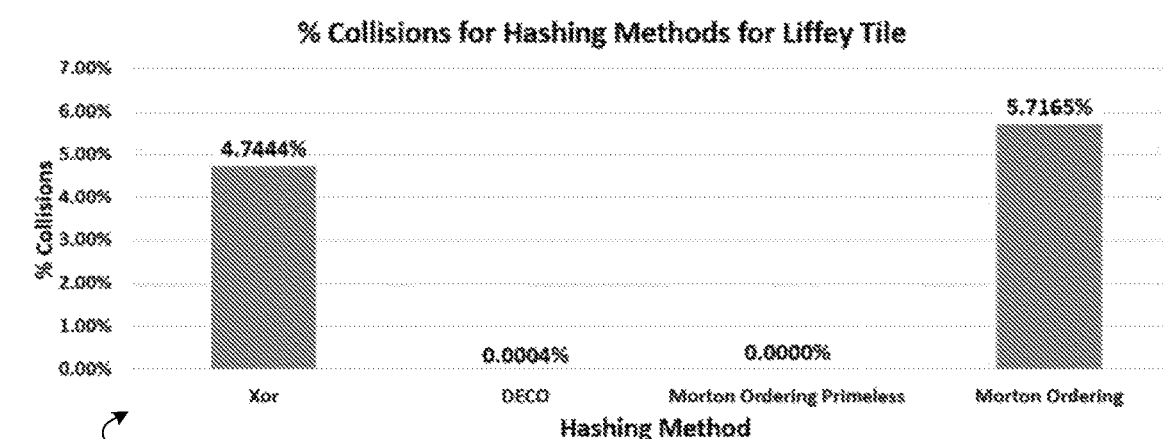
Figure 16C:
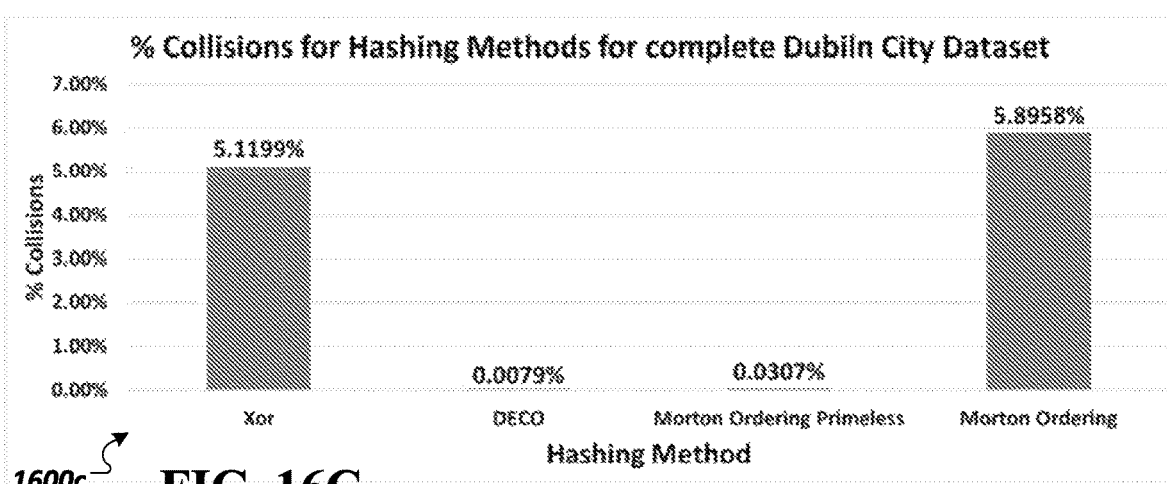

A DECO hashing may be superior to traditional 3D hashing algorithms, by realizing significant reduction in collisions. For instance, as illustrated in the graphs 1600a-c of FIGS. 16A-16C, collision performance observed in use of an example DECO hashing algorithm is compared with performance of traditional hashing algorithms, such as an XOR hashing algorithm, a Morton Ordering primeless hashing algorithm, and a traditional Morton Ordering hashing algorithm. In these examples, each of the subject hashing algorithms utilize similarly sized hash tables. FIG. 16A illustrates results with a dataset comprised of the Stanford Bunny dataset and represents the percentage of collisions when each of the algorithms was used. Similarly, FIG. 16B illustrates a comparison of the percentage of collisions observed using each of the hashing algorithms in a volume defined by the Dublin City Dataset Liffey Tile. Last, FIG. 16C represents the comparative percentage of collisions observed for the hashing algorithms across the complete Dublin City Dataset (e.g., representing a #D map of the city of Dublin, Ireland). As is illustrated, the DECO hashing algorithm performs superiorly over trusted traditional 3D hashing algorithms.

In addition to the selection of an appropriate hashing algorithm, the hash table size can also impact the number of addressing collisions, as the corresponding address results can vary greatly when taking the modulus of numbers that differ only slightly. However, hash table size may represent a tradeoff between resource usage and performance optimization. For instance, the impact of varying the hash table sizes may be investigated for a particular dataset across multiple competing hashing algorithms. In one example, it may be found that a sub 1% collision rate may be achieved with DECO Hashing for a particular dataset using a hash table as small as 1.2 MB. However, to achieve the same results using a different, traditional hashing algorithm (e.g., XOR hashing) a significantly larger hash table may be required (e.g., with a size greater than 4 MB). Such a result emphasizes the superiority of DECO hashing over XOR hashing for hashing 3D volumetric data.

As another example advantage of DECO Hashing over other traditional 3D hashing approaches, the distribution of the voxels stored in a hash table populated using DECO hashing may be significantly more compact that is able to be achieved using traditional hashing approaches. While some traditional hashing approaches, such as Morton Ordering Primeless Hashing, also stores the voxels in a compact manner within the hash table, such traditional approaches tend to leave large gaps between occupied and unoccupied hash entries. Through the superior compactness achieved using DECO hashing, in some instances, the resulting hash table may be much more compact in some areas in the hash table, and highly sparse in other areas. Accordingly, when such instances are detected, the system may dynamically reassign more sparsely occupied areas of the table for other uses, such as a secondary hash table where the voxels can be more densely compacted. Such approach would free memory from the primary hash table for other purposes, which is an attractive proposition for embedded, mobile, and similarly memory-constrained devices.

Figure 17:
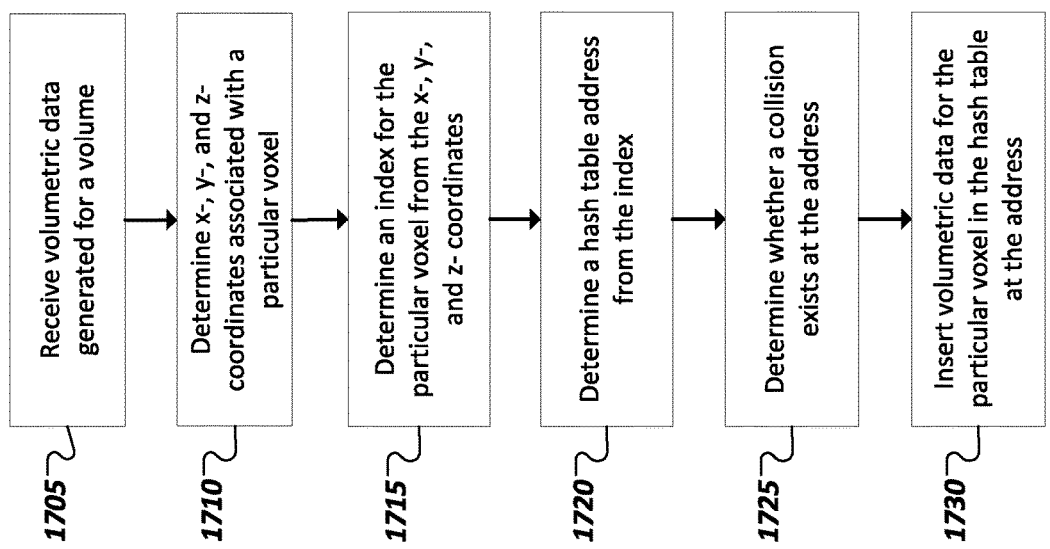
FIG. 17 is a flowchart illustrating an example technique for inserting volumetric data within a hash table in accordance with some embodiments.

Turning to FIG. 17, a flowchart 1700 is shown illustrating an example technique for entering volumetric data describing one or more voxels into a hash table using a DECO hashing algorithm, such as described above. Volumetric data may be received 1705 (e.g., from a sensor), which describes at least a portion of a volume and identifies geometry present within the volume. For instance, the volumetric data may indicate whether a particular voxel within the volume is occupied with geometry or not. Coordinates associated with the particular voxel may be determined 1710, expressed as x-, y-, and z-coordinates within the volume. In some instances, the coordinates may be the coordinates of a block of voxels and the particular voxel may be included within this block of voxels (i.e., rather than the coordinates being the specific coordinates of the particular voxel). An index for the particular voxel may be determined 1715 using a DECO hashing algorithm, which takes as inputs the values of the x-, y-, and z-coordinates. The hashing algorithm may sum weighted values of the x-, y-, and z-coordinates to generate the index, where the x-, y-, and z-coordinates are weighted by weighting variable value (e.g., the side length variable value) to the 0, $1^{st}$, or $2^{nd}$ power. A hash table address may be determined 1720 from the index value (e.g., using a modulus operation) to identify the entry within the hash table to be associated with the coordinates (and the particular voxel's volumetric data). Before writing or inserting the volumetric data into the entry, it may be determined 1725 whether the entry has already been written to and populated with volumetric data of other voxels, indicating a collision. If there is a collision, a collision management scheme may be employed to nonetheless store the volumetric data describing the particular voxel (e.g., in a substitute entry of the hash table). If these is no collision, the volumetric data may be inserted 1730 into the entry to store the volumetric data within the hash table to enable fast queries for and access to the volumetric data and the information it represents. In some implementations, the volumetric data may be according to a VOLA-based format (e.g., describing occupancy of a group or block of $4^3$ voxels at a particular resolution).

Figure 18:
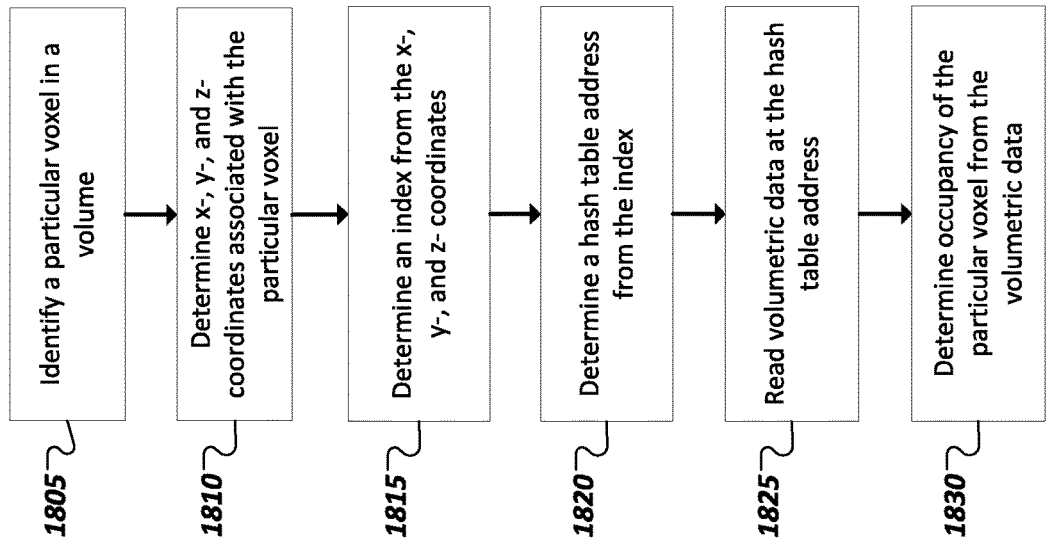
FIG. 18 is a flowchart illustrating an example technique for accessing volumetric data from a hash table in accordance with some embodiments.

Turning to the example of FIG. 18, another flowchart 1800 is shown illustrating an example technique for querying and accessing volumetric data corresponding to a particular voxel in a 3D space (or volume). For instance, the particular voxel may be identified (e.g., in connection with a volumetric operation or application (e.g., autonomous navigation, pathfinding, ray casting, etc.) and the respective coordinates (i.e., x-, y-, and z-coordinates) of the particular voxel may be determined 1810. As in other examples, these coordinates may be the coordinates of the voxel block of the particular voxel, rather than the coordinates of the particular voxel itself (although, as discussed above, coordinates of a voxel block may be determined directly from the specific coordinates of a constituent voxel). An index may be determined 1815 from the x-, y-, and z-coordinate values using a DECO hashing algorithm by calculating a summation from weighted values of the x-, y-, and z-coordinates (e.g., weighted using a side length variable or other weighing variable), such as discussed herein. Further, a hash table address may be derived 1820 from the determined index value (e.g., through a modulus of the index value). With the address determined, volumetric data may be read from the entry corresponding to the determined address in the hash table. In some instances, it may be determined that the entry is empty, causing volumetric data for the particular voxel to be collected to populate the hash table. In other instances, it may be determined that there is a collision in the hash table if the entry corresponding to the determined address is populated with volumetric data of a different block of voxels, among other example issues. However, in collision-free operation, volumetric data within the hash table entry may be read 1825 and processed to determined 1830 (e.g., from particular bits in the volumetric data mapped to the particular voxel) whether the particular voxel is occupied with geometry or not. Such a determination (at 1830) may be used to trigger additional action (e.g., path finding, collision avoidance, accessing a multi-level VOLA structure to analyze the voxel volume at a higher resolution, among other example uses). Indeed, the present disclosure includes multiple examples of the use of VOLA data in computing systems. It should be appreciated that volumetric data accessed from a hash table (such as one generated using DECO hashing) may be likewise utilized in the applications and examples discussed herein. Indeed, the following figures and description provide additional examples of use cases and hardware, which may utilize volumetric data accessed from a hash table constructed using DECO hashing.

Figure 19:
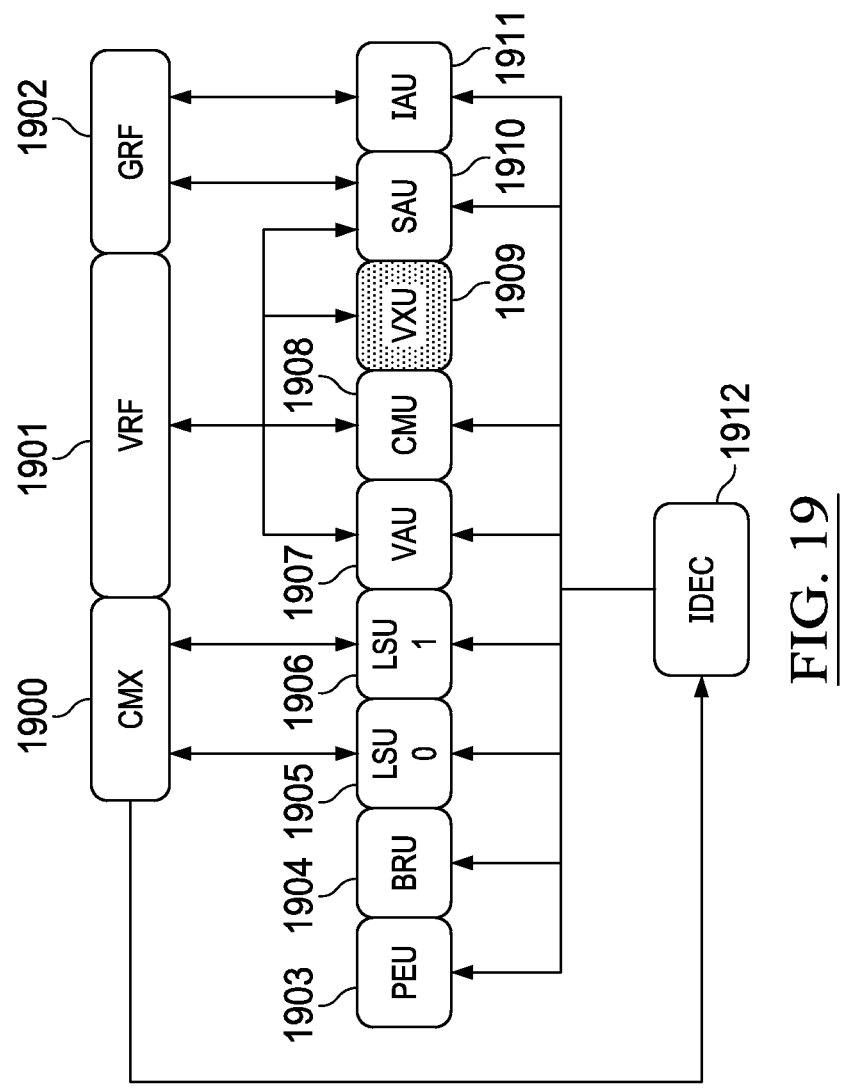
FIG. 19 depicts an example multi-slot vector processor in accordance with some embodiments.

FIG. 19 is a simplified block diagram representing an example multislot vector processor (e.g., a very long instruction word (VLIW) vector processor) in accordance with some embodiments. In this example the vector processor may include multiple (e.g., 9) functional units (e.g., 1903-1911), which may be fed by a multi-ported memory system 1900, backed up by a vector register file (VRF) 1901 and general register file (GRF) 1902. The processor contains an instruction decoder (IDEC) 1912, which decodes instructions and generates control signals which control the functional units 1903-1911. The functional units 1903-1911 are the predicated execution unit (PEU) 1903, branch and repeat unit (BRU) 1904, load store port units (e.g., LSU0 1905 and LSU1 1906), a vector arithmetic unit (VAU) 1907, scalar arithmetic unit (SAU) 1910, compare and move unit (CMU) 1908, integer arithmetic unit (IAU) 1911, and a volumetric acceleration unit (VXU) 1909. In this particular implementation, the VXU 1909 may accelerate operations on volumetric data, including both storage/retrieval operations, logical operations, and arithmetic operations. While the VXU circuitry 1909 is shown in the example of FIG. 19 as a unitary component, it should be appreciated that the functionality of the VXU (as well as an of the other functional units 1903-1911) may be distributed among multiple circuitry. Further, in some implementations, the functionality of the VXU 1909 may be distributed, in some implementations, within one or more of the other functional units (e.g., 1903-1908, 1910, 1911) of the processor, among other example implementations.

Figure 20:
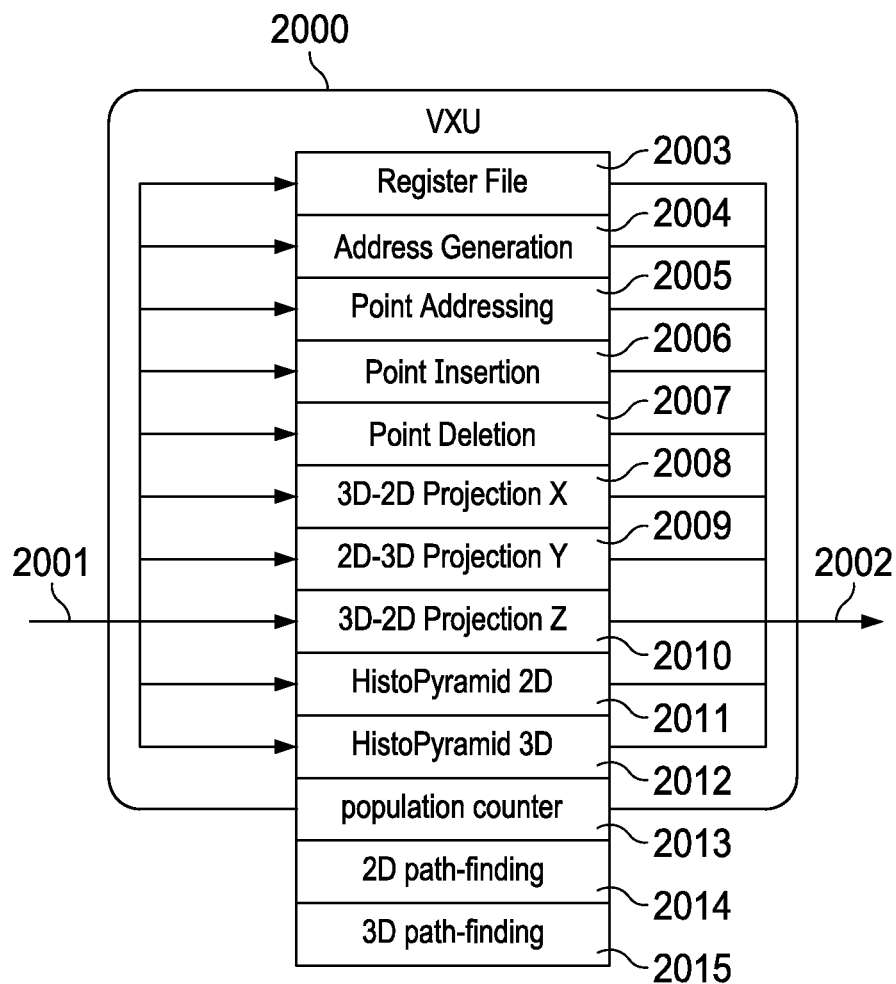
FIG. 20 illustrates an example volumetric acceleration hardware in accordance with some embodiments.

FIG. 20 is a simplified block diagram illustrating an example implementation of a VXU 2000 in accordance with some embodiments. For instance, VXU 2000 may provide at least one 64-bit input port 2001 to accept inputs from either the vector register file 1901 or general register file 1902. This input may be connected to a plurality of functional units including a register file 2003, address generator 2004, point addressing logic 2005, point insertion logic 2006, point deletion logic 2007, 3D to 2D projection logic in X dimension 2008, 3D to 2D projection logic in Y dimension 2009, 3D to 2D projection logic in X dimension 2010, 2D histogram pyramid generator 2011, 3D histopyramid generator 2012, population counter 2013, 2D path-finding logic 2014, 3D path-finding logic 2015 and possibly additional functional units to operate on 64-bit unsigned integer volumetric bitmaps. The output from the block 2002 can be written back to either the vector register file VRF 1901 or general register file GRF 1902 register files.

Figure 21:
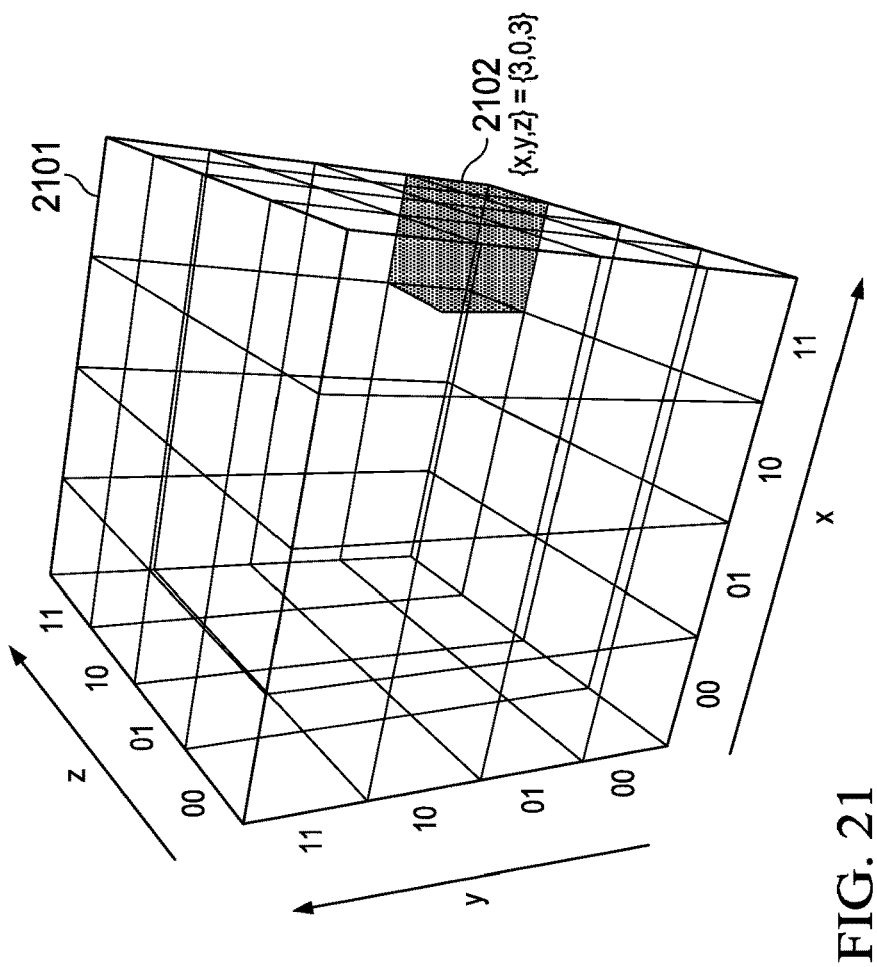
FIG. 21 illustrates the organization of a voxel cube in accordance with some embodiments.
Figure 21:
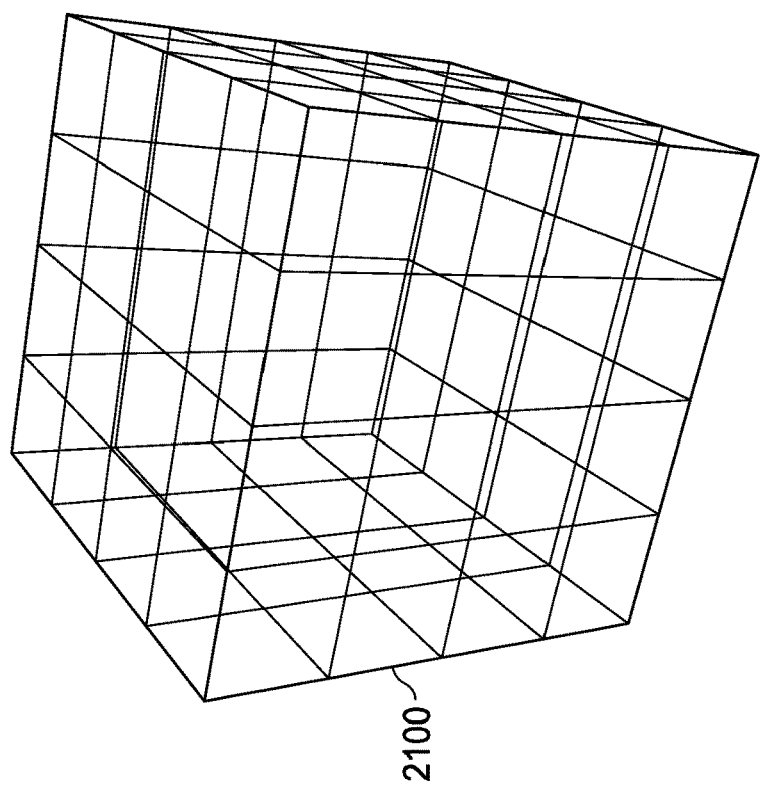
Figure 22:
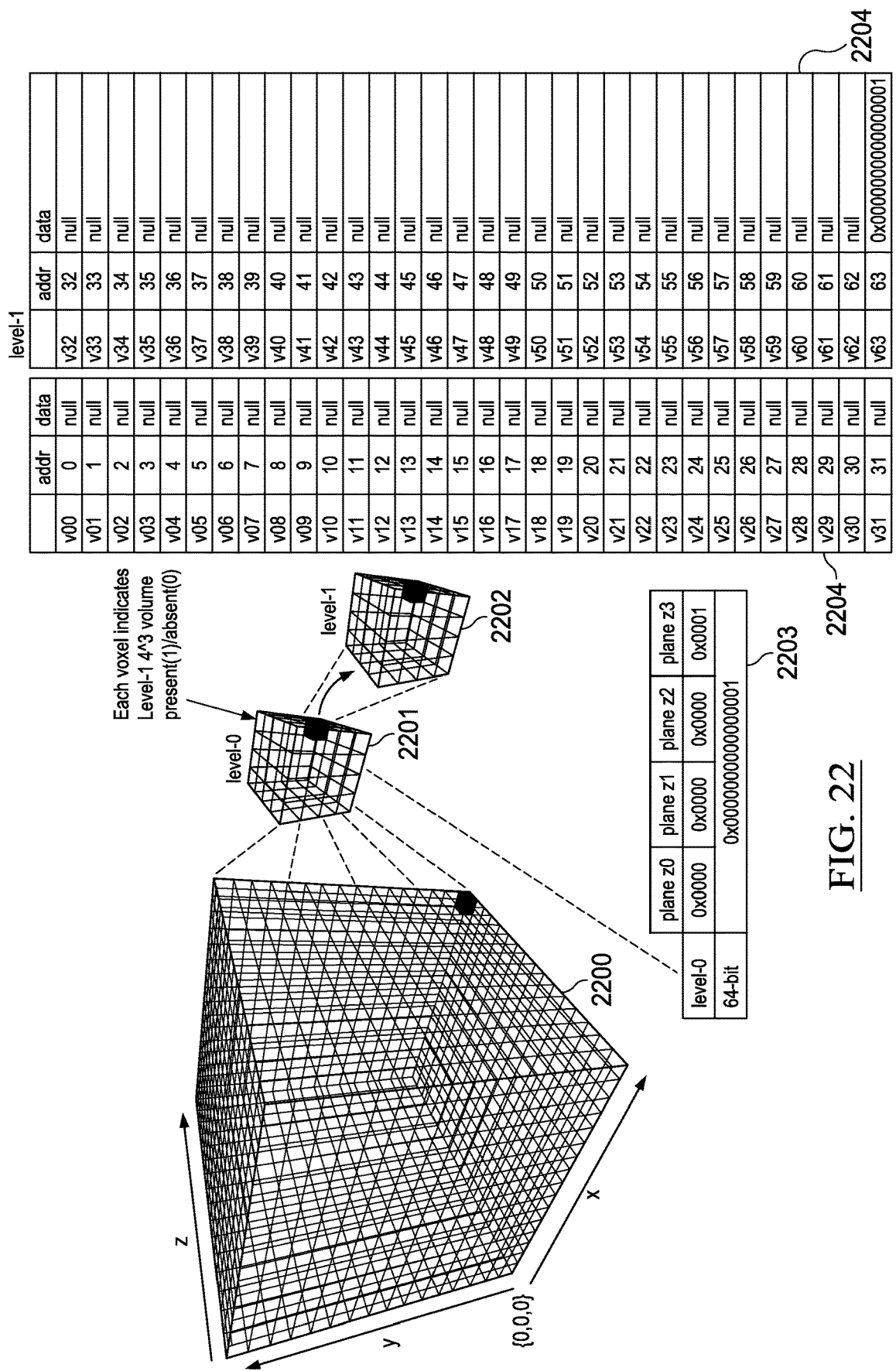
FIG. 22 illustrates a two-level sparse voxel tree in accordance with some embodiments.

Turning to the example of FIG. 21, a representation of the organization of a 4^3 voxel cube 2100 is represented. A second voxel cube 2101 is also represented. In this example, a voxel cube may be defined in data as a 64-bit integer 2102, in which each single voxel within the cube is represented by a single corresponding bit in the 64-bit integer. For instance, the voxel 2012 at address $\{x,y,z\}=\{3,0,3\}$ may be set to "1" to indicate the presence of geometry at that coordinate within the volumetric space represented by the voxel cube 2101. Further, in this example, all other voxels (beside voxel 2102) may corresponding to "empty" space, and may be set to "0" to indicate the absence of physical geometry at those coordinates, among other examples. Turning to FIG. 22, an example two-level sparse voxel tree 2200 is illustrated in accordance with some embodiments. In this example, only a single "occupied" voxel is included within a volume (e.g., in location $\{15,0,15\}$). The upper level-0 of the tree 2201 in this case contains a single voxel entry $\{3,0,3\}$. That voxel in turn points to the next level of the tree 2202 which contains a single voxel in element $\{3,0,3\}$. The entry in the datastructure corresponding to level 0 of the sparse voxel tree is a 64-bit integer 2203 with one voxel set as occupied. The set voxel means that an array of 64-bit integers is then allocated in level 1 of the tree corresponding to the voxel volume set in 2203. In the level 1 sub-array 2204 only one of the voxels is set as occupied with all other voxels set as unoccupied. As the tree, in this example, is a two level tree, level 1 represents the bottom of the tree, such that the hierarchy terminates here.

Figure 23:
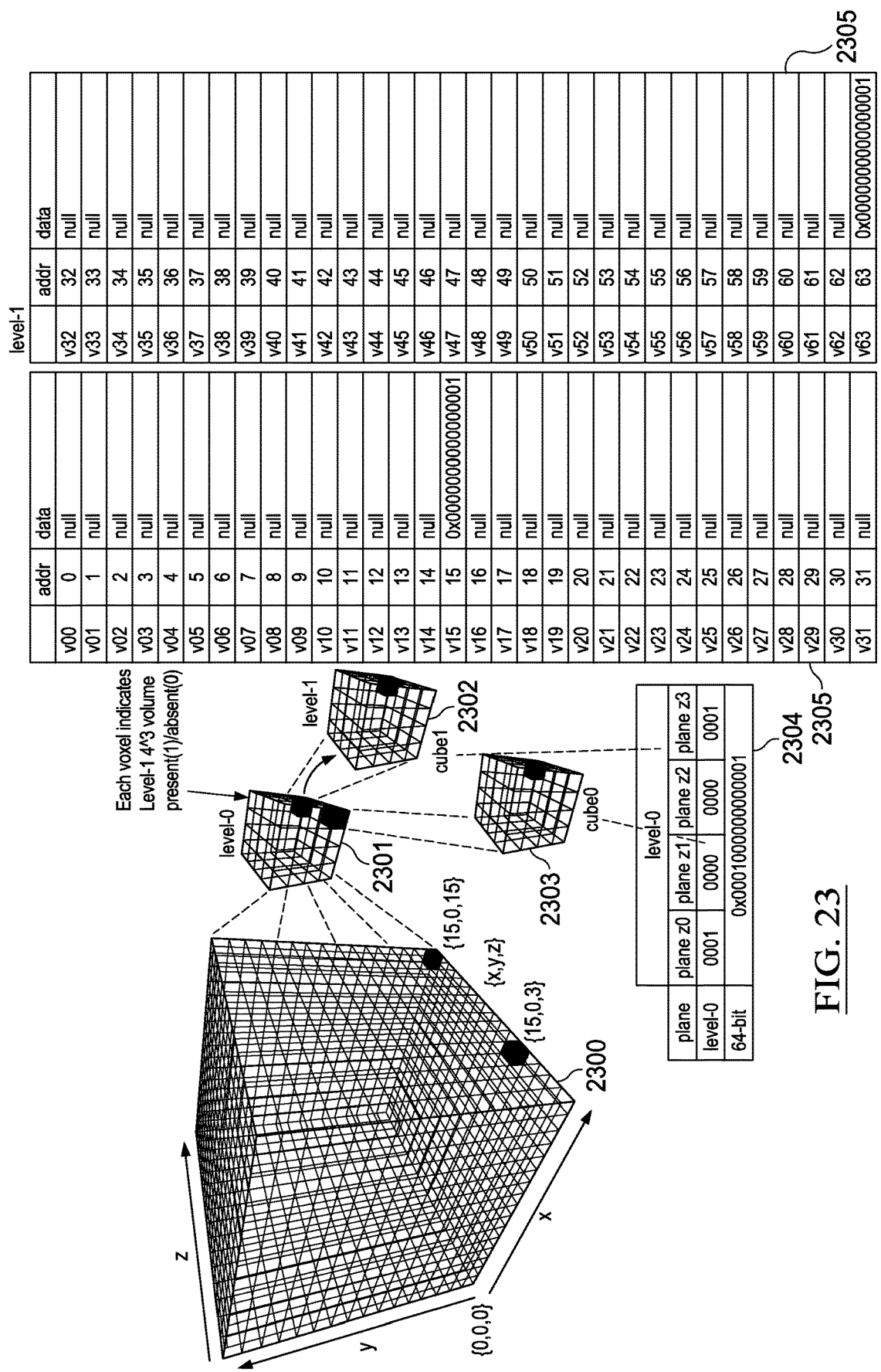
FIG. 23 illustrates a two-level sparse voxel tree in accordance with some embodiments.

FIG. 23 illustrates a two-level sparse voxel tree 2300 in accordance with some embodiments which contains occupied voxels in locations $\{15,0,3\}$ and $\{15,0,15\}$ of a particular volume. The upper level-0 of the tree 2301 in this case (which subdivides the particular volume into 64 upper level-0 voxels) contains two voxel entries $\{3,0,0\}$ and $\{3,0,3\}$ with corresponding data 2304 that shows two voxels are set (or occupied). The next level of the sparse voxel tree (SVT) is provided as an array of 64-bit integers that contains two sub-cubes 2302 and 2303, one for each voxel set in level 0. In the level 1 sub-array 2305, two voxels are set as occupied, v15 and v63, and all other voxels set as unoccupied and the tree. This format is flexible as 64-entries in the next level of the tree are always allocated in correspondence to each set voxel in the upper layer of the tree. This flexibility can allow dynamically changing scene geometry to be inserted into an existing volumetric data structure in a flexible manner (i.e., rather than in a fixed order, such as randomly), as long as the corresponding voxel in the upper layers have been set. If not, either a table of pointers would be maintained, leading to higher memory requirements, or else the tree would be required to be at least partially rebuilt in order to insert unforeseen geometry.

Figure 24:
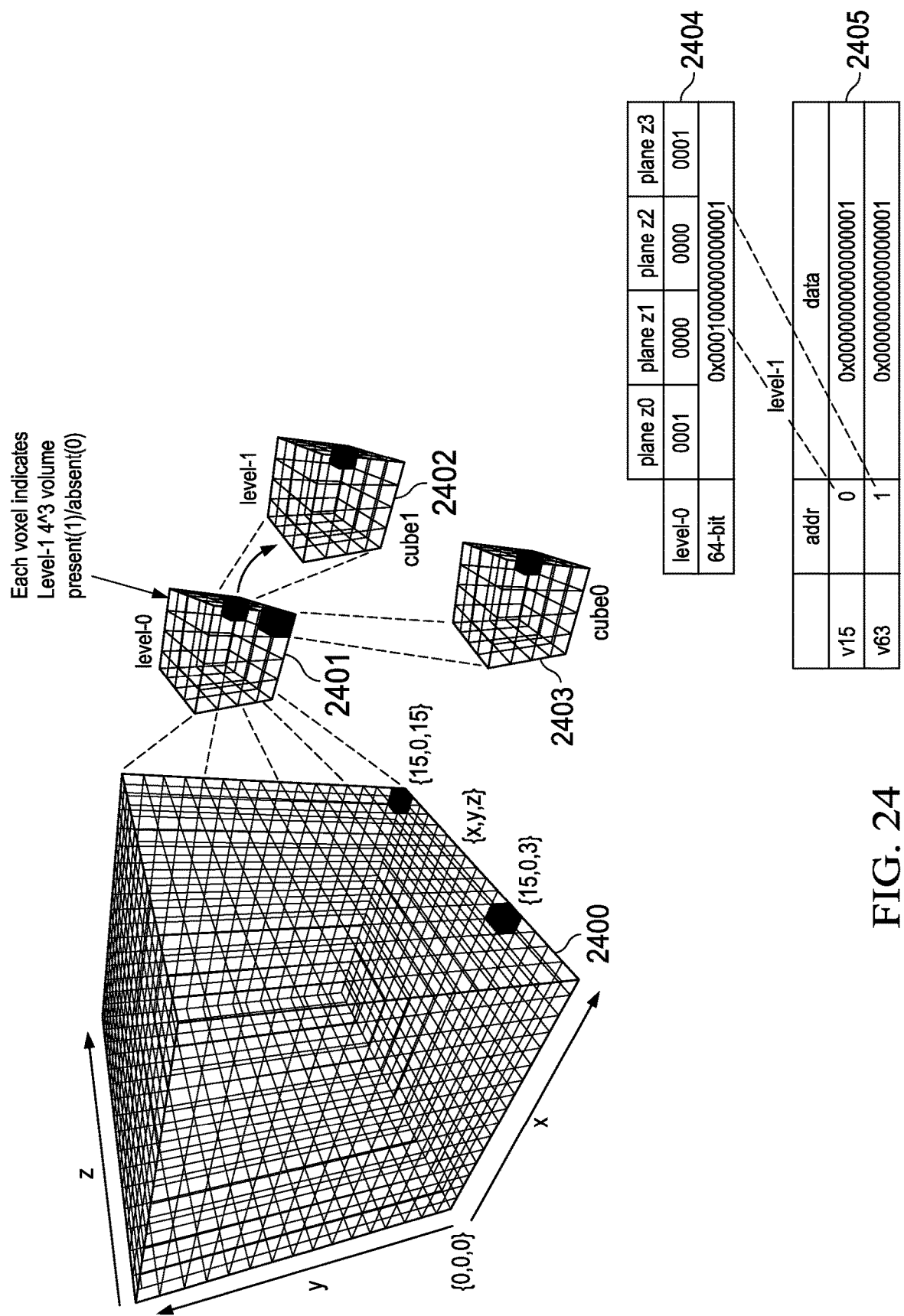
FIG. 24 illustrates storage of example voxel data in accordance with some embodiments.

FIG. 24 illustrates an alternate technique for storing the voxels from FIG. 23 in accordance with some embodiments. In this example, the overall volume 2400 contains two voxels stored at global coordinates $\{15,0,3\}$ and $\{15,0,15\}$ as in FIG. 23. In this approach, rather than allocating a 64-entry array to represent all of the sub-cubes in level 1 below level 0, only those elements in level 1, which actually contain geometry (e.g., as indicated by whether or not the corresponding level 0 voxels are occupier or not) are allocated as corresponding 64-bit level 1 records, such that the level 1, in this example, has only two 64-bit entries rather than sixty-four (i.e., for each of the 64 level-1 voxels, whether occupied or empty). Accordingly, in this example, the first level 0 2404 is equivalent to 2304 in FIG. 23 while the next level 2405 is 62 times smaller in terms of memory requirement than the corresponding 2305 in FIG. 23. In some implementations, if new geometry is to be inserted into level 0 for which space has not been allocated in level 1, the tree has to be copied and rearranged.

In the example of FIG. 24, the sub-volumes can be derived by counting the occupied voxels in the layer above the current layer. In this way, the system may determine where, in the voxel data, one higher layer ends and the next lower layer begins. For instance, if three layer-0 voxels are occupied, the system may expect that three corresponding layer-1 entries will following in the voxel data, and that the next entry (after these three) corresponds to the first entry in layer-2, and so on. Such optimal compaction can be very useful where certain parts of the scene do not vary over time or where remote transmission of volumetric data is required in the application, say from a space probe scanning the surface of Pluto where every bit is costly and time-consuming to transmit.

Figure 25:
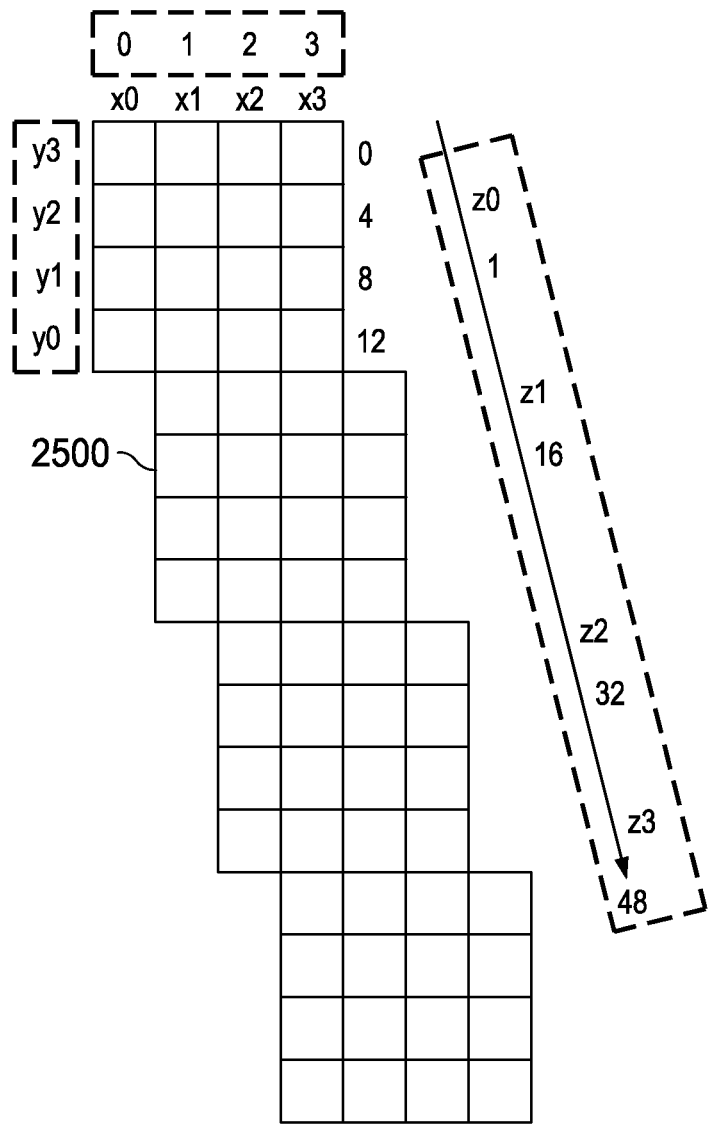
FIG. 25 illustrates insertion of a voxel into an example volumetric data structure in accordance with some embodiments.

FIG. 25 illustrates the manner in which a voxel may be inserted into a 4^3 cube represented as a 64 bit integer volumetric data structure entry, to reflect a change to geometry within the corresponding volume, in accordance with some embodiments. In one example, each voxel cube may be organized as four logical 16-bit planes within a 64-bit integer as shown in 2500. Each of the planes corresponds to Z values 0 through to 3, and within each plane each y-value codes for 4 logical 4-bit displacements 0 through 3, and finally within each 4-bit y-plane each bit codes for 4 possible values of x, 0 through 3, among other example organizations. Thus, in this example, to insert a voxel into a 4^3 volume, first a 1-bit may be shifted by the x-value 0 to 3, then that value may be shifted by 0/4/8/12 bits to encode the y-value, and finally the z-value may be represented by a shift of 0/16/32/48-bits as shown in the C-code expression in 2501. Finally, as each 64-bit integer may be a combination of up to 64 voxels, each of which is written separately, the new bitmap must be logically combined with the old 64-bit value read from the sparse voxel tree by ORing the old and new bitmap values as shown in 2502.

Figure 26:
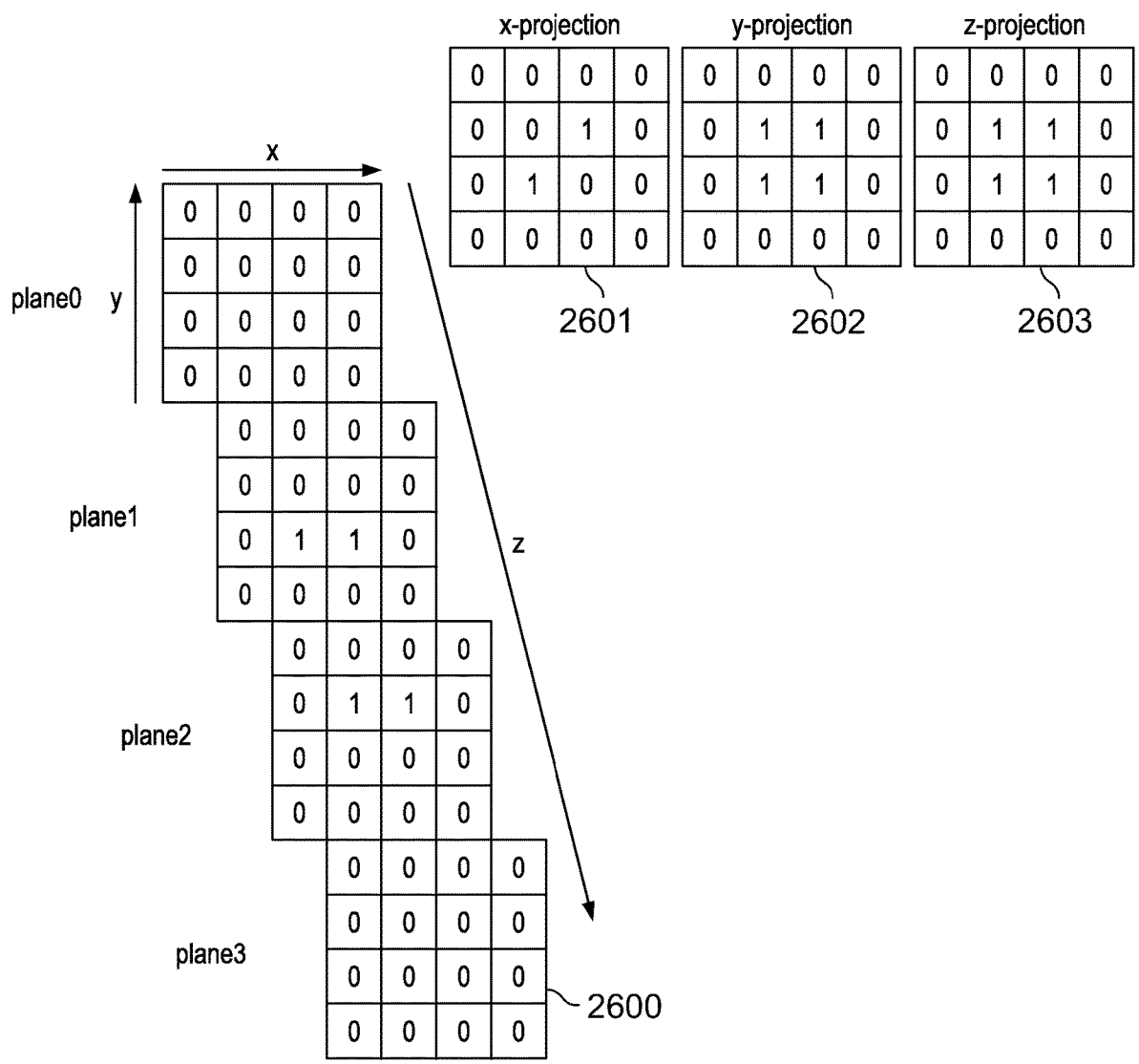
FIG. 26 illustrates projection of an example 3D volumetric object, in accordance with some embodiments.
Figure 27:
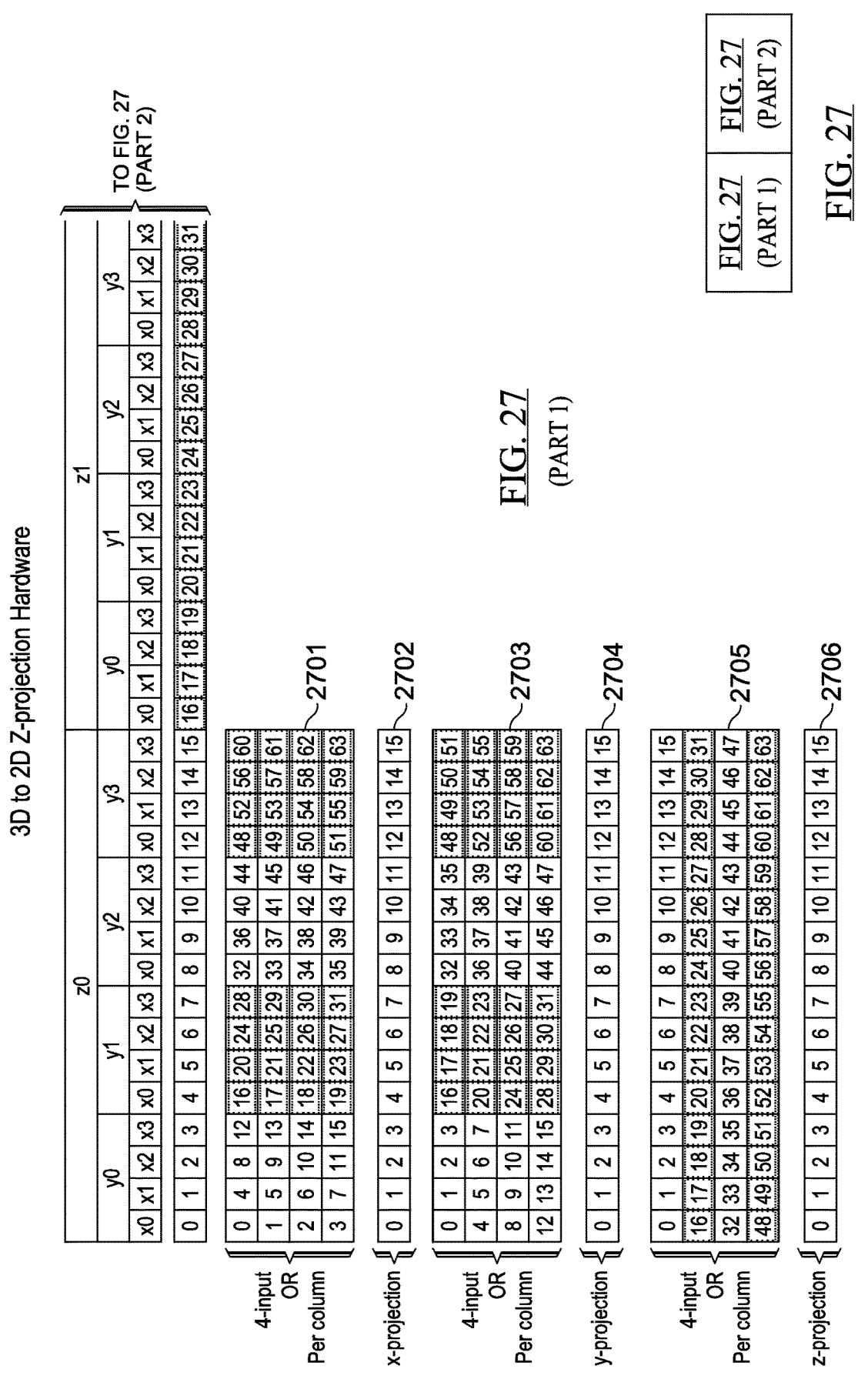

Turning to FIG. 26, a representation is shown to illustrate, in accordance with some embodiments, how a 3D volumetric object stored in a 64-bit integer 2600 can be projected by logical ORing in the X direction to produce the 2D pattern 2601, in the Y-direction to produce the 2D output 2602 and finally in the Z-direction to produce the pattern shown in 2603. FIG. 27 illustrates, in accordance with some embodiments, how bits from the input 64-bit integer are logically ORed to produce the output projections in X, Y and Z. In this example, table 2701 shows column-wise which element indices from the input vector 2700 are ORed to produce the x-projection output vector 2702. Table 2703 shows column-wise which element indices from the input vector 2700 are ORed to produce the y-projection output vector 2704. Finally 2705 shows column-wise which element indices from the input vector 2700 are ORed to produce the z-projection output vector 2706.

The X-projection logically ORs bits 0,1,2,3 from the input data 2700 to produce bit 0 of the X-projection 2701. For instance, bit 1 in 2701 may be produced by ORing bits 4, 5, 6, and 7 from 2700, and so on. Similarly, bit 0 in the Y-projection 2704 may be produced by ORing together bits 0, 4, 8, and 12 of 2700. And bit 1 of 2704 is produced by ORing together bits 1, 5, 9, and 13 of 2700 etc. Finally bit 0 in the Z-projection 2706 is produced by ORing together bits 0, 16, 32, and 48 of 2700. And bit 1 of 2706 may be produced by ORing together bits 1, 17, 33, and 49 of 2700, and so on.

Figure 28:
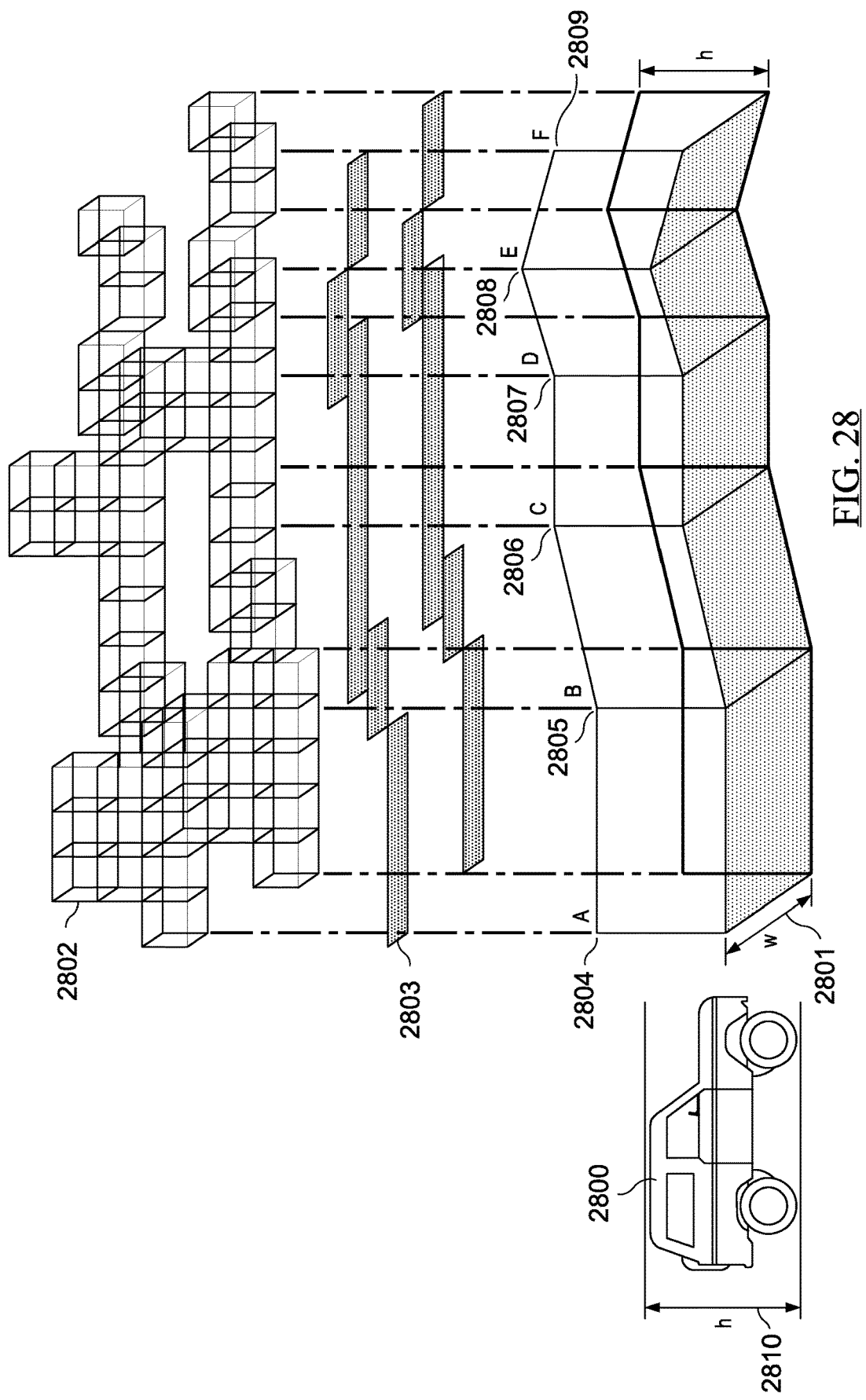
FIG. 28 shows using projections to generate simplified maps in accordance with some embodiments.

FIG. 28 shows an example of how projections can be used to generate simplified maps in accordance with some embodiments. In this scenario, the goal may be to produce a compact 2D map of paths down which a vehicle 2800 of height h 2810 and width w 2801 from a voxel volume 2802. Here the Y-projection logic can be used to generate an initial crude 2D map 2803 from the voxel volume 2802. In some implementations the map may be processed to check whether a particular vehicle (e.g., a car (or autonomous car), drone, etc.) of particular dimensions can pass through the width 2801 and height constraints 2810 of the path. This may be performed in order to ensure the paths are passable by performing projections in Z to check the width constraint 2801 and the projections in Y can be masked to limit calculations to the height of the vehicle 2810. With additional post processing (e.g., in software) it can be seen that for paths which are passable and satisfy the width and height constraints only the X and Z, coordinates of the points A 2804, B 2805, C 2806, D 2807, E 2808 and F 2809 along the path may only be stored or transmitted over a network in order to fully reconstruct the legal paths along which the vehicle can travel. Given that the path can be resolved into such piecewise segments it's possible to fully describe the path with only a byte or two per piecewise linear section of the path. This may assist in the fast transmission and processing of such path data (e.g., by an autonomous vehicle), among other examples.

Figure 29:
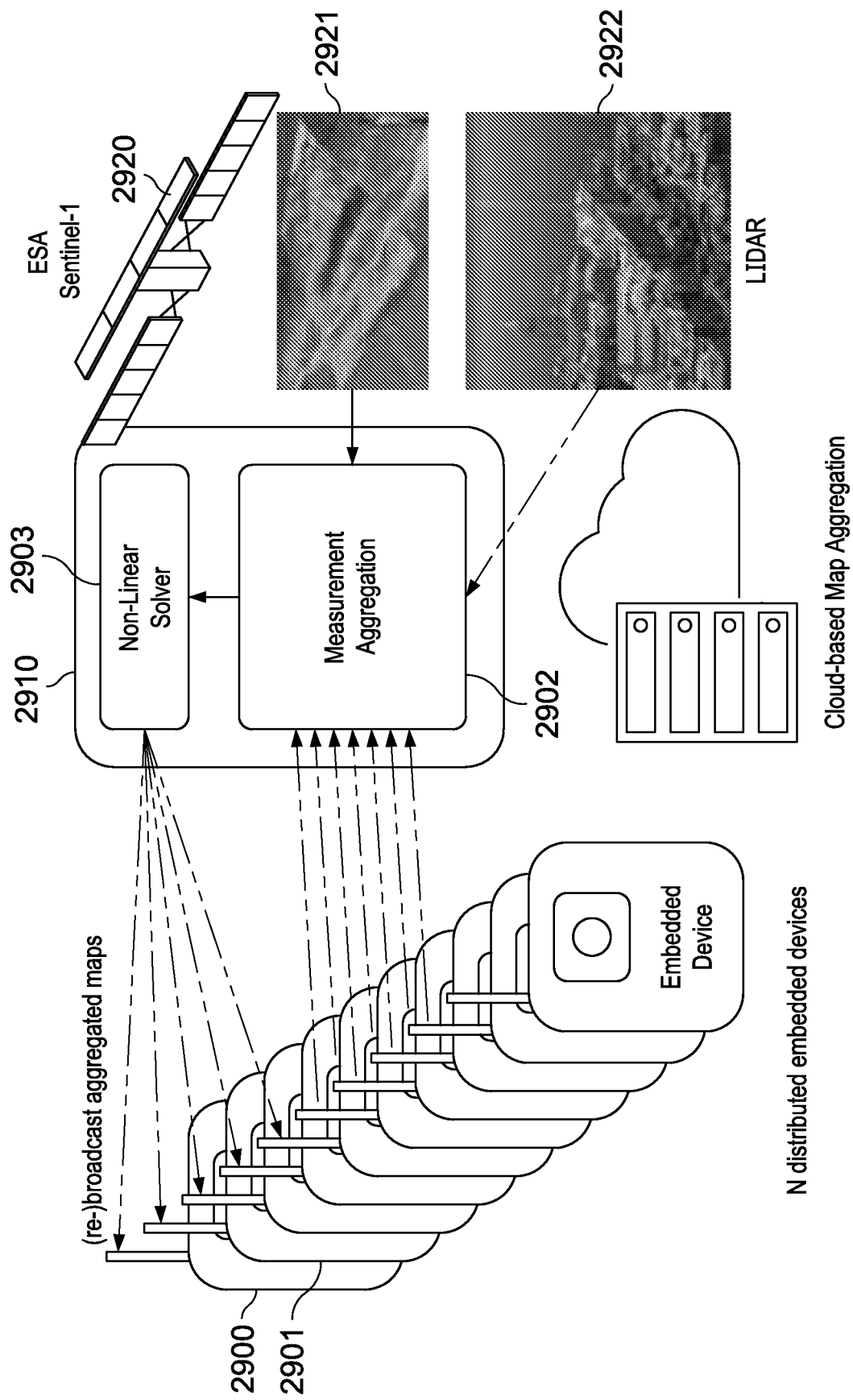
FIG. 29 illustrates example aggregation of example volumetric 3D and/or simple 2D measurements from embedded devices in accordance with some embodiments.

FIG. 29 illustrates how either volumetric 3D or simple 2D measurements from embedded devices can be aggregated in accordance with some embodiments by mathematical means in order to generate high-quality crowd-sourced maps as an alternative to using LIDAR or other expensive means to make precision measurements. In the proposed system a plurality of embedded devices 2900, 2901, etc. may be equipped with various sensors capable of taking measurements, which may be transmitted to a central server 2910. Software running on the server performs aggregation of all of the measurements 2902 and performs a numerical solve by non-linear solver 2903 of the resulting matrix to produce a highly accurate map, which can then be redistributed back to the embedded devices. Indeed the data aggregation can also include high accuracy survey data from satellites 2920, aerial LIDAR surveys 2921 and terrestrial LIDAR measurements 2922 to increase the accuracy of the resulting maps where these high fidelity datasets are available. In some implementations, the map and/or the recorded measurements may be generated in, converted to, or otherwise expressed using sparse voxel data structures with formats such as described herein, among other example implementations.

Figure 30:
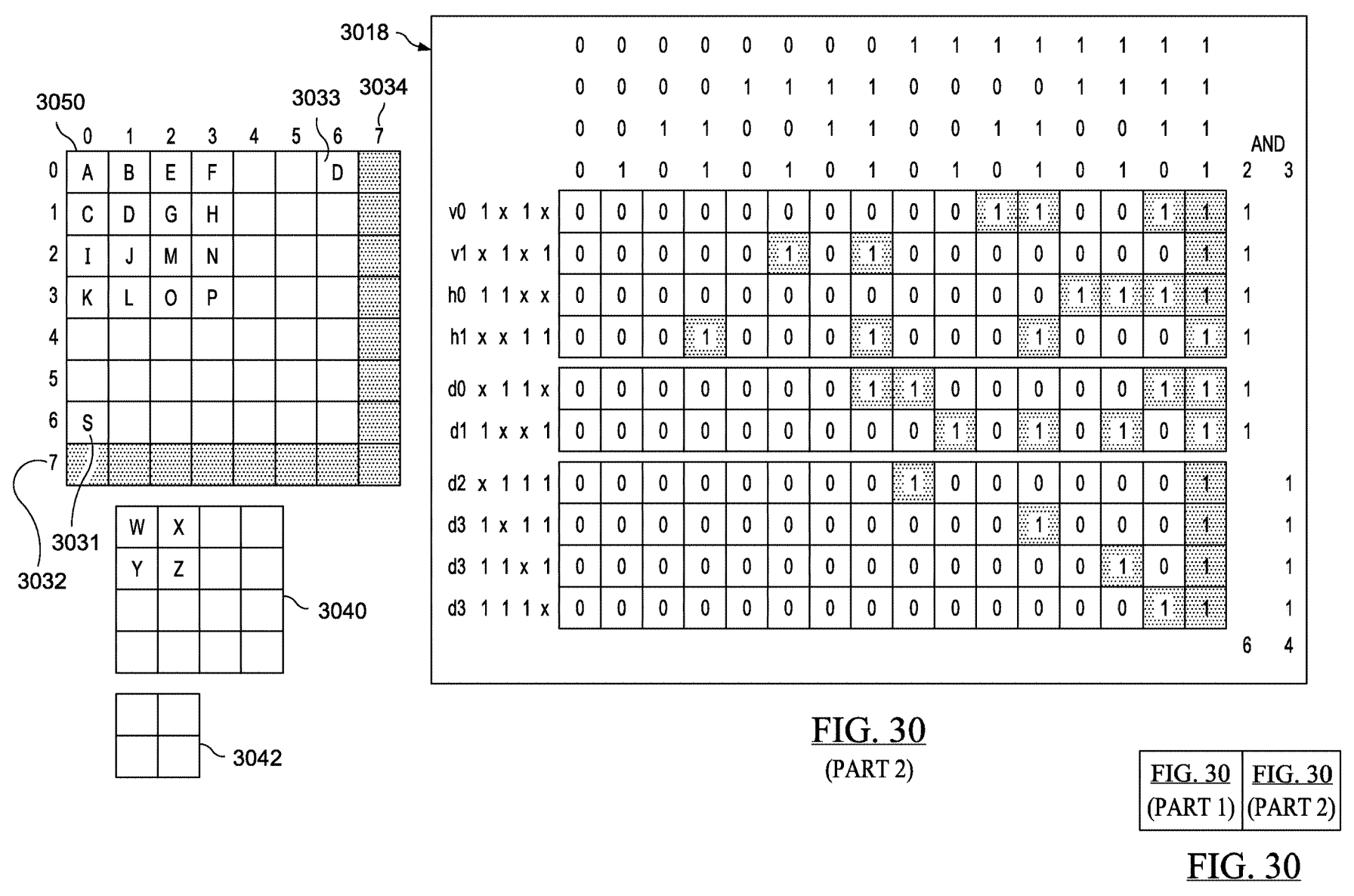

FIG. 30 is a diagram showing how 2D Path-Finding on a 2D 2×2 bitmap can be accelerated in accordance with some embodiments. The principal of operation is that for connectivity to exist between points on a map of identical grid cells the values of a contiguous run of cells in x or y or x and y must all be set to one. So a logical AND of bits drawn from those cells can be instantiated to test the bitmap in the grid for the existence of a valid path, and a different AND gate can be instantiated for each valid path through the N×N grid. In some instances, this approach may introduce combinatorial complexity in that even an 8×8 2D grid could contain $2^{64}-1$ valid paths. Accordingly, in some improved implementations, the grid may be reduced to 2×2 or 4×4 tiles which can be hierarchically tested for connectivity. A 2×2 bitmap 3000, contains 4 bits labeled b0, b1, b2 and b3. The 4 bits can take on the values 0000 through to 1111 with corresponding labels 3001 through to 3017. Each of these bit patterns expresses varying levels of connectivity between faces of the 2×2 grid labelled 3021 through to 3030. For instance 3021 or v0 denoting vertical connectivity between x0 and y0 in 3000 exists when the 2×2 grid 3000 contains bitmaps 1010 (3012), 1011 (3013), 1110 (3016) or 1111 (3017). A 2-input logical AND or b0 and b3 in 3000 as shown in row 1 of table 3018 generates v0 in the connectivity map that can be used in higher level hardware or software to decide on global connectivity through a global grid that has been subdivided into 2×2 sub grids. If the global map contains an odd number of grid points on either x or y axis the top level grid will require padding out to the next highest even number of grid points (e.g., such that 1 extra row of zeroes will need is added to the x- and/or y-axes on the global grid). FIG. 30 further shows an exemplary 7×7 grid 3050 showing how it is padded out to 8×8 by adding an additional row 3032 and column 3034 filled with zeroes. In order to speed up path-finding compared to the other techniques (e.g., depth-first search, breadth-first search or Dijkstra's algorithm, or other graph-based approaches), the present example may sub-sample the N×N map 3050 progressively town to a 2×2 map. For instance in this example cell W in 3040 is populated by ORing the contents of cells A, B, C and D in 3050, and so on. In turn the bits in 2×2 cells in 3040 are ORed to populate the cells in 3042. In terms of path-finding the algorithm starts from the smallest 2×2 representation of the grid 3042 and tests each of the bits. Only the parts of the 4×4 grid in 3040 (composed of four 2×2 grids) corresponding to one bits in the 2×2 grid 3042 need be tested for connectivity as we know that a zero bit means that there is no corresponding 2×2 grid cell in 3040. This approach can also be used in searching the 8×8 grid in 3020, for example if cell W in 3040 contains a zero then we know that there is no path in ABCD in 3020 etc. This approach prunes branches from the graph search algorithm used whether it be A*, Dijkstra, DFS, BFS or variants thereof. In addition to this, the use of a hardware basic path-finder with 2×2 organization 3018 may further limit the associated computations. Indeed, a 4×4 basic hardware element can be composed using a five 2×2 hardware blocks with the same arrangement as 3040 and 3042 further constraining the amount of graph searching that needs to be performed. Furthermore an 8×8 hardware-based search engine can be constructed with twenty one 2×2 HW blocks (3018) with the same arrangement as 3042, 3040, 3000, and so on for potentially any N×N topology.

Figure 31:
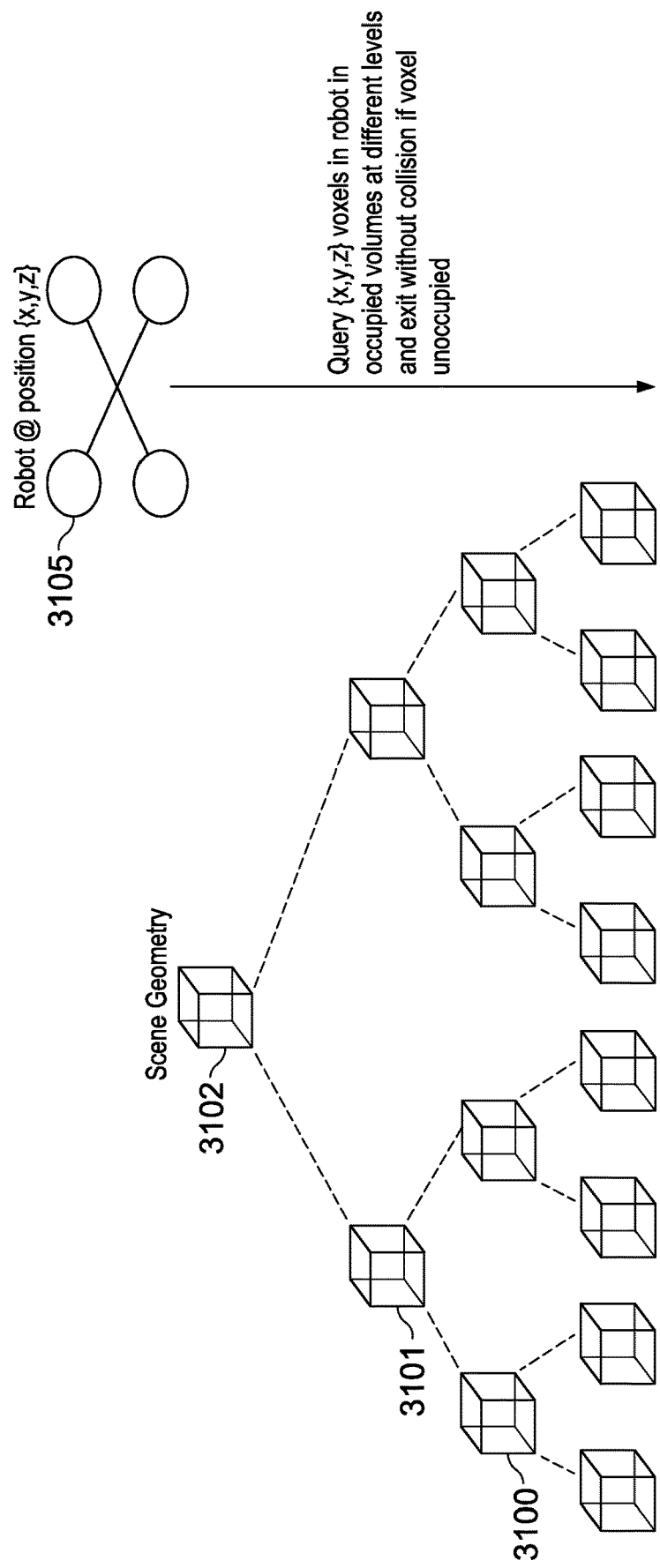
FIG. 31 shows the example acceleration of collision detection using an example volumetric data structure in accordance with some embodiments.

FIG. 31 is a simplified block diagram showing how collision detection can be accelerated using the proposed volumetric data structure in accordance with some embodiments. The 3D N×N×N map of the geometry can be subsampled into a pyramid consisting of a lowest Level of Detail (LoD) 2×2×2 volume 3102, a next highest 4×4×4 volume 3101, an 8×8×8 volume 3100, and so on all the way up to N×N×N. If the position of the drone, vehicle, or robot 3105 is known in 3D space via either a location means such as GPS, or via relocalization from a 3D map, then it can rapidly be used to test for the presence or absence of geometry in a quadrant of the relevant 2×2×2 sub-volume by scaling the x, y and z positions of the drone/robot appropriately (dividing them by 2 the relevant number of times) and querying 3102 for the presence of geometry (e.g., checking if the corresponding bitmap bit is one indicating a possible collision). If a possible collision exists (e.g., a "1" is found) then further checks in volumes 3101, 3100, etc. may be performed to establish if the drone/robot can move or not. However, if a voxel in 3102 is free (e.g., "0"), then the robot/drone can interpret the same as free space and manipulate directional control to move freely through a large part of the map.

While some of the systems and solution described and illustrated herein have been described as containing or being associated with a plurality of elements, not all elements explicitly illustrated or described may be utilized in each alternative implementation of the present disclosure. Additionally, one or more of the elements described herein may be located external to a system, while in other instances, certain elements may be included within or as a portion of one or more of the other described elements, as well as other elements not described in the illustrated implementation. Further, certain elements may be combined with other components, as well as used for alternative or additional purposes in addition to those purposes described herein.

Further, it should be appreciated that the examples presented above are non-limiting examples provided merely for purposes of illustrating certain principles and features and not necessarily limiting or constraining the potential embodiments of the concepts described herein. For instance, a variety of different embodiments can be realized utilizing various combinations of the features and components described herein, including combinations realized through the various implementations of components described herein. Other implementations, features, and details should be appreciated from the contents of this Specification.

FIGS. 32-37 are block diagrams of exemplary computer architectures that may be used in accordance with embodiments disclosed herein. Indeed, computing devices, processors, and other logic and circuitry of the systems described herein may incorporate all or a portion of the functionality and supporting software and/or hardware circuitry to implement such functionality. Further, other computer architecture designs known in the art for processors and computing systems may also be used beyond the examples shown here. Generally, suitable computer architectures for embodiments disclosed herein can include, but are not limited to, configurations illustrated in FIGS. 32-37.

Figure 32:
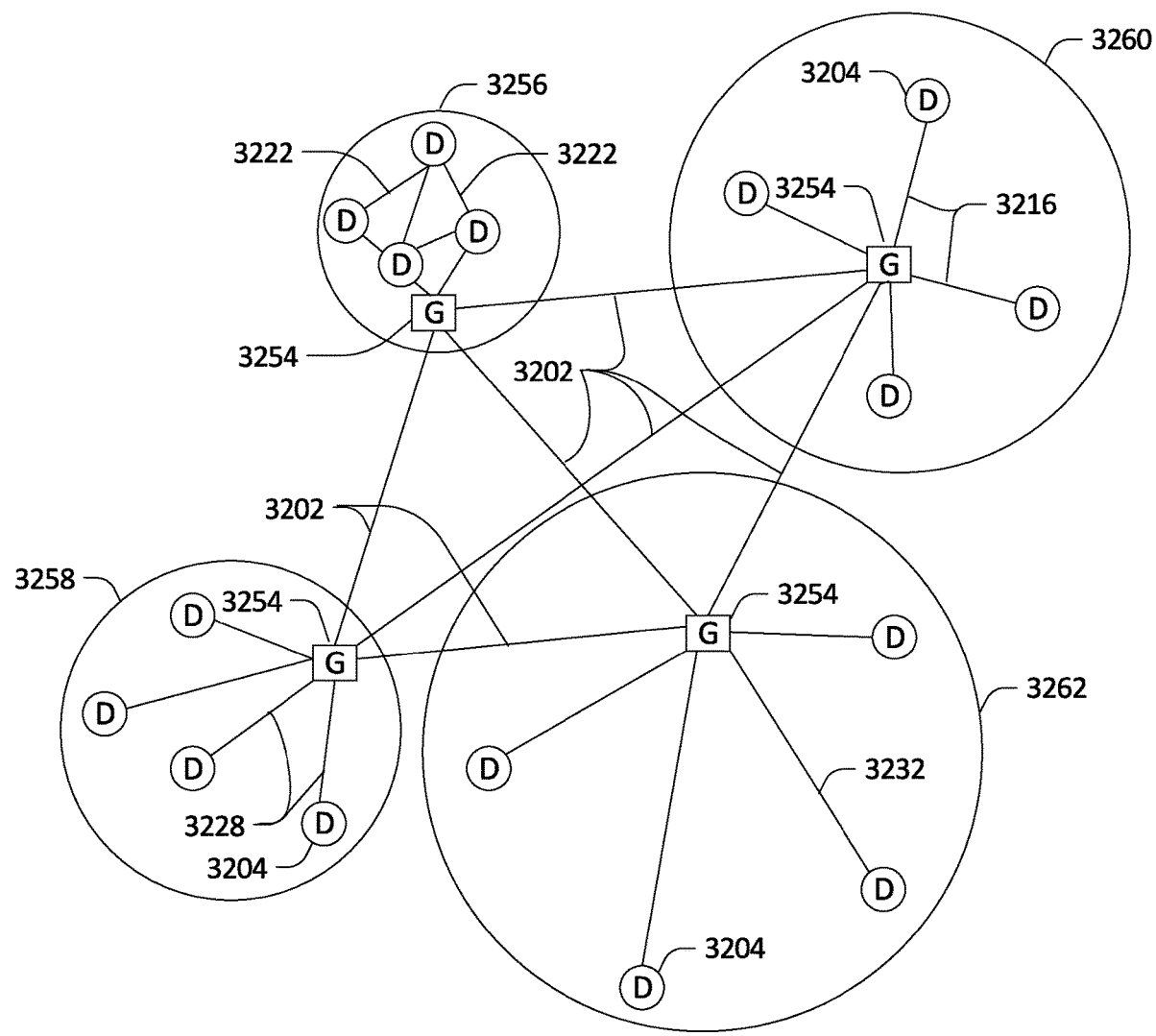
FIG. 32 is a simplified block diagram of an exemplary network with devices in accordance with at least some embodiments.

FIG. 32 illustrates an example domain topology for respective internet-of-things (IoT) networks coupled through links to respective gateways. The internet of things (IoT) is a concept in which a large number of computing devices are interconnected to each other and to the Internet to provide functionality and data acquisition at very low levels. Thus, as used herein, an IoT device may include a semiautonomous device performing a function, such as sensing or control, among others, in communication with other IoT devices and a wider network, such as the Internet. Such IoT devices may be equipped with logic and memory to implement and use hash tables, such as introduced above.

Often, IoT devices are limited in memory, size, or functionality, allowing larger numbers to be deployed for a similar cost to smaller numbers of larger devices. However, an IoT device may be a smart phone, laptop, tablet, or PC, or other larger device. Further, an IoT device may be a virtual device, such as an application on a smart phone or other computing device. IoT devices may include IoT gateways, used to couple IoT devices to other IoT devices and to cloud applications, for data storage, process control, and the like.

Networks of IoT devices may include commercial and home automation devices, such as water distribution systems, electric power distribution systems, pipeline control systems, plant control systems, light switches, thermostats, locks, cameras, alarms, motion sensors, and the like. The IoT devices may be accessible through remote computers, servers, and other systems, for example, to control systems or access data.

Figure 33:
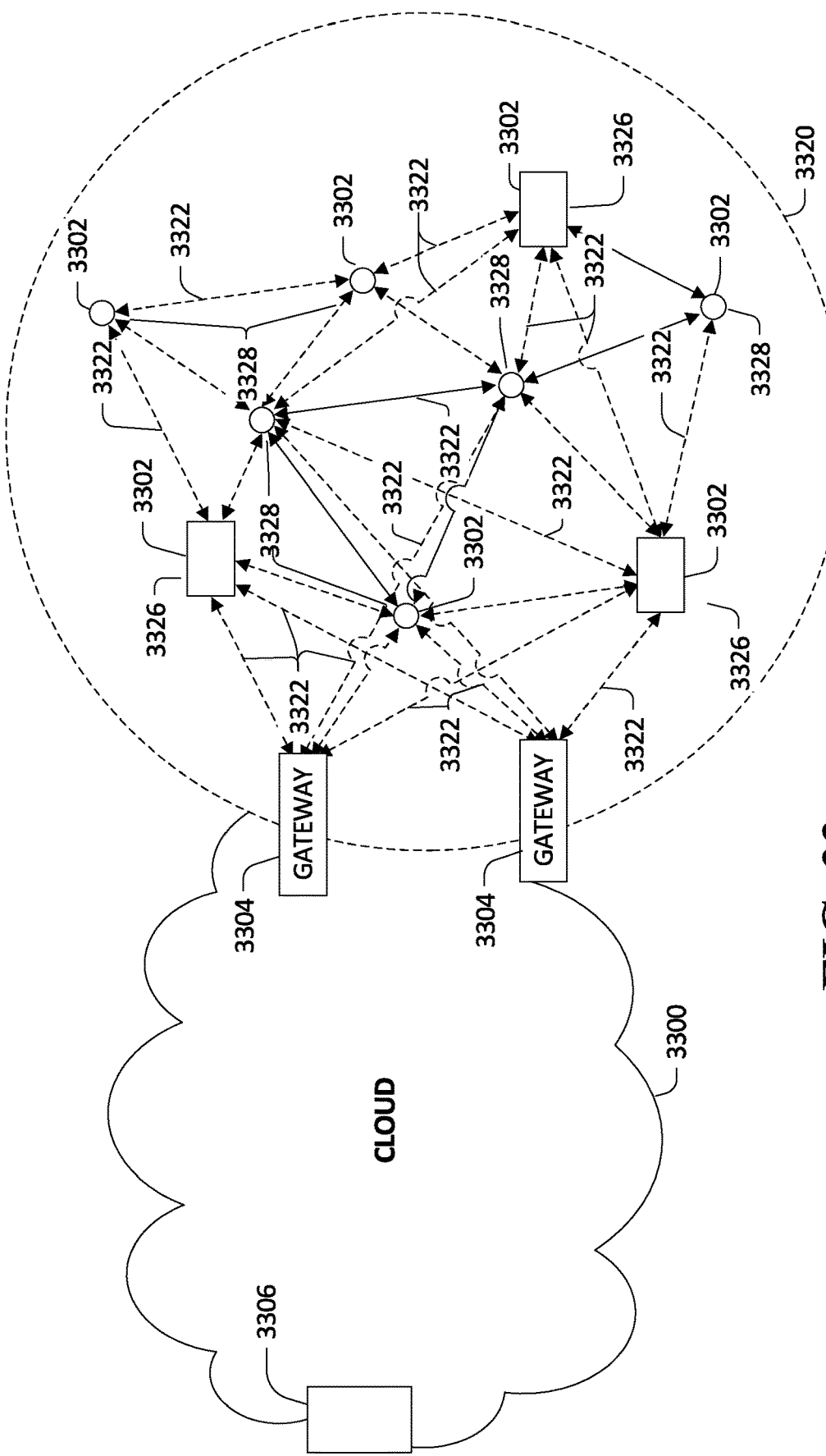
FIG. 33 is a simplified block diagram of an exemplary fog or cloud computing network in accordance with at least some embodiments.

The future growth of the Internet and like networks may involve very large numbers of IoT devices. Accordingly, in the context of the techniques discussed herein, a number of innovations for such future networking will address the need for all these layers to grow unhindered, to discover and make accessible connected resources, and to support the ability to hide and compartmentalize connected resources. Any number of network protocols and communications standards may be used, wherein each protocol and standard is designed to address specific objectives. Further, the protocols are part of the fabric supporting human accessible services that operate regardless of location, time or space. The innovations include service delivery and associated infrastructure, such as hardware and software; security enhancements; and the provision of services based on Quality of Service (QoS) terms specified in service level and service delivery agreements. As will be understood, the use of IoT devices and networks, such as those introduced in FIGS. 32 and 33, present a number of new challenges in a heterogeneous network of connectivity comprising a combination of wired and wireless technologies.

FIG. 32 specifically provides a simplified drawing of a domain topology that may be used for a number of internet-of-things (IoT) networks comprising IoT devices 3204, with the IoT networks 3256, 3258, 3260, 3262, coupled through backbone links 3202 to respective gateways 3254. For example, a number of IoT devices 3204 may communicate with a gateway 3254, and with each other through the gateway 3254. To simplify the drawing, not every IoT device 3204, or communications link (e.g., link 3216, 3222, 3228, or 3232) is labeled. The backbone links 3202 may include any number of wired or wireless technologies, including optical networks, and may be part of a local area network (LAN), a wide area network (WAN), or the Internet. Additionally, such communication links facilitate optical signal paths among both IoT devices 3204 and gateways 3254, including the use of MUXing/deMUXing components that facilitate interconnection of the various devices.

The network topology may include any number of types of IoT networks, such as a mesh network provided with the network 3256 using Bluetooth low energy (BLE) links 3222. Other types of IoT networks that may be present include a wireless local area network (WLAN) network 3258 used to communicate with IoT devices 3204 through IEEE 802.11 (Wi-Fi®) links 3228, a cellular network 3260 used to communicate with IoT devices 3204 through an LTE/LTE-A (4G) or 5G cellular network, and a low-power wide area (LPWA) network 3262, for example, a LPWA network compatible with the LoRaWan specification promulgated by the LoRa alliance, or a IPv6 over Low Power Wide-Area Networks (LPWAN) network compatible with a specification promulgated by the Internet Engineering Task Force (IETF). Further, the respective IoT networks may communicate with an outside network provider (e.g., a tier 2 or tier 3 provider) using any number of communications links, such as an LTE cellular link, an LPWA link, or a link based on the IEEE 802.15.4 standard, such as Zigbee®. The respective IoT networks may also operate with use of a variety of network and internet application protocols such as Constrained Application Protocol (CoAP). The respective IoT networks may also be integrated with coordinator devices that provide a chain of links that forms cluster tree of linked devices and networks.

Each of these IoT networks may provide opportunities for new technical features, such as those as described herein. The improved technologies and networks may enable the exponential growth of devices and networks, including the use of IoT networks into as fog devices or systems. As the use of such improved technologies grows, the IoT networks may be developed for self-management, functional evolution, and collaboration, without needing direct human intervention. The improved technologies may even enable IoT networks to function without centralized controlled systems. Accordingly, the improved technologies described herein may be used to automate and enhance network management and operation functions far beyond current implementations.

In an example, communications between IoT devices 3204, such as over the backbone links 3202, may be protected by a decentralized system for authentication, authorization, and accounting (AAA). In a decentralized AAA system, distributed payment, credit, audit, authorization, and authentication systems may be implemented across interconnected heterogeneous network infrastructure. This allows systems and networks to move towards autonomous operations. In these types of autonomous operations, machines may even contract for human resources and negotiate partnerships with other machine networks. This may allow the achievement of mutual objectives and balanced service delivery against outlined, planned service level agreements as well as achieve solutions that provide metering, measurements, traceability and trackability. The creation of new supply chain structures and methods may enable a multitude of services to be created, mined for value, and collapsed without any human involvement.

Such IoT networks may be further enhanced by the integration of sensing technologies, such as sound, light, electronic traffic, facial and pattern recognition, smell, vibration, into the autonomous organizations among the IoT devices. The integration of sensory systems may allow systematic and autonomous communication and coordination of service delivery against contractual service objectives, orchestration and quality of service (QoS) based swarming and fusion of resources. Some of the individual examples of network-based resource processing include the following.

The mesh network 3256, for instance, may be enhanced by systems that perform inline data-to-information transforms. For example, self-forming chains of processing resources comprising a multi-link network may distribute the transformation of raw data to information in an efficient manner, and the ability to differentiate between assets and resources and the associated management of each. Furthermore, the proper components of infrastructure and resource based trust and service indices may be inserted to improve the data integrity, quality, assurance and deliver a metric of data confidence.

The WLAN network 3258, for instance, may use systems that perform standards conversion to provide multi-standard connectivity, enabling IoT devices 3204 using different protocols to communicate. Further systems may provide seamless interconnectivity across a multi-standard infrastructure comprising visible Internet resources and hidden Internet resources.

Communications in the cellular network 3260, for instance, may be enhanced by systems that offload data, extend communications to more remote devices, or both. The LPWA network 3262 may include systems that perform non-Internet protocol (IP) to IP interconnections, addressing, and routing. Further, each of the IoT devices 3204 may include the appropriate transceiver for wide area communications with that device. Further, each IoT device 3204 may include other transceivers for communications using additional protocols and frequencies. This is discussed further with respect to the communication environment and hardware of an IoT processing device depicted in FIGS. 34 and 35.

Finally, clusters of IoT devices may be equipped to communicate with other IoT devices as well as with a cloud network. This may allow the IoT devices to form an ad-hoc network between the devices, allowing them to function as a single device, which may be termed a fog device. This configuration is discussed further with respect to FIG. 33 below.

FIG. 33 illustrates a cloud computing network in communication with a mesh network of IoT devices (devices 3302) operating as a fog device at the edge of the cloud computing network. The mesh network of IoT devices may be termed a fog 3320, operating at the edge of the cloud 3300. To simplify the diagram, not every IoT device 3302 is labeled.

The fog 3320 may be considered to be a massively interconnected network wherein a number of IoT devices 3302 are in communications with each other, for example, by radio links 3322. As an example, this interconnected network may be facilitated using an interconnect specification released by the Open Connectivity Foundation™ (OCF). This standard allows devices to discover each other and establish communications for interconnects. Other interconnection protocols may also be used, including, for example, the optimized link state routing (OLSR) Protocol, the better approach to mobile ad-hoc networking (B.A.T-.M.A.N.) routing protocol, or the OMA Lightweight M2M (LWM2M) protocol, among others.

Three types of IoT devices 3302 are shown in this example, gateways 3304, data aggregators 3326, and sensors 3328, although any combinations of IoT devices 3302 and functionality may be used. The gateways 3304 may be edge devices that provide communications between the cloud 3300 and the fog 3320, and may also provide the backend process function for data obtained from sensors 3328, such as motion data, flow data, temperature data, and the like. The data aggregators 3326 may collect data from any number of the sensors 3328, and perform the back end processing function for the analysis. The results, raw data, or both may be passed along to the cloud 3300 through the gateways 3304. The sensors 3328 may be full IoT devices 3302, for example, capable of both collecting data and processing the data. In some cases, the sensors 3328 may be more limited in functionality, for example, collecting the data and allowing the data aggregators 3326 or gateways 3304 to process the data.

Communications from any IoT device 3302 may be passed along a convenient path (e.g., a most convenient path) between any of the IoT devices 3302 to reach the gateways 3304. In these networks, the number of interconnections provide substantial redundancy, allowing communications to be maintained, even with the loss of a number of IoT devices 3302. Further, the use of a mesh network may allow IoT devices 3302 that are very low power or located at a distance from infrastructure to be used, as the range to connect to another IoT device 3302 may be much less than the range to connect to the gateways 3304.

The fog 3320 provided from these IoT devices 3302 may be presented to devices in the cloud 3300, such as a server 3306, as a single device located at the edge of the cloud 3300, e.g., a fog device. In this example, the alerts coming from the fog device may be sent without being identified as coming from a specific IoT device 3302 within the fog 3320. In this fashion, the fog 3320 may be considered a distributed platform that provides computing and storage resources to perform processing or data-intensive tasks such as data analytics, data aggregation, and machine-learning, among others.

In some examples, the IoT devices 3302 may be configured using an imperative programming style, e.g., with each IoT device 3302 having a specific function and communication partners. However, the IoT devices 3302 forming the fog device may be configured in a declarative programming style, allowing the IoT devices 3302 to reconfigure their operations and communications, such as to determine needed resources in response to conditions, queries, and device failures. As an example, a query from a user located at a server 3306 about the operations of a subset of equipment monitored by the IoT devices 3302 may result in the fog 3320 device selecting the IoT devices 3302, such as particular sensors 3328, needed to answer the query. The data from these sensors 3328 may then be aggregated and analyzed by any combination of the sensors 3328, data aggregators 3326, or gateways 3304, before being sent on by the fog 3320 device to the server 3306 to answer the query. In this example, IoT devices 3302 in the fog 3320 may select the sensors 3328 used based on the query, such as adding data from flow sensors or temperature sensors. Further, if some of the IoT devices 3302 are not operational, other IoT devices 3302 in the fog 3320 device may provide analogous data, if available.

In other examples, the operations and functionality described above may be embodied by a IoT device machine in the example form of an electronic processing system, within which a set or sequence of instructions may be executed to cause the electronic processing system to perform any one of the methodologies discussed herein, according to an example embodiment. The machine may be an IoT device or an IoT gateway, including a machine embodied by aspects of a personal computer (PC), a tablet PC, a personal digital assistant (PDA), a mobile telephone or smartphone, or any machine capable of executing instructions (sequential or otherwise) that specify actions to be taken by that machine. Further, while only a single machine may be depicted and referenced in the example above, such machine shall also be taken to include any collection of machines that individually or jointly execute a set (or multiple sets) of instructions to perform any one or more of the methodologies discussed herein. Further, these and like examples to a processor-based system shall be taken to include any set of one or more machines that are controlled by or operated by a processor (e.g., a computer) to individually or jointly execute instructions to perform any one or more of the methodologies discussed herein. In some implementations, one or more multiple devices may operate cooperatively to implement functionality and perform tasks described herein. In some cases, one or more host devices may supply data, provide instructions, aggregate results, or otherwise facilitate joint operations and functionality provided by multiple devices. While functionality, when implemented by a single device, may be considered functionality local to the device, in implementations of multiple devices operating as a single machine, the functionality may be considered local to the devices collectively, and this collection of devices may provide or consume results provided by other, remote machines (implemented as a single device or collection devices), among other example implementations.

Figure 34:
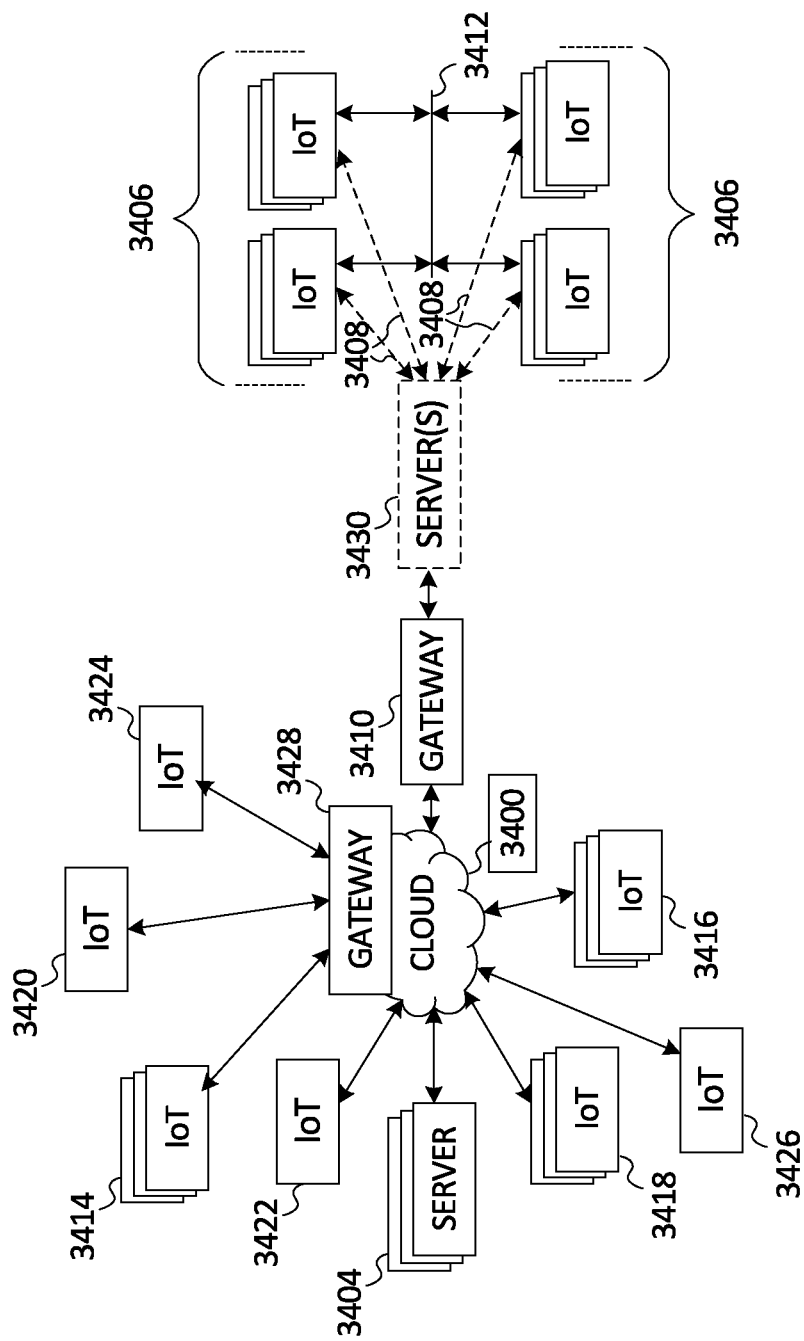
FIG. 34 is a simplified block diagram of a system including example devices in accordance with at least some embodiments.

For instance, FIG. 34 illustrates a drawing of a cloud computing network, or cloud 3400, in communication with a number of Internet of Things (IoT) devices. The cloud 3400 may represent the Internet, or may be a local area network (LAN), or a wide area network (WAN), such as a proprietary network for a company. The IoT devices may include any number of different types of devices, grouped in various combinations. For example, a traffic control group 3406 may include IoT devices along streets in a city. These IoT devices may include stoplights, traffic flow monitors, cameras, weather sensors, and the like. The traffic control group 3406, or other subgroups, may be in communication with the cloud 3400 through wired or wireless links 3408, such as LPWA links, optical links, and the like. Further, a wired or wireless sub-network 3412 may allow the IoT devices to communicate with each other, such as through a local area network, a wireless local area network, and the like. The IoT devices may use another device, such as a gateway 3410 or 3428 to communicate with remote locations such as the cloud 3400; the IoT devices may also use one or more servers 3430 to facilitate communication with the cloud 3400 or with the gateway 3410. For example, the one or more servers 3430 may operate as an intermediate network node to support a local edge cloud or fog implementation among a local area network. Further, the gateway 3428 that is depicted may operate in a cloud-to-gateway-to-many edge devices configuration, such as with the various IoT devices 3414, 3420, 3424 being constrained or dynamic to an assignment and use of resources in the cloud 3400.

Other example groups of IoT devices may include remote weather stations 3414, local information terminals 3416, alarm systems 3418, automated teller machines 3420, alarm panels 3422, or moving vehicles, such as emergency vehicles 3424 or other vehicles 3426, among many others. Each of these IoT devices may be in communication with other IoT devices, with servers 3404, with another IoT fog device or system (not shown, but depicted in FIG. 33), or a combination therein. The groups of IoT devices may be deployed in various residential, commercial, and industrial settings (including in both private or public environments).

As can be seen from FIG. 34, a large number of IoT devices may be communicating through the cloud 3400. This may allow different IoT devices to request or provide information to other devices autonomously. For example, a group of IoT devices (e.g., the traffic control group 3406) may request a current weather forecast from a group of remote weather stations 3414, which may provide the forecast without human intervention. Further, an emergency vehicle 3424 may be alerted by an automated teller machine 3420 that a burglary is in progress. As the emergency vehicle 3424 proceeds towards the automated teller machine 3420, it may access the traffic control group 3406 to request clearance to the location, for example, by lights turning red to block cross traffic at an intersection in sufficient time for the emergency vehicle 3424 to have unimpeded access to the intersection.

Clusters of IoT devices, such as the remote weather stations 3414 or the traffic control group 3406, may be equipped to communicate with other IoT devices as well as with the cloud 3400. This may allow the IoT devices to form an ad-hoc network between the devices, allowing them to function as a single device, which may be termed a fog device or system (e.g., as described above with reference to FIG. 33).

Figure 35:
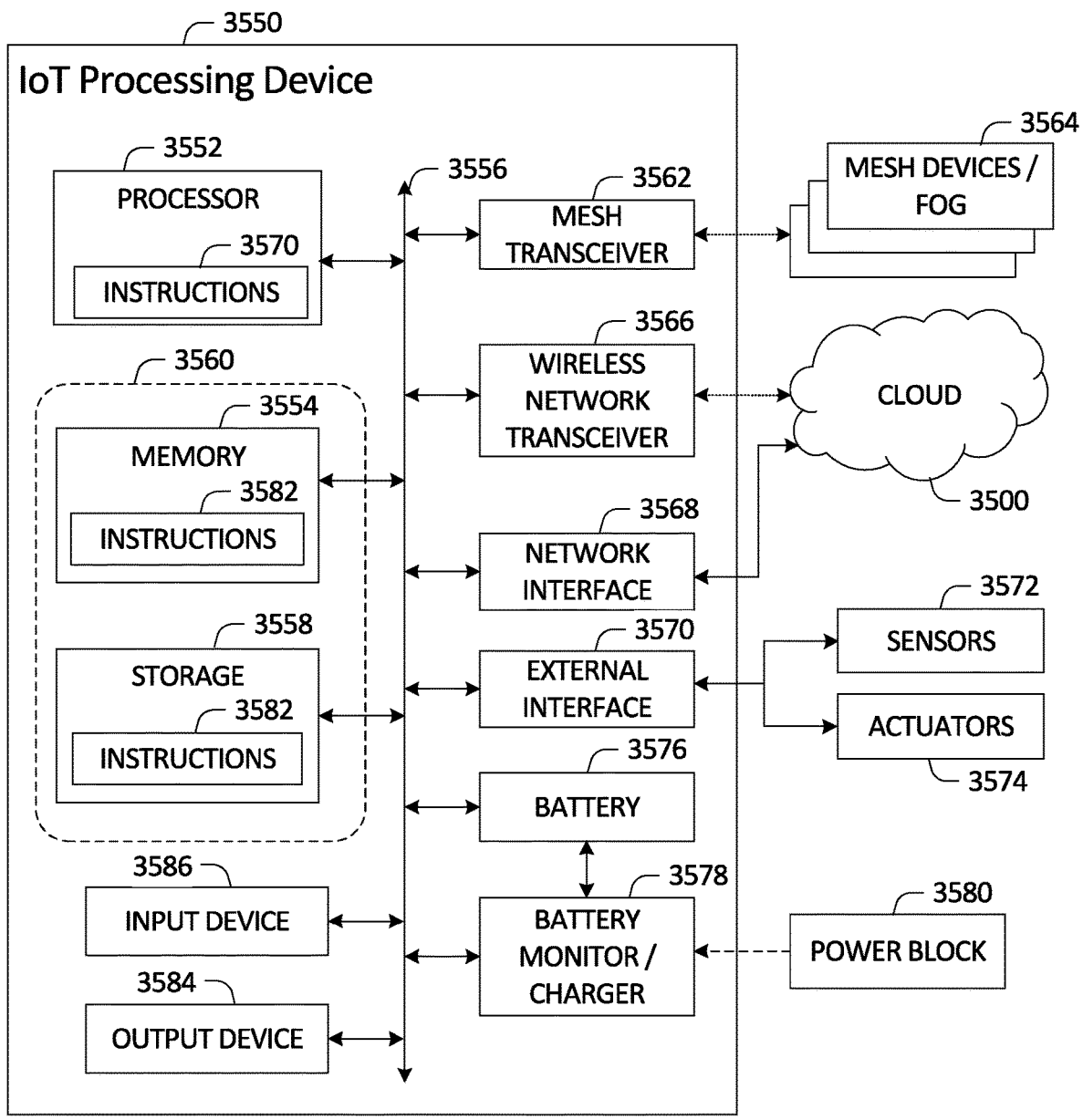
FIG. 35 is a simplified block diagram of an example processing device in accordance with at least some embodiments.

FIG. 35 is a block diagram of an example of components that may be present in an IoT device 3550 for implementing the techniques described herein. The IoT device 3550 may include any combinations of the components shown in the example or referenced in the disclosure above. The components may be implemented as ICs, portions thereof, discrete electronic devices, or other modules, logic, hardware, software, firmware, or a combination thereof adapted in the IoT device 3550, or as components otherwise incorporated within a chassis of a larger system. Additionally, the block diagram of FIG. 35 is intended to depict a high-level view of components of the IoT device 3550. However, some of the components shown may be omitted, additional components may be present, and different arrangement of the components shown may occur in other implementations.

The IoT device 3550 may include a processor 3552, which may be a microprocessor, a multi-core processor, a multithreaded processor, an ultra-low voltage processor, an embedded processor, or other known processing element. The processor 3552 may be a part of a system on a chip (SoC) in which the processor 3552 and other components are formed into a single integrated circuit, or a single package, such as the Edison™ or Galileo™ SoC boards from Intel. As an example, the processor 3552 may include an Intel® Architecture Core™ based processor, such as a Quark™, an Atom™, an i3, an i5, an i7, or an MCU-class processor, or another such processor available from Intel® Corporation, Santa Clara, Calif. However, any number other processors may be used, such as available from Advanced Micro Devices, Inc. (AMD) of Sunnyvale, Calif., a MIPS- based design from MIPS Technologies, Inc. of Sunnyvale, Calif., an ARM-based design licensed from ARM Holdings, Ltd. or customer thereof, or their licensees or adopters. The processors may include units such as an A5-A10 processor from Apple® Inc., a Snapdragon™ processor from Qualcomm® Technologies, Inc., or an OMAP™ processor from Texas Instruments, Inc.

The processor 3552 may communicate with a system memory 3554 over an interconnect 3556 (e.g., a bus). Any number of memory devices may be used to provide for a given amount of system memory. As examples, the memory may be random access memory (RAM) in accordance with a Joint Electron Devices Engineering Council (JEDEC) design such as the DDR or mobile DDR standards (e.g., LPDDR, LPDDR2, LPDDR3, or LPDDR4). In various implementations the individual memory devices may be of any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs.

To provide for persistent storage of information such as data, applications, operating systems and so forth, a storage 3558 may also couple to the processor 3552 via the interconnect 3556. In an example the storage 3558 may be implemented via a solid state disk drive (SSDD). Other devices that may be used for the storage 3558 include flash memory cards, such as SD cards, microSD cards, xD picture cards, and the like, and USB flash drives. In low power implementations, the storage 3558 may be on-die memory or registers associated with the processor 3552. However, in some examples, the storage 3558 may be implemented using a micro hard disk drive (HDD). Further, any number of new technologies may be used for the storage 3558 in addition to, or instead of, the technologies described, such resistance change memories, phase change memories, holographic memories, or chemical memories, among others.

The components may communicate over the interconnect 3556. The interconnect 3556 may include any number of technologies, including industry standard architecture (ISA), extended ISA (EISA), peripheral component interconnect (PCI), peripheral component interconnect extended (PCIx), PCI express (PCIe), or any number of other technologies. The interconnect 3556 may be a proprietary bus, for example, used in a SoC based system. Other bus systems may be included, such as an I2C interface, an SPI interface, point to point interfaces, and a power bus, among others.

The interconnect 3556 may couple the processor 3552 to a mesh transceiver 3562, for communications with other mesh devices 3564. The mesh transceiver 3562 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the mesh devices 3564. For example, a WLAN unit may be used to implement Wi-Fi™ communications in accordance with the Institute of Electrical and Electronics Engineers (IEEE) 802.11 standard. In addition, wireless wide area communications, e.g., according to a cellular or other wireless wide area protocol, may occur via a WWAN unit.

The mesh transceiver 3562 may communicate using multiple standards or radios for communications at different range. For example, the IoT device 3550 may communicate with close devices, e.g., within about 10 meters, using a local transceiver based on BLE, or another low power radio, to save power. More distant mesh devices 3564, e.g., within about 50 meters, may be reached over ZigBee or other intermediate power radios. Both communications techniques may take place over a single radio at different power levels, or may take place over separate transceivers, for example, a local transceiver using BLE and a separate mesh transceiver using ZigBee.

A wireless network transceiver 3566 may be included to communicate with devices or services in the cloud 3500 via local or wide area network protocols. The wireless network transceiver 3566 may be a LPWA transceiver that follows the IEEE 802.15.4, or IEEE 802.15.4g standards, among others. The IoT device 3550 may communicate over a wide area using LoRaWAN™ (Long Range Wide Area Network) developed by Semtech and the LoRa Alliance. The techniques described herein are not limited to these technologies, but may be used with any number of other cloud transceivers that implement long range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the mesh transceiver 3562 and wireless network transceiver 3566, as described herein. For example, the radio transceivers 3562 and 3566 may include an LTE or other cellular transceiver that uses spread spectrum (SPA/SAS) communications for implementing high speed communications. Further, any number of other protocols may be used, such as Wi-Fi® networks for medium speed communications and provision of network communications.

The radio transceivers 3562 and 3566 may include radios that are compatible with any number of 3GPP (Third Generation Partnership Project) specifications, notably Long Term Evolution (LTE), Long Term Evolution-Advanced (LTE-A), and Long Term Evolution-Advanced Pro (LTE-A Pro). It can be noted that radios compatible with any number of other fixed, mobile, or satellite communication technologies and standards may be selected. These may include, for example, any Cellular Wide Area radio communication technology, which may include e.g. a 5th Generation (5G) communication systems, a Global System for Mobile Communications (GSM) radio communication technology, a General Packet Radio Service (GPRS) radio communication technology, or an Enhanced Data Rates for GSM Evolution (EDGE) radio communication technology, a UMTS (Universal Mobile Telecommunications System) communication technology, In addition to the standards listed above, any number of satellite uplink technologies may be used for the wireless network transceiver 3566, including, for example, radios compliant with standards issued by the ITU (International Telecommunication Union), or the ETSI (European Telecommunications Standards Institute), among others. The examples provided herein are thus understood as being applicable to various other communication technologies, both existing and not yet formulated.

A network interface controller (NIC) 3568 may be included to provide a wired communication to the cloud 3500 or to other devices, such as the mesh devices 3564. The wired communication may provide an Ethernet connection, or may be based on other types of networks, such as Controller Area Network (CAN), Local Interconnect Network (LIN), DeviceNet, ControlNet, Data Highway+, PROFIBUS, or PROFINET, among many others. An additional NIC 3568 may be included to allow connect to a second network, for example, a NIC 3568 providing communications to the cloud over Ethernet, and a second NIC 3568 providing communications to other devices over another type of network.

The interconnect 3556 may couple the processor 3552 to an external interface 3570 that is used to connect external devices or subsystems. The external devices may include sensors 3572, such as accelerometers, level sensors, flow sensors, optical light sensors, camera sensors, temperature sensors, a global positioning system (GPS) sensors, pressure sensors, barometric pressure sensors, and the like. The external interface 3570 further may be used to connect the IoT device 3550 to actuators 3574, such as power switches, valve actuators, an audible sound generator, a visual warning device, and the like.

In some optional examples, various input/output (I/O) devices may be present within, or connected to, the IoT device 3550. For example, a display or other output device 3584 may be included to show information, such as sensor readings or actuator position. An input device 3586, such as a touch screen or keypad may be included to accept input. An output device 3584 may include any number of forms of audio or visual display, including simple visual outputs such as binary status indicators (e.g., LEDs) and multi-character visual outputs, or more complex outputs such as display screens (e.g., LCD screens), with the output of characters, graphics, multimedia objects, and the like being generated or produced from the operation of the IoT device 3550.

A battery 3576 may power the IoT device 3550, although in examples in which the IoT device 3550 is mounted in a fixed location, it may have a power supply coupled to an electrical grid. The battery 3576 may be a lithium ion battery, or a metal-air battery, such as a zinc-air battery, an aluminum-air battery, a lithium-air battery, and the like.

A battery monitor/charger 3578 may be included in the IoT device 3550 to track the state of charge (SoCh) of the battery 3576. The battery monitor/charger 3578 may be used to monitor other parameters of the battery 3576 to provide failure predictions, such as the state of health (SoH) and the state of function (SoF) of the battery 3576. The battery monitor/charger 3578 may include a battery monitoring integrated circuit, such as an LTC4020 or an LTC2990 from Linear Technologies, an ADT7488A from ON Semiconductor of Phoenix Ariz., or an IC from the UCD90xxx family from Texas Instruments of Dallas, Tex. The battery monitor/charger 3578 may communicate the information on the battery 3576 to the processor 3552 over the interconnect 3556. The battery monitor/charger 3578 may also include an analog-to-digital (ADC) convertor that allows the processor 3552 to directly monitor the voltage of the battery 3576 or the current flow from the battery 3576. The battery parameters may be used to determine actions that the IoT device 3550 may perform, such as transmission frequency, mesh network operation, sensing frequency, and the like.

A power block 3580, or other power supply coupled to a grid, may be coupled with the battery monitor/charger 3578 to charge the battery 3576. In some examples, the power block 3580 may be replaced with a wireless power receiver to obtain the power wirelessly, for example, through a loop antenna in the IoT device 3550. A wireless battery charging circuit, such as an LTC4020 chip from Linear Technologies of Milpitas, Calif., among others, may be included in the battery monitor/charger 3578. The specific charging circuits chosen depend on the size of the battery 3576, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 3558 may include instructions 3582 in the form of software, firmware, or hardware commands to implement the techniques described herein. Although such instructions 3582 are shown as code blocks included in the memory 3554 and the storage 3558, it may be understood that any of the code blocks may be replaced with hardwired circuits, for example, built into an application specific integrated circuit (ASIC).

In an example, the instructions 3582 provided via the memory 3554, the storage 3558, or the processor 3552 may be embodied as a non-transitory, machine readable medium 3560 including code to direct the processor 3552 to perform electronic operations in the IoT device 3550. The processor 3552 may access the non-transitory, machine readable medium 3560 over the interconnect 3556. For instance, the non-transitory, machine readable medium 3560 may be embodied by devices described for the storage 3558 of FIG. 35 or may include specific storage units such as optical disks, flash drives, or any number of other hardware devices. The non-transitory, machine readable medium 3560 may include instructions to direct the processor 3552 to perform a specific sequence or flow of actions, for example, as described with respect to the flowchart(s) and block diagram (s) of operations and functionality depicted above.

Figure 36:
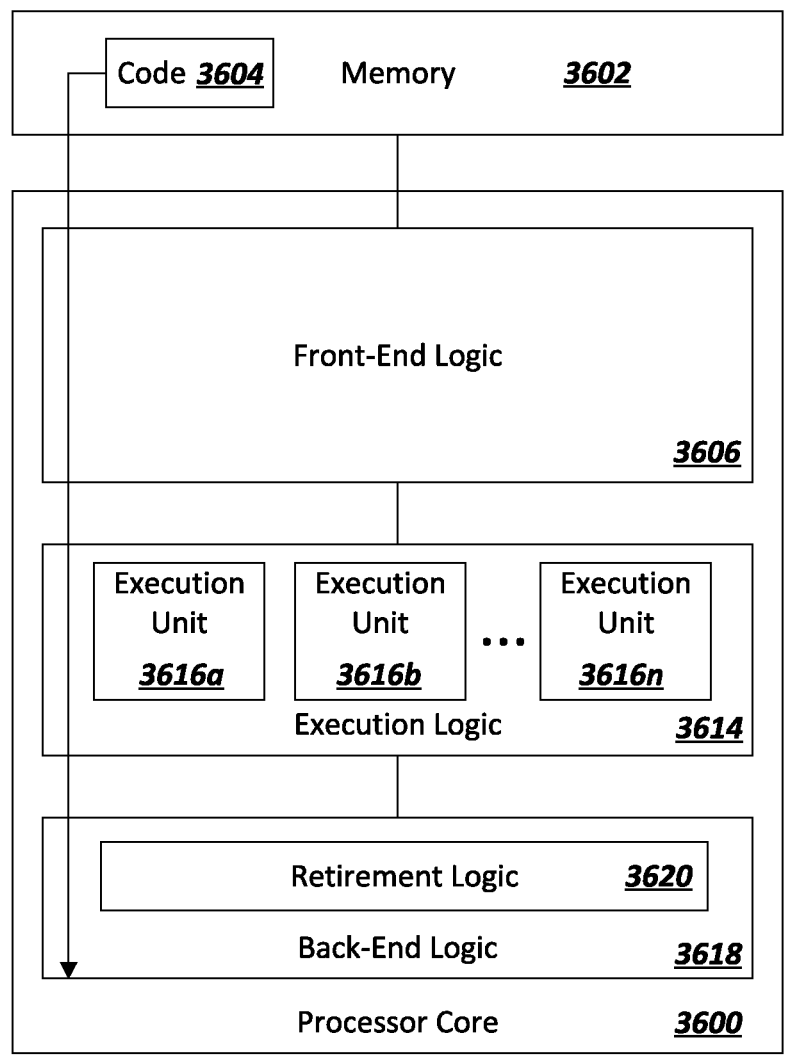
FIG. 36 is a block diagram of an exemplary processor in accordance with at least some embodiments.

FIG. 36 is an example illustration of a processor according to an embodiment. Processor 3600 is an example of a type of hardware device that can be used in connection with the implementations above. Processor 3600 may be any type of processor, such as a microprocessor, an embedded processor, a digital signal processor (DSP), a network processor, a multi-core processor, a single core processor, or other device to execute code. Although only one processor 3600 is illustrated in FIG. 36, a processing element may alternatively include more than one of processor 3600 illustrated in FIG. 36. Processor 3600 may be a single-threaded core or, for at least one embodiment, the processor 3600 may be multi-threaded in that it may include more than one hardware thread context (or "logical processor") per core.

FIG. 36 also illustrates a memory 3602 coupled to processor 3600 in accordance with an embodiment. Memory 3602 may be any of a wide variety of memories (including various layers of memory hierarchy) as are known or otherwise available to those of skill in the art. Such memory elements can include, but are not limited to, random access memory (RAM), read only memory (ROM), logic blocks of a field programmable gate array (FPGA), erasable programmable read only memory (EPROM), and electrically erasable programmable ROM (EEPROM).

Processor 3600 can execute any type of instructions associated with algorithms, processes, or operations detailed herein. Generally, processor 3600 can transform an element or an article (e.g., data) from one state or thing to another state or thing.

Code 3604, which may be one or more instructions to be executed by processor 3600, may be stored in memory 3602, or may be stored in software, hardware, firmware, or any suitable combination thereof, or in any other internal or external component, device, element, or object where appropriate and based on particular needs. In one example, processor 3600 can follow a program sequence of instructions indicated by code 3604. Each instruction enters a front-end logic 3606 and is processed by one or more decoders 3608. The decoder may generate, as its output, a micro operation such as a fixed width micro operation in a predefined format, or may generate other instructions, microinstructions, or control signals that reflect the original code instruction. Front-end logic 3606 also includes register renaming logic 3610 and scheduling logic 3612, which generally allocate resources and queue the operation corresponding to the instruction for execution.

Processor 3600 can also include execution logic 3614 having a set of execution units 3616a, 3616b, 3616n, etc. Some embodiments may include a number of execution units dedicated to specific functions or sets of functions. Other embodiments may include only one execution unit or one execution unit that can perform a particular function. Execution logic 3614 performs the operations specified by code instructions.

After completion of execution of the operations specified by the code instructions, back-end logic 3618 can retire the instructions of code 3604. In one embodiment, processor 3600 allows out of order execution but requires in order retirement of instructions. Retirement logic 3620 may take a variety of known forms (e.g., re-order buffers or the like). In this manner, processor 3600 is transformed during execution of code 3604, at least in terms of the output generated by the decoder, hardware registers and tables utilized by register renaming logic 3610, and any registers (not shown) modified by execution logic 3614.

Although not shown in FIG. 36, a processing element may include other elements on a chip with processor 3600. For example, a processing element may include memory control logic along with processor 3600. The processing element may include I/O control logic and/or may include I/O control logic integrated with memory control logic. The processing element may also include one or more caches. In some embodiments, non-volatile memory (such as flash memory or fuses) may also be included on the chip with processor 3600.

Figure 37:
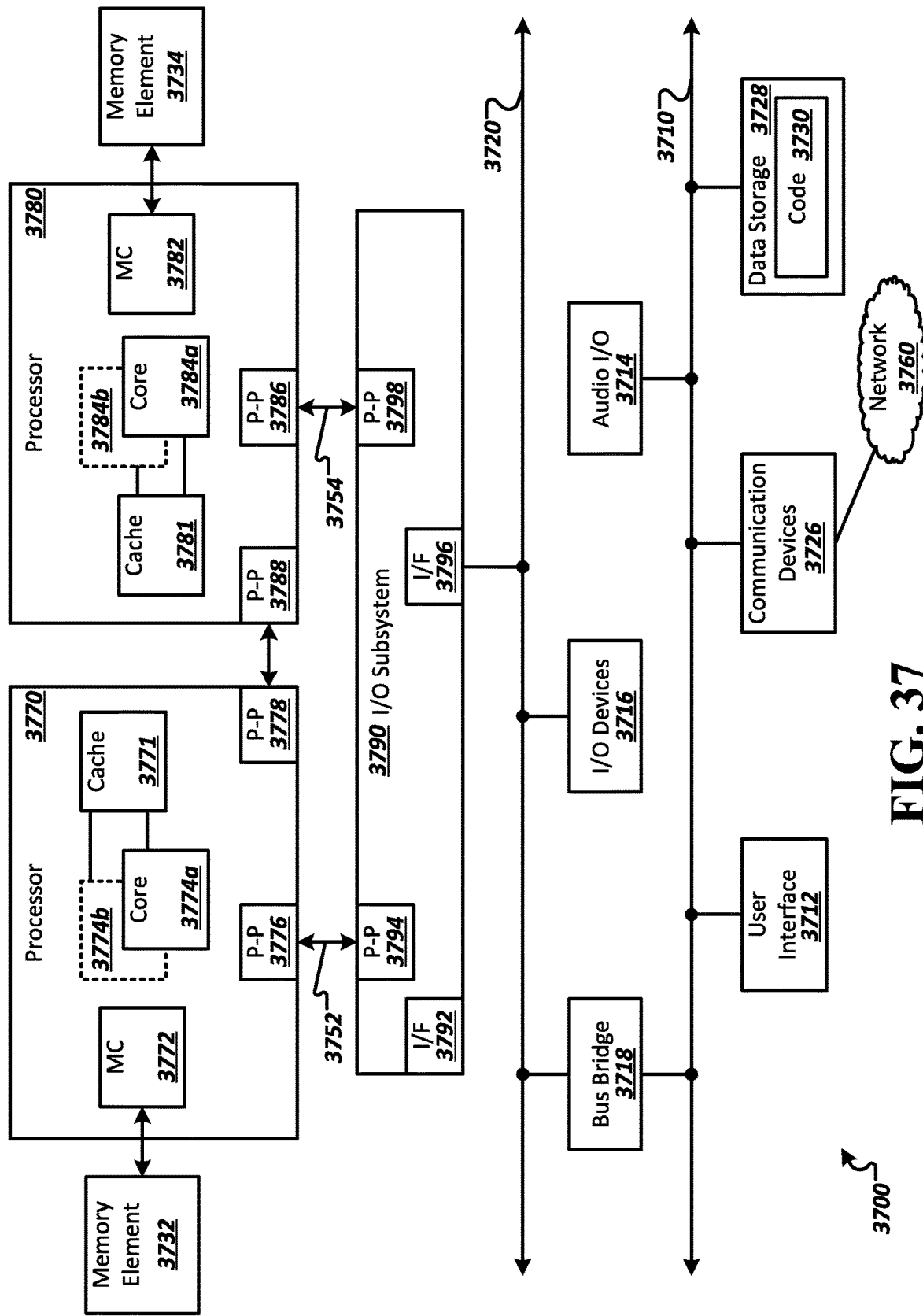
FIG. 37 is a block diagram of an exemplary computing system in accordance with at least some embodiments.

FIG. 37 illustrates a computing system 3700 that is arranged in a point-to-point (PtP) configuration according to an embodiment. In particular, FIG. 37 shows a system where processors, memory, and input/output devices are interconnected by a number of point-to-point interfaces. Generally, one or more of the computing systems described herein may be configured in the same or similar manner as computing system 3700.

Processors 3770 and 3780 may also each include integrated memory controller logic (MC) 3772 and 3782 to communicate with memory elements 3732 and 3734. In alternative embodiments, memory controller logic 3772 and 3782 may be discrete logic separate from processors 3770 and 3780. Memory elements 3732 and/or 3734 may store various data to be used by processors 3770 and 3780 in achieving operations and functionality outlined herein.

Processors 3770 and 3780 may be any type of processor, such as those discussed in connection with other figures. Processors 3770 and 3780 may exchange data via a point-to-point (PtP) interface 3750 using point-to-point interface circuits 3778 and 3788, respectively. Processors 3770 and 3780 may each exchange data with a chipset 3790 via individual point-to-point interfaces 3752 and 3754 using point-to-point interface circuits 3776, 3786, 3794, and 3798. Chipset 3790 may also exchange data with a high-performance graphics circuit 3738 via a high-performance graphics interface 3739, using an interface circuit 3792, which could be a PtP interface circuit. In alternative embodiments, any or all of the PtP links illustrated in FIG. 37 could be implemented as a multi-drop bus rather than a PtP link.

Chipset 3790 may be in communication with a bus 3720 via an interface circuit 3796. Bus 3720 may have one or more devices that communicate over it, such as a bus bridge 3718 and I/O devices 3716. Via a bus 3710, bus bridge 3718 may be in communication with other devices such as a user interface 3712 (such as a keyboard, mouse, touchscreen, or other input devices), communication devices 3726 (such as modems, network interface devices, or other types of communication devices that may communicate through a computer network 3760), audio I/O devices 3714, and/or a data storage device 3728. Data storage device 3728 may store code 3730, which may be executed by processors 3770 and/or 3780. In alternative embodiments, any portions of the bus architectures could be implemented with one or more PtP links.

The computer system depicted in FIG. 37 is a schematic illustration of an embodiment of a computing system that may be utilized to implement various embodiments discussed herein. It will be appreciated that various components of the system depicted in FIG. 37 may be combined in a system-on-a-chip (SoC) architecture or in any other suitable configuration capable of achieving the functionality and features of examples and implementations provided herein.

In further examples, a machine-readable medium also includes any tangible medium that is capable of storing, encoding or carrying instructions for execution by a machine and that cause the machine to perform any one or more of the methodologies of the present disclosure or that is capable of storing, encoding or carrying data structures utilized by or associated with such instructions. A "machine-readable medium" thus may include, but is not limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks. The instructions embodied by a machine-readable medium may further be transmitted or received over a communications network using a transmission medium via a network interface device utilizing any one of a number of transfer protocols (e.g., HTTP).

It should be understood that the functional units or capabilities described in this specification may have been referred to or labeled as components or modules, in order to more particularly emphasize their implementation independence. Such components may be embodied by any number of software or hardware forms. For example, a component or module may be implemented as a hardware circuit comprising custom very-large-scale integration (VLSI) circuits or gate arrays, off-the-shelf semiconductors such as logic chips, transistors, or other discrete components. A component or module may also be implemented in programmable hardware devices such as field programmable gate arrays, programmable array logic, programmable logic devices, or the like. Components or modules may also be implemented in software for execution by various types of processors. An identified component or module of executable code may, for instance, comprise one or more physical or logical blocks of computer instructions, which may, for instance, be organized as an object, procedure, or function. Nevertheless, the executables of an identified component or module need not be physically located together, but may comprise disparate instructions stored in different locations which, when joined logically together, comprise the component or module and achieve the stated purpose for the component or module.

Indeed, a component or module of executable code may be a single instruction, or many instructions, and may even be distributed over several different code segments, among different programs, and across several memory devices or processing systems. In particular, some aspects of the described process (such as code rewriting and code analysis) may take place on a different processing system (e.g., in a computer in a data center), than that in which the code is deployed (e.g., in a computer embedded in a sensor or robot). Similarly, operational data may be identified and illustrated herein within components or modules, and may be embodied in any suitable form and organized within any suitable type of data structure. The operational data may be collected as a single data set, or may be distributed over different locations including over different storage devices, and may exist, at least partially, merely as electronic signals on a system or network. The components or modules may be passive or active, including agents operable to perform desired functions.

Additional examples of the presently described method, system, and device embodiments include the following, non-limiting configurations. Each of the following non-limiting examples may stand on its own, or may be combined in any permutation or combination with any one or more of the other examples provided below or throughout the present disclosure.

Although this disclosure has been described in terms of certain implementations and generally associated methods, alterations and permutations of these implementations and methods will be apparent to those skilled in the art. For example, the actions described herein can be performed in a different order than as described and still achieve the desirable results. As one example, the processes depicted in the accompanying figures do not necessarily require the particular order shown, or sequential order, to achieve the desired results. In certain implementations, multitasking and parallel processing may be advantageous. Additionally, other user interface layouts and functionality can be supported. Other variations are within the scope of the following claims.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The following examples pertain to embodiments in accordance with this Specification. Example 1 is a non-transitory machine accessible storage medium having instructions stored thereon, where the instructions when executed on a machine, cause the machine to: generate volumetric data to represent a three-dimensional (3D) volume, where the volume includes a set of voxels, at least one of the voxels is occupied by 3D geometry, and the volumetric data identifies, for each of the set of voxels, whether the respective voxel is occupied; generate index values for the volumetric data according to a hashing algorithm, where the index value for a particular portion of the volumetric data representing a particular subset of the voxels in the set of voxels is generated based on a combination of values of x-, y-, and z-coordinates associated with the particular subset of voxels, and the index value for the particular portion is further generated based on a side length value corresponding to the volume; and store the particular portion of the volumetric data in an entry of a hash table, where the entry has an address based on the index value for the particular portion.

Example 2 includes the subject matter of example 1, where the combination of the values of the x-, y-, and z-coordinates include a weighted sum of the values of the x-, y-, and z-coordinates, and one or more of the x-, y-, and z-coordinates are weighted based on the side length value.

Example 3 includes the subject matter of example 2, where the index values are generated according to a formula: index=$(ID_z*(SL^2)+ID_y*(SL)+ID_x)$, where $ID_z$ is the value of the z-coordinate, $ID_y$ is the value of the y-coordinate, $ID_x$ is the value of the x-coordinate, and SL is the side length value.

Example 4 includes the subject matter of any one of examples 2-3, where the instructions, when executed, further cause the machine to determine weightings to be applied to the x-, y-, and z-coordinates using the side length value based on relative density of occupied volume within each of the x-, y-, and z-coordinates of the volume.

Example 5 includes the subject matter of any one of examples 1-4, where the volume is logically subdivided into a set of voxel blocks, each of the voxel blocks includes a sub-volume of a respective subset of voxels, and the particular subset voxels includes a particular one of the set of voxel blocks.

Example 6 includes the subject matter of example 5, where each entry in the hash table is sized to accommodate volumetric data to describe each voxel in a respective one of the set of voxel blocks.

Example 7 includes the subject matter of example 6, where each voxel block includes a number of voxels and the hash table entries each include at least one bit per voxel in the voxel block to identify whether the corresponding voxel is occupied.

Example 8 includes the subject matter of example 7, where each hash table entry is sized to include 2-bits per voxel in the corresponding voxel block.

Example 9 includes the subject matter of any one of examples 1-8, where the instructions, when executed, further cause the machine to calculate the address of the entry, and addresses of entries in the hash table are calculated based on modulus of the index value.

Example 10 includes the subject matter of any one of examples 1-9, where the instructions, when executed, further cause the machine to: detect whether there is a collision with the entry in the hash table; and when a collision is detected, utilize a collision management scheme associated with the hash table.

Example 11 includes the subject matter of any one of examples 1-10, where the hashing algorithm does not utilize large primes.

Example 12 is non-transitory machine accessible storage medium having instructions stored thereon, where the instructions when executed on a machine, cause the machine to: identify a particular voxel within a volume; access a hash table stored in computer memory; determine x-, y- and z-coordinates in the volume associated with the particular voxel; determine an index value associated with the particular voxel according to a hashing algorithm and based on the x-, y- and z-coordinates, where the index value is determined according to the hashing algorithm through summation of weighted values of the x-, y- and z-coordinates, and the weighted values are based on a side length value corresponding to the volume; identify a particular entry in a hash table based on the index value, where the particular entry includes volumetric data, and the volumetric data identifies, for a particular subset of voxels in a particular portion of the volume, whether voxels in the subset of voxels are occupied with 3D geometry, where the subset of voxels include the particular voxel; and determine, from the particular entry, whether the particular voxel is occupied with 3D geometry.

Example 13 includes the subject matter of example 12, where the instructions, when executed, further cause the machine to determine a navigation action within the volume based on determining whether the particular voxel is occupied.

Example 14 includes the subject matter of any one of examples 12-13, where the index value is determined according to a formula: index=$(ID_z*(SL^2)+ID_y*(SL)+ID_x)$, where $ID_z$ is the value of the z-coordinate, $ID_y$ is the value of the y-coordinate, $ID_x$ is the value of the x-coordinate, and SL is the side length value.

Example 15 includes the subject matter of any one of examples 12-14, where the x-, y- and z-coordinates associated with the particular voxel include coordinates of a block of voxels in the volume, and the block of voxels includes the subset of voxels.

Example 16 includes the subject matter of example 15, where the volume includes a number of blocks of voxels, and the side length value is equal to the cubed root of the number of blocks of voxels in the volume.

Example 17 includes the subject matter of any one of examples 15-16, where each entry in the hash table is sized to accommodate volumetric data to describe each voxel in a respective one of the set of voxel blocks.

Example 18 includes the subject matter of example 17, where each voxel block includes a number of voxels and the hash table entries each include at least one bit per voxel in the voxel block to identify whether the corresponding voxel is occupied.

Example 19 includes the subject matter of example 18, where each hash table entry is sized to include 2-bits per voxel in the corresponding voxel block.

Example 20 includes the subject matter of any one of examples 12-19, where the instructions, when executed, further cause the machine to calculate the address of the particular entry, and addresses of entries in the hash table are calculated based on modulus of the index value.

Example 21 includes the subject matter of any one of examples 12-20, where the instructions, when executed, further cause the machine to: detect whether there is a collision with the particular entry in the hash table; and when a collision is detected, utilize a collision management scheme associated with the hash table.

Example 22 includes the subject matter of any one of examples 12-21, where the hashing algorithm does not utilize large primes.

Example 23 includes the subject matter of any one of examples 12-22, where the instructions, when executed, further cause the machine to determine a path of autonomous navigation of a device within the volume based on whether the particular voxel is occupied.

Example 24 is a method including: generating volumetric data to represent a three-dimensional (3D) volume, where the volume includes a set of voxels, at least one of the voxels is occupied by 3D geometry, and the volumetric data identifies, for each of the set of voxels, whether the respective voxel is occupied; generating index values for the volumetric data according to a hashing algorithm, where the index value for a particular portion of the volumetric data representing a particular subset of the voxels in the set of voxels is generated based on a combination of values of x-, y-, and z-coordinates associated with the particular subset of voxels, and the index value for the particular portion is further generated based on a side length value corresponding to the volume; and storing the particular portion of the volumetric data in an entry of a hash table, where the entry has an address based on the index value for the particular portion.

Example 25 includes the subject matter of example 24, where the combination of the values of the x-, y-, and z-coordinates include a weighted sum of the values of the x-, y-, and z-coordinates, and one or more of the x-, y-, and z-coordinates are weighted based on the side length value.

Example 26 includes the subject matter of example 25, where the index values are generated according to a formula: index=$(ID_z*(SL^2)+ID_y*(SL)+ID_x)$, where $ID_z$ is the value of the z-coordinate, $ID_y$ is the value of the y-coordinate, $ID_x$ is the value of the x-coordinate, and SL is the side length value.

Example 27 includes the subject matter of any one of examples 25-26, where the instructions, when executed, further cause the machine to determine weightings to be applied to the x-, y-, and z-coordinates using the side length value based on relative density of occupied volume within each of the x-, y-, and z-coordinates of the volume.

Example 28 includes the subject matter of any one of examples 24-27, where the volume is logically subdivided into a set of voxel blocks, each of the voxel blocks includes a sub-volume of a respective subset of voxels, and the particular subset voxels includes a particular one of the set of voxel blocks.

Example 29 includes the subject matter of example 28, where each entry in the hash table is sized to accommodate volumetric data to describe each voxel in a respective one of the set of voxel blocks.

Example 30 includes the subject matter of example 29, where each voxel block includes a number of voxels and the hash table entries each include at least one bit per voxel in the voxel block to identify whether the corresponding voxel is occupied.

Example 31 includes the subject matter of example 30, where each hash table entry is sized to include 2-bits per voxel in the corresponding voxel block.

Example 32 includes the subject matter of any one of examples 24-31, where the instructions, when executed, further cause the machine to calculate the address of the entry, and addresses of entries in the hash table are calculated based on modulus of the index value.

Example 33 includes the subject matter of any one of examples 24-32, where the instructions, when executed, further cause the machine to: detect whether there is a collision with the entry in the hash table; and when a collision is detected, utilize a collision management scheme associated with the hash table.

Example 34 includes the subject matter of any one of examples 24-33, where the hashing algorithm does not utilize large primes.

Example 35 is a method including: identifying a particular voxel within a volume; accessing a hash table stored in computer memory; determining x-, y- and z-coordinates in the volume associated with the particular voxel; determining an index value associated with the particular voxel according to a hashing algorithm, where determining the index value according to the hashing algorithm includes summing weighted values of the x-, y- and z-coordinates, and the weighted values are based on a side length value corresponding to a dimension of the volume; and identifying a particular entry in a hash table based on the index value, where the particular entry includes volumetric data, and the volumetric data identifies, for the particular voxel, whether the particular voxel is occupied with 3D geometry.

Example 36 includes the subject matter of example 35, where the instructions, when executed, further cause the machine to determine a navigation action within the volume based on determining whether the particular voxel is occupied.

Example 37 includes the subject matter of any one of examples 35-36, where the index value is determined according to a formula: index=$(ID_z*(SL^2)+ID_y*(SL)+ID_x)$, where $ID_z$ is the value of the z-coordinate, $ID_y$ is the value of the y-coordinate, $ID_x$ is the value of the x-coordinate, and SL is the side length value.

Example 38 includes the subject matter of any one of examples 35-37, where the x-, y- and z-coordinates associated with the particular voxel include coordinates of a block of voxels in the volume, and the block of voxels includes the subset of voxels.

Example 39 includes the subject matter of example 38, where the volume includes a number of blocks of voxels, and the side length value is equal to the cubed root of the number of blocks of voxels in the volume.

Example 40 includes the subject matter of any one of examples 38-39, where each entry in the hash table is sized to accommodate volumetric data to describe each voxel in a respective one of the set of voxel blocks.

Example 41 includes the subject matter of example 40, where each voxel block includes a number of voxels and the hash table entries each include at least one bit per voxel in the voxel block to identify whether the corresponding voxel is occupied.

Example 42 includes the subject matter of example 41, where each hash table entry is sized to include 2-bits per voxel in the corresponding voxel block.

Example 43 includes the subject matter of any one of examples 35-42, where the instructions, when executed, further cause the machine to calculate the address of the particular entry, and addresses of entries in the hash table are calculated based on modulus of the index value.

Example 44 includes the subject matter of any one of examples 35-43, where the instructions, when executed, further cause the machine to: detect whether there is a collision with the particular entry in the hash table; and when a collision is detected, utilize a collision management scheme associated with the hash table.

Example 45 includes the subject matter of any one of examples 35-44, where the hashing algorithm does not utilize large primes.

Example 46 includes the subject matter of any one of examples 35-45, where the instructions, when executed, further cause the machine to determine a path of autonomous navigation of a device within the volume based on whether the particular voxel is occupied.

Example 47 is a system including: a data processing apparatus; memory including a hash table; a sensor to generate volumetric data to identify geometry within at least a portion of a volume; and volumetric processing logic. The volumetric processing logic is executable to: determine that a particular portion of the volumetric data corresponds to a particular sub-volume of the volume; determine x-, y-, and z-coordinates of the particular sub-volume within the volume, where the particular sub-volume includes a set of one or more voxels; determine an index value for the particular portion of the volumetric data based on a hashing algorithm, where the index value is determined from a summation of weighted values of the x-, y-, and z-coordinates of the particular sub-volume, where one or more of the values of the x-, y-, and z-coordinates are weighted based on a side length variable; determine an address within the hash table from the index value; determine whether a collision exists at the address; and cause the particular portion of the volumetric data to be written to an entry of the hash table associated with the address based on a determination of no collision at the address.

Example 48 includes the subject matter of example 47, where the volumetric processing logic is further executable to: identify a particular voxel within the volume; determine that a sub-volume of the volume includes the particular voxel; identify x-, y- and z-coordinates for the sub-volume of the particular voxel; calculate an index value associated with the particular voxel from the x-, y- and z-coordinates for the sub-volume of the particular voxel and based on the hashing algorithm; access an entry in the hash table corresponding to the index associated with the particular voxel to access volumetric data associated with the particular voxel, where the volumetric data associated with the particular voxel identifies whether the particular voxel is occupied with geometry; and trigger an autonomous movement within the volume based on whether the particular voxel is occupied with geometry.

Example 49 includes the subject matter of any one of examples 47-48, including one of a drone, robot, or autonomous vehicle.

Example 50 includes the subject matter of any one of examples 47-49, where the index value is determined according to a formula: index=$(ID_z*(SL^2)+ID_y*(SL)+ID_x)$, where $ID_z$ is the value of the z-coordinate, $ID_y$ is the value of the y-coordinate, $ID_x$ is the value of the x-coordinate, and SL is the side length value.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results.

What is claimed is:
1. At least one machine accessible storage medium having instructions stored thereon, the instructions when executed on a machine, cause the machine to:
generate volumetric data to represent a volume, wherein the volume comprises a set of voxels, at least one of the voxels is occupied by three-dimensional (3D) geometry, and the volumetric data identifies, for each of the set of voxels, whether the respective voxel is occupied;
generate index values for the volumetric data according to a hashing algorithm, wherein the index value for a particular portion of the volumetric data representing a particular subset of the voxels in the set of voxels is generated from a weighted sum of an x-coordinate value, a y-coordinate value, and a z-coordinate value associated with the particular subset of voxels, wherein at least one of the x-coordinate value, the y-coordinate value, and the z-coordinate value is weighted based on a side length value corresponding to the volume, wherein the side length value corresponds to a number of voxels present in a particular dimension of the particular subset of voxels; and
store the particular portion of the volumetric data in an entry of a hash table, wherein the entry has an address based on the index value for the particular portion.

2. The storage medium of claim 1, wherein the index values are generated according to a formula: index=$(ID_z*(SL^2)+ID_y*(SL)+ID_x)$, wherein $ID_z$ is the value of the z-coordinate, $ID_y$ is the value of the y-coordinate, $ID_x$ is the value of the x-coordinate, and SL is the side length value.

3. The storage medium of claim 1, wherein the instructions, when executed, further cause the machine to determine weightings to be applied to the x-, y-, and z-coordinates using the side length value based on relative density of occupied volume within each of the x-, y-, and z-coordinates of the volume.

4. The storage medium of claim 1, wherein the volume is logically subdivided into a set of voxel blocks, each of the voxel blocks comprises a sub-volume of a respective subset of voxels, and the particular subset voxels comprises a particular one of the set of voxel blocks.

5. The storage medium of claim 4, wherein each entry in the hash table is sized to accommodate volumetric data to describe each voxel in a respective one of the set of voxel blocks.

6. The storage medium of claim 5, wherein each voxel block comprises a number of voxels and the hash table entries each comprise at least one bit per voxel in the voxel block to identify whether the corresponding voxel is occupied.

7. The storage medium of claim 6, wherein each hash table entry is sized to comprise 2-bits per voxel in the corresponding voxel block.

8. The storage medium of claim 1, wherein the instructions, when executed, further cause the machine to calculate the address of the entry, and addresses of entries in the hash table are calculated based on modulus of the index value.

9. The storage medium of claim 1, wherein the instructions, when executed, further cause the machine to:
detect whether there is a collision with the entry in the hash table; and
when a collision is detected, utilize a collision management scheme associated with the hash table.

10. The storage medium of claim 1, wherein the hashing algorithm does not utilize large primes.

11. At least one machine accessible storage medium having instructions stored thereon, the instructions when executed on a machine, cause the machine to:

identify a particular voxel within a volume;

access a hash table stored in computer memory;

determine x-, y- and z-coordinates in the volume associated with the particular voxel;

determine an index value associated with the particular voxel according to a hashing algorithm and based on the x-, y- and z-coordinates, wherein the index value is determined according to the hashing algorithm through summation of weighted values of the x-, y- and z-coordinates, wherein at least one of the x-coordinate value, the y-coordinate value, and the z-coordinate value is weighted based on a side length value corresponding to the volume, wherein the side length value corresponds to a number of voxels present in a particular dimension of the particular subset of voxels;

identify a particular entry in a hash table based on the index value, wherein the particular entry comprises volumetric data, and the volumetric data identifies, for a particular subset of voxels in a particular portion of the volume, whether voxels in the subset of voxels are occupied, wherein the subset of voxels comprise the particular voxel; and determine, from the particular entry, whether the particular voxel is occupied.

12. The storage medium of claim 11, wherein the instructions, when executed, further cause the machine to determine a navigation action within the volume based on determining whether the particular voxel is occupied.

13. The storage medium of claim 11, wherein the index value is determined according to a formula: index=$(ID_z * (SL^2) + ID_y * (SL) + ID_x)$, wherein $ID_z$ is the value of the z-coordinate, $ID_y$ is the value of the y-coordinate, $ID_x$ is the value of the x-coordinate, and SL is the side length value.

14. The storage medium of claim 11, wherein the x-, y- and z-coordinates associated with the particular voxel comprise coordinates of a block of voxels in the volume, the block of voxels comprises a plurality of voxels, and the block of voxels comprises the subset of voxels.

15. The storage medium of claim 14, wherein the volume comprises a number of blocks of voxels, each block of voxels comprises a same number of constituent voxels, and the side length value is equal to the cubed root of the number of blocks of voxels in the volume.

16. A method comprising:

identifying a particular voxel within a volume;

accessing a hash table stored in computer memory;

determining x-, y- and z-coordinates in the volume associated with the particular voxel;

determining an index value associated with the particular voxel according to a hashing algorithm, wherein determining the index value according to the hashing algorithm comprises summing weighted values of the x-, y- and z-coordinates, wherein at least one of the x-coordinate value, the y-coordinate value, and the z-coordinate value is weighted based on a side length value corresponding to the volume, wherein the side length value corresponds to a number of voxels present in a particular dimension of the particular subset of voxels;

identifying a particular entry in a hash table based on the index value, wherein the particular entry comprises volumetric data, and the volumetric data identifies, for the particular voxel, whether the particular voxel is occupied; and determining a path of autonomous navigation of a device within the volume based on whether the particular voxel is occupied.

17. A system comprising:

a data processing apparatus;

memory comprising a hash table;

a sensor to generate volumetric data to identify geometry within at least a portion of a volume; and volumetric processing logic executable to:

determine that a particular portion of the volumetric data corresponds to a particular sub-volume of the volume;

determine x-, y-, and z-coordinates of the particular sub-volume within the volume, wherein the particular sub-volume comprises a set of one or more voxels;

determine an index value for the particular portion of the volumetric data based on a hashing algorithm, wherein the index value is determined from a summation of weighted values of the x-, y-, and z-coordinates of the particular sub-volume, wherein one or more of the values of the x-, y-, and z-coordinates are weighted based on a side length variable corresponding to a dimension of the volume;

determine an address within the hash table from the index value;

determine whether a collision exists at the address; and cause the particular portion of the volumetric data to be written to an entry of the hash table associated with the address based on a determination of no collision at the address.

18. The system of claim 17, wherein the volumetric processing logic is further executable to:

identify a particular voxel within the volume;

determine that a sub-volume of the volume comprises the particular voxel;

identify x-, y- and z-coordinates for the sub-volume of the particular voxel;

calculate an index value associated with the particular voxel from the x-, y- and z-coordinates for the sub-volume of the particular voxel and based on the hashing algorithm;

access an entry in the hash table corresponding to the index associated with the particular voxel to access volumetric data associated with the particular voxel, wherein the volumetric data associated with the particular voxel identifies whether the particular voxel is occupied with geometry; and trigger an autonomous movement within the volume based on whether the particular voxel is occupied with geometry.

19. The system of claim 17, comprising one of a drone, a robot, or an autonomous vehicle.

* * * * *